(12) United States Patent
Nguyen et al.

(10) Patent No.: US 12,514,871 B2
(45) Date of Patent: Jan. 6, 2026

(54) PEGYLATED MENAQUINOL COMPOSITIONS AND METHODS OF TREATMENT

(71) Applicant: Epizon Pharma, Inc., New York, NY (US)

(72) Inventors: Sam L. Nguyen, Dana Point, CA (US); John M. Rudey, New York, NY (US)

(73) Assignee: Epizon Pharma, Inc., New York, NY (US)

( * ) Notice: Subject to any disclaimer, the term of this patent is extended or adjusted under 35 U.S.C. 154(b) by 412 days.

(21) Appl. No.: 18/202,812

(22) Filed: May 26, 2023

(65) Prior Publication Data

US 2023/0381220 A1 Nov. 30, 2023

Related U.S. Application Data

(60) Provisional application No. 63/447,314, filed on Feb. 21, 2023, provisional application No. 63/447,310, filed on Feb. 21, 2023, provisional application No. 63/413,495, filed on Oct. 5, 2022, provisional application No. 63/413,506, filed on Oct. 5, 2022, provisional application No. 63/347,008, filed on May 30, 2022, provisional application No. 63/347,007, filed on May 30, 2022.

(51) Int. Cl.
*A61K 31/765* (2006.01)
*A61P 13/12* (2006.01)

(52) U.S. Cl.
CPC ............ *A61K 31/765* (2013.01); *A61P 13/12* (2018.01)

(58) Field of Classification Search
None
See application file for complete search history.

(56) References Cited

U.S. PATENT DOCUMENTS 11,603,345 B2 3/2023 Drouet et al.
2017/0079994 A1 3/2017 Moller et al.

OTHER PUBLICATIONS

The International Search Report and Written Opinion, mailed on Sep. 27, 2023, in related PCT Appl. No. PCT/US2023/023745.
Wajih et al., "Successful treatment of calciphylaxis with vitamin K in a patient on haemodialysis," Clinical Kidney Journal, 2022, vol. 15, No. 2, 354-356.
Christiadi et al., "Calciphylaxis in a dialysis patient successfully treated with high-dose vitamin K supplementation," Clinical Kidney Journal, 2018, vol. 11, No. 4, 528-529.

*Primary Examiner* — Samantha L Shterengarts

(57) ABSTRACT

The present application discloses, in part, isolated, stable and biologically active pegylated menaquinol derivatives and their methods of use for the treatment of various diseases.

20 Claims, 6 Drawing Sheets

Uremia and Dialysis Induced Oxidation of KH2 Reduces Functional Carboxylation of Vitamin K Dependent Proteins Fig. 3. In vivo plasma protein carbonyl formation. *$P < 0.05$ vs. normal volunteers ($N = 10$ in each group).

PEGYLATED MENAQUINOL COMPOSITIONS AND METHODS OF TREATMENT

RELATED APPLICATIONS

The present application claims the priority under 35 USC 119(e) of Provisional Patent Application Nos. 63/347,007, filed on May 30, 2022; 63/347,008, filed on May 30, 2022; 63/413,495, filed on Oct. 5, 2022; 63/413,506, filed on Oct. 5, 2022; 63/447,310, filed on Feb. 21, 2023; and 63/447,314, filed on Feb. 21, 2023, all of which are incorporated into this application by reference.

FIELD OF INVENTION

The present invention relates to biologically active menaquinol derivatives, compositions and formulations, and combinations thereof, for the treatment of diseases associated with vitamin K, its reduced and bioactive form menaquinol and salts thereof, including osteoporosis and osteopenia.

BACKGROUND OF THE INVENTION

Vitamin K is known as a group of structurally similar, fat-soluble vitamins. Vitamin K2 or menaquinone has nine related compounds that can be subdivided into the short-chain menaquinones (such as menaquinone-4 or MK-4) and the long-chain menaquinones, such as MK-7, MK-8 and MK-9 to MK-12. The vitamins include phylloquinone (K1), menaquinones (K2) and menadione (K3). Plants synthesize vitamin K1 while bacteria can produce a range of vitamin K2 forms, including the conversion of K1 to K2 by bacteria in the small intestines. Vitamin K3 is a synthetic version of the vitamin, and due to its toxicity, has been banned in by the US FDA for human uses.

It has been established that taking broad-spectrum antibiotics can reduce vitamin K production in the gut by nearly 74% in people compared to those not taking these antibiotics. Diets that are low in vitamin K also decrease the body's vitamin K concentration. Vitamin K1 is preferentially used by the liver as a clotting factor. Vitamin K2 is used preferentially in the brain, vasculature, breasts and kidneys. Vitamin K2 contributes to production of myelin and sphingolipids (fats essential for brain health) and protects against oxidative damage in the brain. Vitamin K2, such as MK-4, promotes bone health by stimulating connective tissue production in bone.

Vitamin K2, which is the main storage form in animals, has several subtypes, which differ in chain length of the isoprenoid group or residue in the side chains. These vitamin K2 homologues are called menaquinones and are characterized by the number of isoprenoid residues in their side chains. For example, MK-4 has four isoprene residues in its side chain and is the most common type of vitamin K2 in animal products. MK-4 is normally synthesized from vitamin $K_1$ in certain animal tissues (arterial walls, pancreas and testes) by replacement of the phytyl group with an unsaturated geranyl group containing four isoprene units. Unlike MK-4, MK-7 is not produced by human tissue. MK-7 may be converted from phylloquinone (K1) in the colon by *E. coli* bacteria. MK-4 and MK-7 are sold in the U.S. in dietary supplements for bone health. MK-4 has been shown to decrease the incidence of fractures. MK-4, at a dose of 45 mg daily, has been approved by the Ministry of Health in Japan since 1995 for the prevention and treatment of osteoporosis.

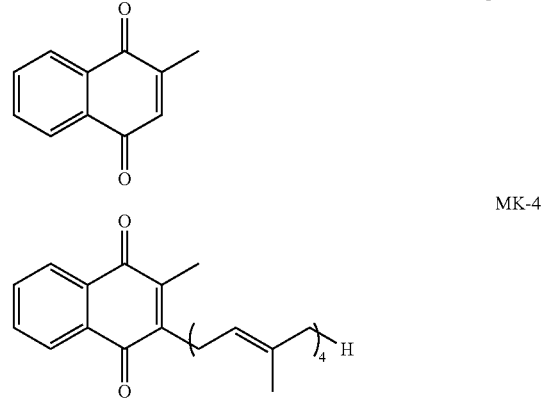

Vitamin K2, typically as MK-4, has been proposed, and evaluated both in vitro and in vivo, for the treatment of a variety of cancers. For example, (1) Lamson et al., "The Anticancer Effects of Vitamin K", *Altern. Med. Rev.*, 8(3), 303-318 (2003), provide a review of vitamin K therapy. They say that "Both in vitro and in vivo studies have shown that vitamin K2 also exhibits anticancer effects. A number of cancer cell lines were screened (including liver, colon, leukemia, lung, stomach, lymphocyte, nasopharynx, breast, and oral epidermoid)" with activity seen. They also comment on inhibition of proliferation in the HOS TE85 human osteosarcoma and MC3T3-E1 mouse osteoblastic cell lines, in the C6 rat and RBR17T and T98G human glioma cell lines, in myeloblastic (MLI) and promyelocytic (HL60) lung cancer cell lines, and say that vitamin K2 analogs, especially MK-4, induced apoptosis in isolated leukemia cells (post-myelodysplastic syndrome (MDS) and acute myelocytic leukemia). They give two individual case reports; and they also mention a pilot study in Japan of MDS and post-MDS acute myeloid leukemia (post-MDS AML) treatment with K2 (MK-4) and a Japanese trial in hepatocellular cancer, both showing promising results. (2) Yoshida et al., "Apoptosis induction of vitamin K2 in lung carcinoma cell lines: The possibility of vitamin K2 therapy for lung cancer", *Int. J. Oncol.*, 23, 627-632 (2003), say that "vitamin K2 (menaquinone-4, VK2) has been reported to show apoptosis and differentiation-inducing effects on leukemia cells", and that "the clinical benefits of using VK2 have been demonstrated for the treatment of the patients with acute leukemia and myelodysplastic syndromes". They show the in vitro activity of MK-4 against 7 lung cancer cell lines: small cell lung carcinoma (LU-139, LU-I30); lung squamous cell carcinoma (LC-AI, LC-1/sq), lung adenocarcinoma (PC-14, CCL185), and a large cell carcinoma (IA-LM); and also show that combining sub-optimal doses of MK-4 and cisplatin had growth inhibitory activity against LU-139 cells in vitro. (3) Ohtsuka et al., "Vitamin K2 Inhibits the Growth and Invasiveness of Hepatocellular Carcinoma Cells via Protein Kinase A Activation", *Hepatology*, 40, 243-251 (2004) say that MK-4 inhibits hepatocellular carcinoma cells (HepG2 and PRF/PLC/5) in vitro and in vivo (mouse xenograft with PRF/PLC/5). They also mention a human clinical trial in progress with interim results favoring MK-4 treatment for inhibition of portal vein invasion in liver cancer. (4) Tokita et al., "Vitamin K2-induced antitumor effects via cell-cycle arrest and apoptosis in gastric cancer cell lines", *Int. J. Molecular Med.*, 17, 235-243 (2006), show that when four kinds of gastric cancer cells (KATO III (signet ring cell carcinoma), MKN7 (well differentiated tubular adenocarcinoma), MKN74 (moderately differentiated tubular adenocarcinoma, liver metastasis) and FU97 (poorly-differentiated adenocarcinoma, AFP production) were exposed to MK-4 in vitro, the cell growth was inhibited in a dose-dependent manner, and that, when the same cell lines were treated with up to 10 mg/L of 5-fluorouracil or docetaxel, cell growth was inhibited in a dose-dependent manner in the MK-4-added group as compared to the controls. (5) Kawakita et al., "Growth inhibitory effects of vitamin K2 on colon cancer cell lines via different types of cell death including autophagy and apoptosis", *Int. J. Molecular Med.*, 23, 709-716 (2009), showed that MK-4 showed dose-dependent inhibitory effects in the COLO201 and PMC01 colon cancer cell lines in vitro, but not in the DLD-1 cell line. (6) Li et al., "Induction of apoptosis in hepatocellular carcinoma Smmc-7721 cells by vitamin K2 is associated with p53 and independent of the intrinsic apoptotic pathway", *Mol. Cell Biochem.*, 342, 125-131 (2010), say that "Vitamin K2 (VK2) can exert cell growth inhibitory effects in various human cancer cells", and show that vitamin K2 inhibited cell proliferation in Smmc-7721 hepatocellular carcinoma cells in a dose-dependent manner in vitro. (7) Samykutty et al., "Vitamin K2, a Naturally Occurring Menaquinone, Exerts Therapeutic Effects on Both Hormone-Dependent and Hormone-Independent Prostate Cancer Cells", *Evid.-based Complement. Altern. Med.*, 287358 (2013), show that vitamin K2 is able to suppress viability of androgen-dependent and androgen-independent prostate cancer cells both in vitro (LNCaP,DU145, and 22RV1 cells) and in vivo (mouse xenograft with LNCaP, DU145, and 22RV1 cells). (8) Kiely et al., "Real-time cell analysis of the inhibitory effect of vitamin K2 on adhesion and proliferation of breast cancer cells". *Nutr. Res.*, 35(8), 736-743 (2015), say that "The antitumor properties of VK derivatives have been reported in both hepatocellular carcinoma and glioblastoma" and show that dose-dependent growth inhibitory effects were seen with MK-4 in the triple-negative breast cancer cell line MDA-MB-231 and the HER2+ breast cancer cell line MDA-MB-453 in vitro. (9) Duan et al., "Vitamin K2 Induces Mitochondria-Related Apoptosis in Human Bladder Cancer Cells via ROS and JNKp38 MAPK Signal Pathways", *PLoS ONE,* 11(8), e0161886 (2016), say that "To date, abundant studies have shown that vitamin K2 can exhibit anticancer activity in various cancer cell lines, including leukemia, lung cancer, ovarian cancer, prostate cancer and hepatocellular cancer", and that in their studies MK-4 inhibited human bladder cancer cell lines (T24, J82 and EJ) in vitro and EJ in vivo (mouse xenograft). (10) Mishima, "A non-canonical vitamin K cycle is a potent ferroptosis suppressor", *Nature,* 608, 708-790 (2022), say that "Ferroptosis, a non-apoptotic form of cell death marked by iron-dependent lipid peroxidation, has a key role in organ injury, degenerative disease and vulnerability of therapy-resistant cancers" and that "the fully reduced forms of vitamin K—a group of naphthoquinones that includes menaquinone and phylloquinone confer a strong anti-ferroptotic function", acting "to protect cells against detrimental lipid peroxidation and ferroptosis".

Osteoporosis is a disease of bone that leads to an increased risk of fracture. In osteoporosis the bone mineral density (BMD) is reduced, bone micro architecture is disrupted, and the amount and variety of non-collagenous proteins in bone is altered. The World Health Organization define osteoporosis (in women) as a bone mineral density 2.5 standard deviations below peak bone mass, that is, for an average 30-year-old healthy female. Osteoporosis is most common in women after menopause (referred to as postmenopausal osteoporosis). Osteoporosis may also develop in men and may occur in anyone in the presence of particular hormonal disorders and other chronic diseases or as a result of medications, specifically glucocorticoids, when the disease is called steroid- or glucocorticoid-induced osteoporosis and as a result of nutritional deficiency states or other metabolic disorders, for example, hyponatremia or as a secondary consequence of cancer. Osteopenia is a condition where bone mineral density is lower than normal and is considered by many doctors to be a precursor to osteoporosis.

The underlying mechanism in most cases of osteoporosis is an imbalance between bone resorption and bone formation. The three main mechanisms by which osteoporosis develops include an inadequate peak bone mass (the skeleton develops insufficient mass and strength during growth), excessive bone resorption and inadequate formation of new bone during remodeling. Hormonal factors strongly determine the rate of bone resorption; lack of estrogen (e.g., as a result of menopause) increases bone resorption as well as decreasing the deposition of new bone that normally takes place in weight-bearing bones. In addition to estrogen, calcium metabolism plays a significant role in bone turnover, and deficiency of calcium and vitamin D leads to impaired bone deposition; in addition, the parathyroid glands react to low calcium levels by secreting parathyroid hormone, which increases bone resorption to ensure sufficient calcium in the blood. Medications used for the treatment of osteoporosis includes calcium, vitamin D, vitamin K, bisphosphonates, Calcitonin, Teriparatide, strontium ranelate, hormone replacement and selective estrogen receptor modulators.

It has been established that cardiovascular disease (CVD) is the most frequent cause of death in patients with chronic kidney disease (CKD). When compared to the general population, the cause of death attributed to CVD is about 10-20 times higher in CKD patients when they are being treated with hemodialysis. In addition, it has been demonstrated that vascular calcification and the correlated arterial stiffness is prevalent in the incidence of CVD. Accordingly, the disclosed method of treatment may be applicable for the treatment of peripheral arterial disease. In addition, patient with CKD undergoing dialysis treatment have a 3 times higher risk of bone fractures, such as vertebral fractures and other type of bone fractures.

It has been established that there exists a direct correlation between the level of vitamin K in a patient's blood and the incidence of vascular calcification, bone density and bone strength. Accordingly, the supplemental use of vitamin K, such as MK-7 and its fat-soluble hydroquinone (menaquinol) derivatives as disclosed herein, may provide significant clinical benefit for reducing vascular calcification noted, in part, by arterial stiffness, and increase bone mineralization or increase in bone mineral density, that will help treat or prevent CVD, and treat or prevent bone diseases in patients with CKD.

Nutritional doses of MK-7 and MK-9 can be established to be well absorbed in humans, and as a consequence, provide a significant increase in the serum for MK-7 levels.

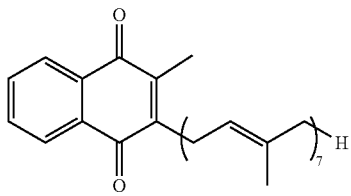

MK-7

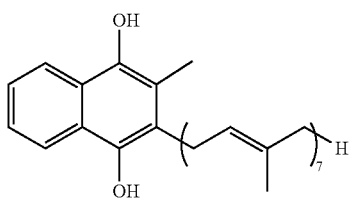

Menaquinol-7

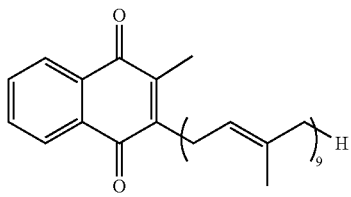

Menaquinone-9 (MK-9)

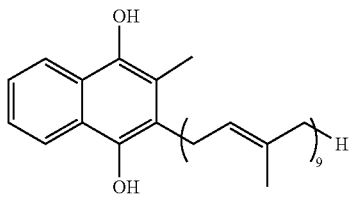

Menaquinol-9 (MKH2-9)

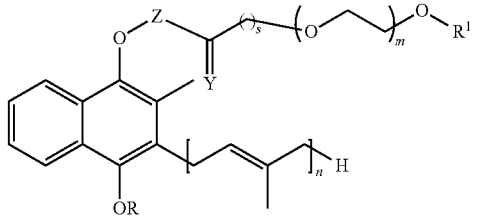

I

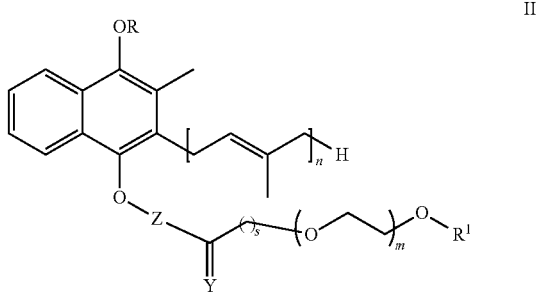

II

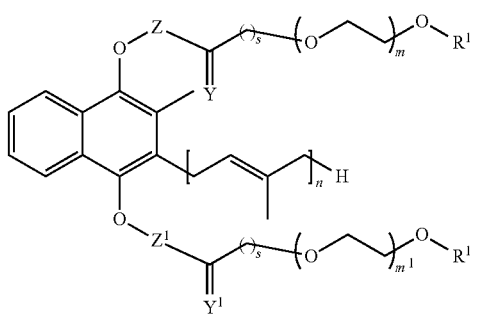

III

In one embodiment, the present application discloses novel, biologically effective menaquinol derivatives, such as menaquinol-7 derivatives and menaquinol-9 derivatives, including salts thereof, and their method of use for the treatment of various diseases.

The foregoing examples of the related art and limitations are intended to be illustrative and not exclusive. Other limitations of the related art will become apparent to those of skill in the art upon a reading of the specification and a study of the drawings or figures as provided herein.

SUMMARY OF THE INVENTION

The inventors recognize a continuing need for designing novel compounds and their formulations that are effective for the above disclosed indications. The following embodiments, aspects and variations thereof are exemplary and illustrative are not intended to be limiting in scope.

The inventors further expect that the novel PEGylated menaquinol derivatives of the next paragraph will display the same vitamin K2-like (or MK-4-like) activity in the diseases for which vitamin K2 and MK-4 have shown activity, and have similar utility in the treatment of these diseases.

In one embodiment, the present application discloses an isolated, stable and biologically active menaquinol derivative of the Formula I, II or III:

wherein:

m is an integer from 2 to 15; $m^1$, where present, is an integer from 3 to 15;

n is 7, 8, 9 or 10;

R is H, or is selected from the group consisting of —C(O)$C_1$-$C_6$ alkyl, —C(O)(CH$_2$)$_q$—O—C(O)$C_1$-$C_6$ alkyl and —Z—(C=Y)(CH$_2$)$_s$—(OCH$_2$CH$_2$)—O—$R^1$;

q is 1, 2 or 3; $R^1$ is H or —CH$_3$; $R^2$ is H or $C_1$-$C_3$ alkyl;

s is 1, 2 or 3; Y is O, NR$^2$ or S; Z is —C(O)CH$_2$O—, —C(O)CH$_2$NH— or is absent; and $Z^1$ is —C(O)CH$_2$O—, —C(O)CH$_2$NH— or is absent.

In one variation of each of the menaquinol derivative of the formula I, II or III, each of m or $m^1$ is independently 2 to 30. In another variataion, each of m or $m^1$ is independently 2, 3, 4, 5, 6, 7, 8, 9, 10, 11, 12, 13, 14 or 15. In another variation, each m and $m^1$ is independently 6, 7, 8, 9, 10 or 11. In another variation, each m and $m^1$ is independently 8, 9 or 10. In another variation, m or $m^1$ is independently 12, 14 or 15. In another variation, the $C_1$-$C_6$ alkyl is a —CH$_3$ or —CH$_2$CH$_3$. In another variation, the PEG group (i.e., polyethylene glycol group represented as —(OCH$_2$CH$_2$)$_m$— or —(CH$_2$OCH$_2$)$_m$—) has an average molecular weight of 200 Da (Daltons), 300 Da, 400 Da, 500 Da, 600 Da, 700 Da, 800 Da, 900 Da, 1 kDa (kilo Daltons), 1.5 kDa, 2 kDa, 3 kDa, 4 kDa or 5 kDa.

In one aspect, the menaquinol derivative is of the formula Ia, Ib or Ic:

Ia
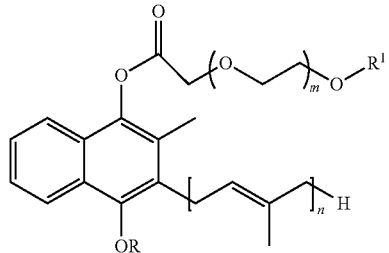

Ib
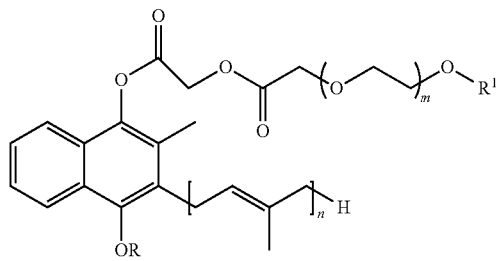

Ic
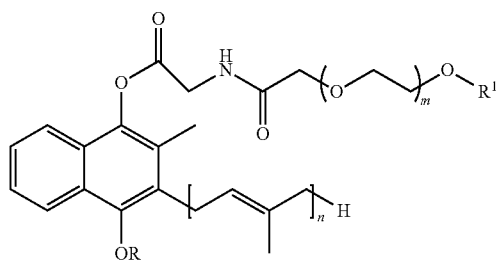

wherein:
- m is an integer from 2 to 15; n is 7, 8, 9 or 10;
- R is H, or is selected from the group consisting of —C(O)C$_1$-C$_6$ alkyl, —C(O)(CH$_2$)$_q$—O—C(O)C$_1$-C$_6$ alkyl and —Z—(C=Y)(CH$_2$)$_s$—(OCH$_2$CH$_2$)—O—R$^1$;
- q is 1, 2 or 3; s is 1, 2 or 3; R$^1$ is H or —CH$_3$; R$^2$ is H or C$_1$-C$_3$ alkyl;
- Y is O, NR$^2$ or S; and Z is —C(O)CH$_2$O—, —C(O)CH$_2$NH— or is absent.

In one variation of the menaquinol derivative of the formula Ia, R is CH$_3$C(O)—, m is 7, R$^1$ is —CH$_3$ and n is 7. In another variation of the formula Ia, R is CH$_3$C(O)—, m is 7, R$^1$ is —CH$_3$ and n is 9.

In another aspect, the menaquinol derivative is of the formula Ia.1, Ib.1 or Ic.1:

Ia.1
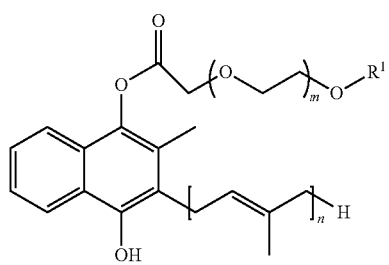

Ib.1
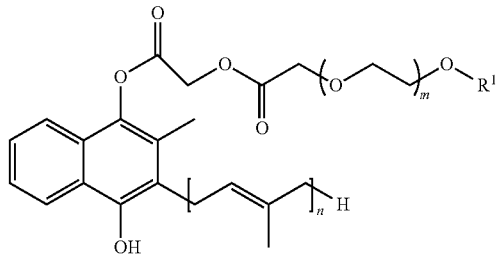

Ic.1
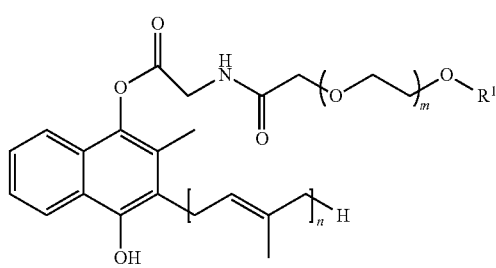

wherein: m is an integer from 8 to 12; n is 7, 8, 9 or 10; and R$^1$ is H or —CH$_3$.

In another aspect, the menaquinol derivative is of the formula IIa, IIb or IIc:

IIa
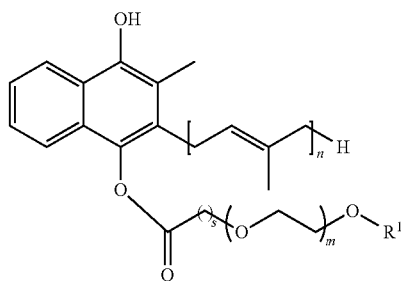

IIb
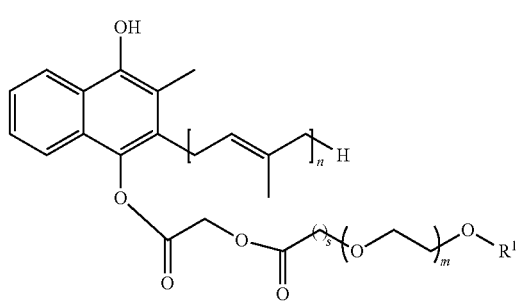

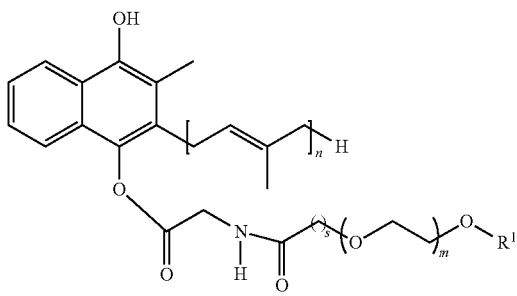

IIc wherein: m is an integer from 8 to 12; n is 7, 8, 9 or 10; s is 1, 2 or 3; and $R^1$ is H or —$CH_3$. In another variation, m is 2 to 7.

In yet another aspect, the menaquinol derivative is of the formulae Ia.1, Ib.1, Ic.1, Ia.2, Ib.2, Ic.2, IIa, IIb, IIc, IIa.1, IIb.1, IIc.1, IIa.1.1, IIb.1.1, IIc.1.1, IIa.1.2, IIb.1.2, IIc.1.2, IIa.2, IIb.2, IIc.2, IIa.3, IIb.3, IIc.3, IIa.4, IIb.4, IIc.4, IIa.5, IIb.5 and IIc.5. In one variation, $R^2$ is H or $CH_3$. In another variation, $R^2$ is $CH_3$. In another aspect of the above menaquinol derivative, n is 7. In another aspect, there is provided a pharmaceutical composition comprising a therapeutically effective amount of the above disclosed menaquinol derivatives or a mixture thereof; and a pharmaceutically acceptable excipient, wherein the composition is effective for the treatment of a condition associated with vitamin K selected for the treatment of osteoporosis, arteriosclerosis, calciphylaxis or tissue calcification, including soft tissue calcification.

In another variation of each of the above embodiments and aspects, n is 4, 5, 6, 7, 8, 9, 10, 11, 12, 13 or 14.

Treatment of COPD:

Chronic Obstructive Pulmonary Disease (COPD) is a term used to describe progressive lung disease that makes breathing difficult. The two primary forms of COPD are emphysema and chronic bronchitis. In addition, elastinolysis (proteolysis of elastin) is a key feature of COPD. It contributes to the loss of arterial flexibility and promotes calcification of the intimal media of blood vessels. It also has been shown to be a strong predictor of mortality in COPD patients (Rabinovich et al., (2016) Circulating desmosine levels do not predict emphysema progression but are associated with cardiovascular risk and mortality in COPD, ERJ Express doi: 10.1183/13993003.01824-2015). MGP has been demonstrated to inhibit the production of matrix metalloproteases that promote elastinolysis. Vitamin D may be a critical determinant of the rate of elastin degradation, and that low Vitamin D levels lead to low MGP activity that is inadequate to protect from elastinolysis (Piscaer et al., (2017) Vitamin D deficiency: the linking pin between COPD and cardiovascular diseases? Resp. Res. 18:189). Without wishing to be bound by the theory, enhanced production of activated (carboxylated) MGP by administration of vitamin K2, as disclosed herein, can act to suppress the deleterious effects of elastinolysis in a subject having COPD thereby to prevent, or slow the progression of, or reverse the one or more symptoms of COPD. In addition, the treatment of the degradation of elastin may be effective for the treatment of Covid, such as Covid-19 and variants thereof. Accordingly, the nanoparticle formulations as disclosed herein may be administered for the treatment or the prevention of the degradation of elastin, and diseases associated with the degradation of elastin.

In one embodiment, there is provided a method of treating, preventing, slowing the progression of, arresting and/or reversing tissue calcification or calciphylaxis in a mammal (or subject), the method comprising administering to the mammal at least 0.1 mg of the above described composition per day, to prevent, slow the progression of, and/or arrest tissue calcification, wherein the above described composition is administered in a pharmaceutical composition. In another embodiment, the application discloses a method for increasing the tissue concentration of menaquinol as a co-factor for gamma glutamate carboxylase (GGCX) for catalyzing the carboxylation of vitamin K dependent proteins that is associated with the treatment or prevention of osteoporosis, arteriosclerosis, calciphylaxis or tissue calcification in a patient in need thereof, the method comprising an administration of a therapeutically effective amount of a menaquinol derivative or a pharmaceutical composition comprising an effective amount of the above cited menaquinol derivative, or a mixture thereof.

In yet another aspect, there is provided a method for the treatment of a disease in a mammal selected from the group consisting of neurodegenerative diseases, retinopathy, rheumatoid polyarthritis, atherosclerosis, amyotrophic lateral sclerosis, cerebral ischemia, cataracts, systemic infections, pathologies associated with cutaneous aging and with senescence in tissues, pathologies associated with mitochondrial dysfunction, cachexia associated with under nutrition, wherein the treatment is associated with the increase in the longevity of mammals, the method comprises the administration of a therapeutically effective amount of a compound or composition comprising the above cited menaquinol derivative, or a mixture thereof.

In yet another aspect, there is provided a method for treating a mammal with a disease selected from the group consisting of vitamin K deficiency, osteoporosis, a proliferative disease, and a cardiovascular disease, comprising administering to the mammal a therapeutically effective amount of the above cited menaquinol derivative, or a mixture thereof. In another aspect of the method, the proliferative disease is selected from the group consisting of cancer, leukemia and an inflammatory disease.

In another aspect, there is provided a method for the treatment or prevention of osteoporosis and/or osteopenia, the method comprising administering to a patient in need of treatment, a therapeutically effective amount of a composition comprising the above cited menaquinol derivative, or a mixture thereof. In yet another aspect, there is provided a method of treating, preventing, slowing the progression of, arresting, and/or reversing calciphylaxis in a mammal in need thereof, the method comprising administering to the mammal a therapeutically effective amount of a composition comprising substantially pure menaquinol derivative as disclosed above, or a mixture thereof, and a pharmaceutically acceptable excipient, to prevent, slow the progression of, arrest, or reverse calciphylaxis. In another aspect of the method, the mammal has distal calciphylaxis and/or central calciphylaxis. In yet another aspect of the method, the mammal has diabetes, chronic kidney disease or end stage renal disease. In another aspect of the method, the mammal has stage 3, stage 4 or stage 5 chronic kidney disease. In another aspect of the above, the mammal is undergoing hemodialysis. In yet another aspect, the mammal is receiving non-warfarin-based anti-coagulant therapy. In yet another aspect, the anti-coagulant therapy is oral anti-coagulation therapy. In another aspect, the anti-coagulation therapy comprises an inhibitor of Factor Xa activity selected from apixaban, rivaroxaban, betrixaban, edoxaban, otamixaban, letaxaban, eribaxaban or fondaparinux; or Factor IIa activity selected from dabigratran or argatroban.

In another aspect of the above methods, the mammal has chronic obstructive pulmonary disease (COPD). In another aspect, the mammal has a calciphylaxis-related dermal lesion. In another aspect of the method, the administration of the composition reduces the total surface area of the dermal lesion by at least 10%, 20%, 30%, 40%, 50%, 60%, 70%, 80%, 90% or 100%. In yet another aspect of the method, the administration of the compound as disclosed above or a mixture thereof, to the mammal increases the mammal's serum T50 value by at least 10%, 20%, 30%, 40%, 50%, 60%, 70%, 80%, 90% or 100% relative to the mammal's serum T50 value prior to administration of the above disclosed compound, or a mixture thereof. In yet another aspect, the administration of the above compound, or a mixture thereof, increases a ratio of a carboxylated to a non-carboxylated of a Vitamin K dependent protein in plasma of the mammal after administration of the composition is greater than prior to administration of the composition.

In another aspect, there is provided a method of treating, preventing, slowing the progression of, arresting and/or reversing tissue calcification in a pre-diabetic mammal (or subject) with diabetes, chronic kidney disease or a combination thereof, and in need thereof, the method comprising administering to the mammal at least 50 mg of a compound as disclosed above, or a mixture thereof per day, to prevent, slow the progression of, and/or arrest tissue calcification, wherein the above disclosed compound or a mixture thereof, is administered in a pharmaceutical composition. In one aspect of the method, the mammal has diabetes. In another aspect of the method, the mammal has type II diabetes; or the mammal has been diagnosed as pre-diabetic. In yet another aspect, the mammal has chronic kidney disease; or the mammal has stage 4 or 5 chronic kidney disease/end stage renal disease. In another aspect of the method, the mammal is undergoing hemodialysis; or the mammal is receiving non-warfarin based anti-coagulant therapy. In one variation, the anti-coagulant therapy is oral anti-coagulation therapy. In another aspect of the method, the anti-coagulation therapy comprises an inhibitor of Factor Xa activity selected from apixaban, rivaroxaban, betrixaban, edoxaban, otamixaban, letaxaban, eribaxaban or fondaparinux; or Factor IIa activity selected from dabigratran or argatroban.

In another aspect, there is provided a method of treating, preventing, slowing the progression of, arresting, and/or reversing tissue calcification in a mammal undergoing hemodialysis, and in need thereof, the method comprising administering to the mammal at least 5 mg of the compound of any of the above cited compounds, or a mixture thereof, per day, thereby to prevent, slow the progression, arrest, and/or reverse tissue calcification, wherein the above compounds, or a mixture thereof is administered in a pharmaceutical composition. In another aspect of the method, the mammal has diabetes.

In another aspect, there is provided a method for increasing at least one of the bioavailability and serum half-life of a menaquinone-7/menaquinol-7, menaquinone-8/menaquinol-8, menaquinone-9/menaquinol-9 or menaquinone-10/menaquinol-10, the method comprising the administration or supplementation of the above cited compounds, or compositions thereof, to a mammal in need thereof, wherein the method increases the at least one of the bioavailability and serum half-life of a menaquinone-7/menaquinol-7, menaquinone-8/menaquinol-8, menaquinone-9/menaquinol-9 or menaquinone-10/menaquinol-10, by at least 5%, when compared to the administration or supplementation using the respective menaquinone-7, menaquinone-8, menaquinone-9 or menaquinone-10.

In yet another aspect, there is provided a method for the treatment of at least one of a wound, or area of pain and inflammation, resulting from calciphylaxis or tissue calcification in a subject in need thereof, the method comprising a topical application of a dermal structure or a transdermal patch to the wound or area of pain and inflammation of the subject, wherein the dermal structure or transdermal patch comprises any of the above cited compounds, to treat the wound, area of pain and inflammation. In one variation of the method, the topical application of the dermal structure or transdermal patch is performed before, in conjunction with (or concurrently), or after the above cited method.

In another embodiment, there is provided a method for treating cancer where the cancer is selected from the group consisting of melanoma, lung cancer, breast cancer, leukemia, neuroblastoma, glioblastoma, cervical, liver (hepatocellular carcinoma, HCC), colorectal, pancreatic, bladder, renal, prostate, ovarian, and head and neck cancer.

In another embodiment, there is provided a pharmaceutical composition comprising a therapeutically effective amount of a menaquinol derivative of formulae I, II and III of any one of the above embodiments, aspect and variations, or a mixture of the menaquinol derivatives thereof; and a pharmaceutically acceptable excipient, wherein the composition is effective for the treatment of a condition associated with vitamin K selected for the treatment of osteoporosis, arteriosclerosis, calciphylaxis or tissue calcification. As used herein, unless specifically noted otherwise, the menaquinol compounds or derivatives of the formulae I, II and III includes the menaquinol derivatives (or compounds) as disclosed herein, including the formulae Ia.1, Ib.1, Ic.1, Ia.2, Ib.2, Ic.2, Ia, IIb, IIc, IIa.1, IIb.1, IIc.1, IIa.1.1, IIb.1.1, IIc.1.1, IIa.1.2, IIb.1.2, IIc.1.2, IIa.2, IIb.2, IIc.2, IIa.3, IIb.3, IIc.3, IIa.4, IIb.4, IIc.4, IIa.5, IIb.5 and IIc.5; and III. In one variation of the pharmaceutical composition, the composition comprises sunflower oil. In another variation of the pharmaceutical composition, the composition comprises an oil selected from the group consisting of sunflower oil, corn oil, vegetable oil (such as jojoba oil), or combinations thereof. In another variation, the composition comprises an oil selected from the group consisting of canola oil, coconut oil, cotton seed oil, olive oil, palm oil, peanut oil, rape seed oil, safflower seed oil, sesame oil, bean oil, heliotrope oil, almond oil, cashew nut oil, hazelnut oil, walnut oil, hickory nut oil, pine nut oil, pistachio oil, castor oil and combinations thereof.

In another embodiment, there is provided a method for increasing the tissue concentration of menaquinol as a co-factor for gamma glutamate carboxylase (GGCX) for catalyzing the carboxylation of vitamin K dependent proteins that is associated with the treatment or prevention of osteoporosis, arteriosclerosis, calciphylaxis or tissue calcification in a patient in need thereof, the method comprising an administration of a therapeutically effective amount of a menaquinol derivative or a pharmaceutical composition comprising an effective amount of a menaquinol derivative of any one of the above menaquinol derivatives, or a mixture thereof.

In one variation, the method increases the tissue concentration of menaquinol by at least 20%, 30%, 40%, 50%, 60%, 70% or more, when compared to the administration of the corresponding menaquinone. In another variation, the method increases the tissue concentration of menaquinol by at least 40% or 50%, when compared to the administration of the corresponding menaquinone. In another variation, the method increases the tissue concentration of menaquinol by at least 20%, 30%, 40%, 50%, 60%, 70% or more, when compared to the administration of the corresponding menaquinone, and provides optimal benefits at the tissue level, such as at least one of the skin or dermis tissue, the mitral valve, the aortic valve and the blood vessels.

In another embodiment, there is provided a method for the treatment of a disease in a mammal selected from the group consisting of neurodegenerative diseases, retinopathy, rheumatoid polyarthritis, atherosclerosis, amyotrophic lateral sclerosis, cerebral ischemia, cataracts, systemic infections, pathologies associated with cutaneous aging and with senescence in tissues, pathologies associated with mitochondrial dysfunction, cachexia associated with under nutrition, wherein the treatment is associated with the increase in the longevity of mammals, the method comprises the administration of a therapeutically effective amount of a compound or composition comprising a menaquinol derivative of any one of the above embodiment, aspect and variations, or a mixture of the above menaquinol derivatives.

In another embodiment, there is provided a method for treating a mammal with a disease selected from the group consisting of vitamin K deficiency, osteoporosis, a proliferative disease, and a cardiovascular disease, comprising administering to the mammal a therapeutically effective amount of any of the above menaquinol derivatives, or a mixture thereof. In one aspect of the method, the proliferative disease is selected from the group consisting of cancer, leukemia and an inflammatory disease.

In another embodiment, there is provided a method for the treatment or prevention of osteoporosis and/or osteopenia, the method comprising administering to a patient in need of treatment, a therapeutically effective amount of a composition comprising a menaquinol derivative of any one of the above embodiments, aspect and variations, or a mixture of the above cited menaquinol derivatives.

In another embodiment, there is provided a method of treating, preventing, slowing the progression of, arresting, and/or reversing calciphylaxis in a mammal in need thereof, the method comprising administering to the mammal a therapeutically effective amount of a composition comprising substantially pure menaquinol derivative of any of the above menaquinol derivatives, or a mixture thereof, and a pharmaceutically acceptable excipient, to prevent, slow the progression of, arrest, or reverse calciphylaxis. In one aspect of the above method, the mammal has distal calciphylaxis and/or central calciphylaxis. In another aspect of the method, the mammal has diabetes, chronic kidney disease or end stage renal disease. In another aspect of the method, the mammal has stage 3, stage 4 or stage 5 chronic kidney disease. In yet another aspect of the method, the mammal is undergoing hemodialysis. In another aspect of the method, the mammal is receiving non-warfarin-based anti-coagulant therapy. In yet another aspect of the method, the anti-coagulant therapy is oral anti-coagulation therapy. In another aspect of the method, the anti-coagulation therapy comprises an inhibitor of Factor Xa activity selected from apixaban, rivaroxaban, betrixaban, edoxaban, otamixaban, letaxaban, eribaxaban or fondaparinux; or Factor IIa activity selected from dabigratran or argatroban.

In yet another aspect of the above method, the mammal has chronic obstructive pulmonary disease (COPD). In another aspect of the method, the mammal has a calciphylaxis-related dermal lesion. In yet another aspect of the method, the administration of the composition reduces the total surface area of the dermal lesion by at least 10%, 20%, 30%, 40%, 50%, 60%, 70%, 80%, 90% or 100%. As used herein, the method results in the reduction of the surface area of the dermal lesion, which constitute a healing of the skin or a healing of the wound; or accordingly, the method enhances or accelerates wound healing. Accordingly, such method is generally applicable for wound healing, such as wounds resulting in burns of the skin (or burns), ulcers, and generally wound resulting from trauma, skin cancers, infection and cosmetic surgery. In addition, as disclosed below, the above methods may be used in conjunction with or concurrently with, the topical administration of the compositions to further enhance wound healing.

In another aspect of the above method, the administration of the compound of any one of any of the menaquinol derivatives (or compounds) or mixtures of the above embodiments, aspect and variations, to the mammal increases the mammal's serum T50 value by at least 10%, 20%, 30%, 40%, 50%, 60%, 70%, 80%, 90% or 100% relative to the mammal's serum T50 value prior to administration of the above disclosed compounds, or a mixture thereof.

In yet another aspect of the method, administration of the menaquinol compounds of any one of the above embodiments, aspect and variations, increases a ratio of a carboxylated to a non-carboxylated of a Vitamin K dependent protein in plasma of the mammal after administration of the composition is greater than prior to administration of the composition.

In yet another embodiment, there is provided a method of treating, preventing, slowing the progression of, arresting and/or reversing tissue calcification in a pre-diabetic mammal (or subject) with diabetes, chronic kidney disease or a combination thereof, and in need thereof, the method comprising administering to the mammal at least 50 mg per day of a compound of any one of the above embodiments, aspect or variations thereof, to prevent, slow the progression of, and/or arrest tissue calcification, wherein the above recited compounds, or a mixture thereof, is administered in a pharmaceutical composition. In another aspect of the method, the mammal has diabetes. In another aspect of the method, the mammal has type II diabetes.

In yet another aspect of the above method, the mammal has been diagnosed as pre-diabetic. In another aspect of the method, the mammal has chronic kidney disease. In yet another aspect of the method, the mammal has stage 4 or 5 chronic kidney disease/end stage renal disease. In yet another aspect of the method, the mammal is undergoing hemodialysis. In another aspect of the method, the mammal is receiving non-warfarin based anti-coagulant therapy. In another aspect of the method, the anti-coagulant therapy is oral anti-coagulation therapy. In another aspect, the anti-coagulation therapy comprises an inhibitor of Factor Xa activity selected from apixaban, rivaroxaban, betrixaban, edoxaban, otamixaban, letaxaban, eribaxaban or fondaparinux; or Factor IIa activity selected from dabigratran or argatroban.

In another embodiment, there is provided a method of treating, preventing, slowing the progression of, arresting, and/or reversing tissue calcification in a mammal undergoing hemodialysis, and in need thereof, the method comprising administering to the mammal at least 5 mg per day of the compound of any one of the above embodiments, aspects and variations, thereby to prevent, slow the progression, arrest, and/or reverse tissue calcification, wherein the compound or a mixtures thereof of any one of the above embodiments, aspects and variations, is administered in a pharmaceutical composition. In another aspect, the mammal has diabetes.

In another embodiment, there is provided a method for increasing at least one of the bioavailability and serum half-life of a menaquinone-7/menaquinol-7, menaquinone-8/menaquinol-8, menaquinone-9/menaquinol-9 or menaquinone-10/menaquinol-10, the method comprising the administration or supplementation of the compounds or compositions of any of the above embodiments, aspect and variations thereof, to a mammal in need thereof, wherein the method increases the at least one of the bioavailability and serum half-life of a menaquinone-7/menaquinol-7, menaquinone-8/menaquinol-8, menaquinone-9/menaquinol-9 or menaquinone-10/menaquinol-10, by at least 5%, when compared to the administration or supplementation using menaquinone-7, menaquinone-8, menaquinone-9 or menaquinone-10. Alzheimer's Disease, Apoptosis and Treatment of Cancer:

Alzheimer's Disease (AD) is a devastating neurodegenerative disorder. Its sporadic forms affect an elderly population (sharp increase in incidence at >75 years of age), in addition, there are various familial forms with an onset of the disease in the fourth or fifth decade of life. AD is characterized by the presence of extracellular senile plaques, and intracellular neurofibrillar tangles in patient's brains. The core constituent of the senile plaques are small, 4 kDa amyloid peptides, which are generated by the proteolytic processing of a large transmembrane protein, amyloid precursor protein (APP). Cleavage of APP by beta-secretase (BACE-1) releases the soluble APP-beta fragment, while the 99-amino acid long C-terminus remains tethered to the membrane. This C-terminal fragment is subsequently proteolytically processed by gamma-secretase (a membrane multi-enzyme complex) to generate amyloid peptides of various length, predominantly 40 and 42 amino acids long (Hardy J. et al. (2002) Science: 297 (5580):353-356). In one embodiment, the treatment of a disease or condition, using the composition as disclosed herein, is mediated by BACE-1, BACE-2 or cathepsin D activity, such as Alzheimer's Disease, mild cognitive impairment, impaired glucose tolerance or type 2 diabetes. In one variation, the disclosed method may be employed for the treatment of calcification in the brain.

It has been shown that β-amyloid (Aβ) leads to neuronal death by promoting apoptosis and also by direct toxicity. Hadipour, E. et al. *Vitamin K2 Protects PC12 Cells against Aβ (1-42) and $H_2O_2$-Induced Apoptosis via P38 MAP Kinase Pathway*. Nutr. Neurosci. 2020, 23, 343-352. Neurotoxicity occurs through a variety of mechanisms, including the disruption of calcium homeostasis, oxidative stress and mitochondrial dysfunction. In PC12 cells derived from a rat pheochro-mocytoma, vitamin K2 prevented neuronal death resulting from Aβ(1-42), the most neuro-toxic form of Aβ. Experimentally, it was also demonstrated that when cells were exposed to either hydrogen peroxide ($H_2O_2$) or Aβ(1-42), the cells that were pretreated with vitamin K2 exhibited significantly less apoptosis. Pretreatment with vitamin K2 also decreased the amount of apoptosis signaling proteins, including a lower Bax/Bcl-2 ratio, reduced the presence of reactive oxygen species (ROS), and increased the amount of glutathione, which is an anti-oxidant. Yagami, T. *Gas6 Rescues Cortical Neurons from Amyloid β Protein-Induced Apoptosis* Neuropharmacology 2002, 43, 1289-1296. The researchers determined that the inactivation of the p38 MAP kinase pathway was a mechanism for the potential protective role of VK2 in Alzheimer's disease (AD).

The researchers observed that an increase in the concentration of vitamin K2VK2, cells exhibited prolonged survival presumably because of their protection against Aβ-induced neuronal death. It was also noted that this effect was reversible upon the addition of warfarin, which prevents vitamin K-dependent carboxylation. VK2 was observed to reduce the number of ROS in a dose-dependent manner and, at a concentration of 10 mcmol/L, decreased by 2.5-fold the activity of caspase-3, an enzyme that mediates Aβ-induced apoptosis. The authors also found that Gas6 plays a role in VK2 protection against Aβ cytotoxicity; which confirmed that, based on the measured Ca(2+) influx, chromatin condensation, and DNA fragmentation as markers for Aβ neurotoxicity and apoptosis in rat embryo neuronal cell cultures. Gas6 inhibited the influx of Ca(2+) in a dose-dependent manner and significantly decreased the amount of chromatin condensation and DNA fragmentation caused by Aβ. Accordingly, there is a clear correlation between the antioxidant properties and anti-apoptotic properties of vitamin K2, which is associated with the process of programmed cell death as an effective mechanism associated with the treatment of cancers.

Targeting apoptosis is also effective for all types of cancer, as apoptosis evasion is a hallmark of cancer. Apoptosis is also nonspecific to the cause or type of the cancer. See Villa-Pulgarin J. A. et al. *Mitochondria and lipid raft-located $F_oF_1$-ATP synthase as major therapeutic targets in the antileishmanial and anticancer activities of ether lipid edelfosine*. PLoS Negl. Trop. Dis. 2017; 11:e0005805. doi: 10.1371/journal.pntd.0005805; Elmore S. Apoptosis: A review of programmed cell death. Toxicol. Pathol. 2007; 35:495-516. doi: 10.1080/01926230701320337.

Vitamin K2 has also been used in clinical applications to supplement the treatment of cancers. XV, F. et al, *Research Progress on the anticancer effects of vitamin K2* (Review). Oncol. Lett. 2018, 15, 8926-8934. In addition, vitamin K2 supplementation have been found to prevent the growth and metastasis of multiple cancer lines. See Xia, J. et al, *The role of PKC isoforms in the inhibition of NF-κB activation by vitamin K2 in human hepatocellular carcinoma cells*. J. Nutr. Biochem. 2012m 23, 1668-1675; Showalter, S. L. et al., *Naturally occurring K vitamins inhibit pancreatic cancer cell survival through a caspase-dependent pathway*. J. Gastroenterol. Hepatol. 2010, 25, 738-744. Enomoto, M. et al. *Vitamin K2-induced cell growth inhibition via autophagy formation in cholangiocellular carcinoma cell lines*. Int. J. Mol. Med. 2007, 20, 801-808; Jinghe, X., *Vitamin K and hepatocellular carcinoma: The basic and clinic*. World J. Clin. Cases 2015, 3, 757-764. Sada, E. et al. *Vitamin K2 modulates differentiation and apoptosis of both myeloid and erythroid lineages*. Eur. J. Haematol. 2010, 85, 538-548; Yaguchi, M. et al., *Vitamin K2 and its derivatives induce apoptosis in leukemia cells and enhance the effect of all-trans retinoic acid*. Leukemia 1997, 11, 779-787.

In fact, it was determined that the intake of MK-4 and MK5 to MK-9 was inversely associated with cancer mortality. In particular, in a male cohort study, there was an inverse association between the incidence of advanced protate cancer and MK intake, particularly MK-5 to MK-9. Nimptsch, K. et al. (2008) *Dietary intake of vitamin K and risk of prostate cancer in the Heidelberg cohort of the European Prospective Investigation into Cancer and Nutrition* (EPIC-Heidelberg). Am. J. Clin. Nutr. 87, 985-992. Nimptsch, K. et al. (2010) *Dietary vitamin K intake in relation to cancer incidence and mortality: results from the Heidelberg cohort of the European Prospective Investigation into Cancer and Nutrition* (EPIC-Heidelberg). Am. J.

Clin. Nutr. 91, 1348-1358. In a nested case-control follow-up study, undercarboxylation of osteocalcin (a marker of inadequate vitamin K status) was significantly higher in cases with advanced or high-grade prostate cancer versus controls. Nimptsch, K. et al. (2009) *Serum undercarboxylated osteocalcin as biomarker of vitamin K intake and risk of prostate cancer: a nested case-control study in the Heidelberg cohort of the European Prospective Investigation into Cancer and Nutrition.* Cancer Epidemiol. Biomark. Prev. 18, 49-56. Wang et al. also reported a positive association between the intake of MKs and the risk of breast cancer incidence and death, particularly for luminal-like, triple-negative, and early-stage disease. Wang, K. et al. (2021) *Vitamin K intake and breast cancer incidence and death: results from a prospective cohort study.* Clin. Nutr. 40, 3370-3378. Accordingly, in one variation, there is provided a method for the treatment of cancer, such as prostate cancer, by the administration of a therapeutically effective amount of the disclosed composition to control or reduce the high level of undercarboxylation of osteocalcin. Stability of the Compounds in SGF, FaSSIF and FeSSIF:

Stability of the disclosed compounds, such as the disclosed compounds as tested may be determined in Simulated gastric fluid (SGF, pH-1.2), Fasted state simulated intestinal fluid (FaSSIF, pH-6.5) and Fed state simulated intestinal fluid (FeSSIF, pH-5) at 0, 30, 60, 120 and 240 minutes. The % of compound disappearing over time may be calculated by comparing to peak areas of analyte at '0' minute by HPLC/LCMS analysis. Formation of the menaquinone, such as menaquinone-7 (i.e., MK-7) from the compounds tested, as disclosed herein, was observed.

The stability of the disclosed compounds of the formula I, II or III as tested, noting SGF (pH 1.2); FaSSIF (pH 6.5) and FeSSIF (pH 5.0) noting the % compounds remaining as compared to 0 min, at time intervals of t=0, 30 mins, 60 mins, 120 mins and 240 mins.

The stability of the disclosed compounds of the formula I, II or III as tested, noting SGF (pH 1.2); FaSSIF (pH 6.5) and FeSSIF (pH 5.0) noting the formation of menaquinone-7, in terms of Fold change compared to 0 min, at time intervals of t=0, 30 mins, 60 mins, 120 mins and 240 mins.

The stability of the disclosed compounds of the formula I, II or III as tested is determined in simulated gastric fluid (SGF, pH-1.20), Fasted state simulated intestinal fluid (FaSSIF, pH-6.5) and Fed state simulated intestinal fluid (FeSSIF, pH-5) at 0, 30, 60, 120 and 240 minutes. The % of the compound disappearing over time was calculated by comparing to peak areas of analyte at '0' minute by HPLC/LCMS analysis. Formation of menaquinone-7 from the tested was observed.

Stability in Human and Rat Plasma: Disclosed compounds are stable over time.

The stability of the disclosed compounds of the formula I, II or III, as tested is determined in Human and Rat plasma ($K_2EDTA$) at 0, 15, 30, 60 and 120 minutes. The % of compound disappearing over time is calculated by comparing to 0 minute by HPLC/LC-MS-MS analysis. Formation of menaquinone-7 from the tested compounds are noted at time intervals of t=0, 30 mins, 60 mins and 120 mins.

The stability of the disclosed compounds of the formula I, II or III, as tested is determined in Human and Rat plasma ($K_2EDTA$) at 0, 15, 30, 60 and 120 minutes. The formation of menaquinone-7, based on Fold change compared to 0 mins, is calculated by comparing to 0 minute by HPLC/LC-MS-MS analysis. The % of the tested compound remaining is observed at time intervals of t=0, 30 mins, 60 mins and 120 mins.

The stability of the disclosed compounds of the formule I, II or III, as tested is determined in Human and Rat plasma ($K_2EDTA$) at 0, 15, 30, 60 and 120 minutes. The stability of the tested compounds, based on the formation of menaquinone-7 and based on Fold change compared to 0 mins, is calculated by comparing to 0 minute by HPLC/LC-MS-MS analysis, and is observed at time intervals of t=0, 30 mins, 60 mins and 120 mins.

The stability of the disclosed compounds of the formula I, II or III, as tested, was determined in Human and Rat plasma ($K_2EDTA$) at 0, 15, 30, 60 and 120 minutes. The % of compound disappearing over time are calculated by comparing to 0 minute by HPLC/LC-MS-MS analysis. Formation of menaquinone-7 from the tested compounds are noted.

In Vivo Testing:

Male Sprague Dawley rats aged 8-10 weeks and weighing around 202-223 grams are used for in vivo testing. Animals are fasted overnight with free access to water. Animals are split into 4 groups G1 to G4, each group containing 3 rats. To determine the bioavailability, the test items are separately dissolved in corn oil to obtain homogenous formulations. Animals are administered with test items by oral gavage, animals of G1 received 1088 µg, G2 received 1073 µg, G3 and G4 received 1000 µg per kg body weight dose of compound Ia.1, m=9, n=7 (G1), of compound Ia.1, m=9, n=9 (G2), menaquinone-7 (G3) and menaquinone-9 (G4) respectively. The doses of Ia.1 (n=7) (G1), of Ia.1 (n=9) were adjusted for the menaquinol content. Blood samples are collected at various time points during the next 48 hours post dose.

Blood samples were collected and transferred to tubes containing $K_2EDTA$ and immediately placed on ice for plasma preparations. Plasma was prepared by centrifugation at 3500 g for 10 min, aliquots are frozen at −80° C. until analysis. Quantification of analyte in plasma is determined by LC-MS-MS analysis. Plasma PK parameters are calculated using WinNonlin software.

In another embodiment, the application discloses a pharmaceutical composition comprising a therapeutically effective amount of a menaquinol derivative of any one of the above embodiments and aspects, or a mixture thereof; and a pharmaceutically acceptable excipient, wherein the composition is effective for the treatment of a condition associated with vitamin K selected for the treatment of osteoporosis, arteriosclerosis, calciphylaxis or tissue calcification.

In another embodiment, the application discloses a method for increasing the tissue concentration of menaquinol as a co-factor for gamma glutamate carboxylase (GGCX) for catalyzing the carboxylation of vitamin K dependent proteins that is associated with the treatment or prevention of osteoporosis, arteriosclerosis, calciphylaxis or tissue calcification in a patient in need thereof, the method comprising an administration of a therapeutically effective amount of a menaquinol derivative or a pharmaceutical composition comprising an effective amount of a menaquinol derivative as disclosed above, or a mixture thereof.

In one variation of the method, the administration of the menaquinol derivative overcomes the oxidative block in patients with CKD and in patients receiving hemodialysis and provides maximal levels of menaquinol and maximal benefits at the tissue level. In one variation, the tissue is the skin or dermis tissue. In another variation, the tissue is at least of the patient's mitral valve, the patient's aortic valve and blood vessels. In another variation of the method, the menaquinol derivative is a compound of the formula I, II or III, or mixture thereof. In another variation, the method increases the tissue concentration of the corresponding menaquinol by at least 20%, 30%, 40%, 50%, 100%, 150%, 200%, 250%, 300%, 400% or 500% or more when compared to the administration of the corresponding menaquinone. In another variation, the method increases the tissue concentration of menaquinol by at least 40% or 50% when compared to the administration of the corresponding menaquinone. The term "corresponding menaquinone" means, for example, when the menaquinol derivative is a MK-7 derivative, then the "corresponding menaquinone" would be MK-7; and when the menaquinol derivative is a MK-10 derivative, then the corresponding menaquinone would be MK-10.

In another embodiment, the application discloses a method for the treatment of a disease in a mammal selected from the group consisting of neurodegenerative diseases, retinopathy, rheumatoid polyarthritis, atherosclerosis, amyotrophic lateral sclerosis, cerebral ischemia, cataracts, systemic infections, pathologies associated with cutaneous aging and with senescence in tissues, pathologies associated with mitochondrial dysfunction, cachexia associated with under nutrition, wherein the treatment is associated with the increase in the longevity of mammals, the method comprises the administration of a therapeutically effective amount of a compound or composition comprising a menaquinol derivative of the formula I, II or III, inclusive of all disclosed compounds, or a mixture thereof. As noted above, the menaquinol compounds or derivatives of the formula I, II or III, includes the menaquinol derivatives (or compounds) as disclosed herein and of the formulae Ta, b, Ic, Ia.1, Ib.1, Ic.1, IA, IIb and IIc; and those compounds as disclosed herein.

In another aspect, the application discloses a method for treating a mammal with a disease selected from the group consisting of vitamin K deficiency, osteoporosis, a proliferative disease, and a cardiovascular disease, comprising administering to the mammal a therapeutically effective amount of a menaquinol derivative as disclosed above, or a mixture thereof. In another aspect of the method, the proliferative disease is selected from the group consisting of cancer, leukemia and an inflammatory disease. In one variation of the method, the cancer is melanoma and lung cancer. In another variation, the cancer is selected from the group consisting of leukemia, neuroblastoma, glioblastoma, cervical, liver (hepatocellular carcinoma, HCC), colorectal, pancreatic, bladder, renal and melanoma. In another aspect of the method, the cancer is selected from the group consisting of lung, breast, prostate, ovarian and head and neck.

In another aspect, the application discloses a method for the treatment or prevention of osteoporosis and/or osteopenia, the method comprising administering to a patient in need of treatment, a therapeutically effective amount of a composition comprising a menaquinol derivative of the formula I, II or III, or a mixture thereof.

In another aspect, the application discloses a method of treating, preventing, slowing the progression of, arresting, and/or reversing calciphylaxis in a mammal in need thereof, the method comprising administering to the mammal a therapeutically effective amount of a composition comprising substantially pure menaquinol derivative of the formula I, II or III, or a mixture thereof, and a pharmaceutically acceptable excipient, to prevent, slow the progression of, arrest, or reverse calciphylaxis. In another aspect of the method, the mammal has distal calciphylaxis and/or central calciphylaxis. In another aspect of the method, the mammal has diabetes, chronic kidney disease or end stage renal disease. In another aspect of the method, the mammal has stage 3, stage 4 or stage 5 chronic kidney disease. In another aspect of the methods, the mammal is undergoing hemodialysis. In yet another aspect of the method, the mammal is receiving non-warfarin-based anti-coagulant therapy. In another aspect of the method, the anti-coagulant therapy is oral anti-coagulation therapy. In yet another aspect of the method, the anti-coagulation therapy comprises an inhibitor of Factor Xa activity selected from apixaban, rivaroxaban, betrixaban, edoxaban, otamixaban, letaxaban, eribaxaban or fondaparinux; or Factor IIa activity selected from dabigatran or argatroban.

In another aspect of the above methods, the mammal has chronic obstructive pulmonary disease (COPD). In another aspect of the methods, the mammal has a calciphylaxis-related dermal lesion. In another aspect, the administration of the composition reduces the total surface area of the dermal lesion by at least 10%, 20%, 30%, 40%, 50%, 60%, 70%, 80%, 90% or 100%. In another aspect of the method, the administration of the compound of the formula I, II or III, or a mixture thereof, to the mammal increases the mammal's serum T50 value by at least 10%, 20%, 30%, 40%, 50%, 60%, 70%, 80%, 90% or 100% relative to the mammal's serum T50 value prior to administration of the above compound, or a mixture thereof. In yet another aspect of the method, the administration of the compound of the formula I, II or III, or a mixture thereof, increases a ratio of a carboxylated to a non-carboxylated of a Vitamin K dependent protein in plasma of the mammal after administration of the composition is greater than prior to administration of the composition.

In another embodiment, there is provided a method of treating, preventing, slowing the progression of, arresting and/or reversing tissue calcification in a pre-diabetic mammal (or subject) with diabetes, chronic kidney disease or a combination thereof, and in need thereof, the method comprising administering to the mammal at least 50 mg of a compound of the formula I, II or III, or a mixture thereof per day, to prevent, slow the progression of, and/or arrest tissue calcification, wherein the above compounds, or a mixture thereof, is administered in a pharmaceutical composition.

In each of the above recited methods, the specification also discloses the recited compounds or compositions thereof, for use as a medicament in the treatment of the recited medical conditions or diseases; and the specification discloses the use of the recited compounds in the manufacture of a formulation or medicament for the treatment of the disclosed medical conditions or diseases.

In one variation, the menaquinol derivative is administered at a dose of at least 1 mg, 3 mg, 5 mg, 10 mg, 20 mg, 30 mg, 40 mg or 50 mg. In another variation, the menaquinol derivative is administered at a dose of at least 100 mg, 150 mg, 200 mg, 25 mg, 300 mg, 350 mg, 400 mg, 450 mg or 500 mg. In another variation, the menaquinol derivative is administered at a dose of at least 500 mg, 600 mg, 700 mg, 800 mg, 900 mg or 1,000 mg or more.

In one aspect of the above method, the mammal has diabetes. In another aspect, the mammal has type II diabetes. In another aspect, the mammal has been diagnosed as pre-diabetic. In another aspect of the above method, the mammal has chronic kidney disease. In yet another aspect of the method, the mammal has stage 4 or 5 chronic kidney disease/end stage renal disease. In another aspect of the method, the mammal is undergoing hemodialysis. In another aspect of the method, the mammal is receiving non-warfarin based anti-coagulant therapy. In another aspect of the method, the anti-coagulant therapy is oral anti-coagulation therapy. In yet another aspect of the method, anti-coagulation therapy comprises an inhibitor of Factor Xa activity selected from apixaban, rivaroxaban, betrixaban, edoxaban, otamixaban, letaxaban, eribaxaban or fondaparinux; or Factor IIa activity selected from dabigratran or argatroban.

In another embodiment, the application discloses a method of treating, preventing, slowing the progression of, arresting, and/or reversing tissue calcification in a mammal undergoing hemodialysis, and in need thereof, the method comprising administering to the mammal at least 5 mg of a compound of the formula I, II or III, or a mixture thereof, per day, thereby to prevent, slow the progression, arrest, and/or reverse tissue calcification, wherein the above compound, or a mixture thereof is administered in a pharmaceutical composition.

In one variation, the menaquinol derivative is administered at a dose of at least 1 mg, 5 mg, 10 mg, 20 mg, 30 mg, 40 mg or 50 mg. In another variation, the menaquinol derivative is administered at a dose of at least 100 mg, 150 mg, 200 mg, 25 mg, 300 mg, 350 mg, 400 mg, 450 mg or 500 mg. In another variation, the menaquinol derivative is administered at a dose of at least 500 mg, 600 mg, 700 mg, 800 mg, 900 mg or 1,000 mg or more. In another aspect of the above method, the mammal has diabetes.

In another aspect, the application discloses a pharmaceutical composition comprising a therapeutically effective amount of a menaquinol derivative (or also referred to as "a compound" or "disclosed compound(s)") as disclosed above, or a mixture thereof, and a pharmaceutically acceptable excipient, wherein the composition is effective for the treatment of a condition associated with vitamin K selected from for the treatment of osteoporosis and arteriosclerosis.

In another aspect, the present application discloses a method for the treatment of a disease in a mammal selected from the group consisting of neurodegenerative diseases, retinopathy, rheumatoid polyarthritis, atherosclerosis, amyotrophic lateral sclerosis, cerebral ischemia, cataracts, systemic infections, pathologies associated with cutaneous aging and with senescence in tissues, pathologies associated with mitochondrial dysfunction, cachexia associated with under nutrition, wherein the treatment is associated with the increase in the longevity of mammals, the method comprises the administration of a therapeutically effective amount of a compound or composition comprising a menaquinol compound as disclosed above, or a mixture thereof.

In another embodiment, there is provided a method for treating a mammal with a disease selected from the group consisting of vitamin K deficiency, osteoporosis, a proliferative disease, and a cardiovascular disease, comprising administering to the mammal a therapeutically effective amount of a compound as disclosed herein, or a mixture thereof. In another aspect of the method, the proliferative disease is selected from the group consisting of cancer, leukemia and an inflammatory disease.

In another embodiment, there is provided a method for the treatment or prevention of osteoporosis and/or osteopenia, the method comprising administering to a patient in need of treatment, a therapeutically effective amount of a composition comprising a compound as disclosed above, or a mixture thereof. The disclosed method for the administration of the compounds and compositions, or combinations thereof, may be used in the treatment or reduction of vascular calcification, increase in bone mineral density and for the treatment, reduction or prevention of bone diseases, such as in patients with CKD.

In another embodiment, there is provided a method of treating, preventing, slowing the progression of, arresting, and/or reversing calciphylaxis in a mammal in need thereof, the method comprising administering to the mammal a therapeutically effective amount of a composition comprising substantially pure menaquinol compound as disclosed herein, and a pharmaceutically acceptable excipient, to prevent, slow the progression of, arrest, or reverse calciphylaxis. In one aspect of the method, the mammal has distal calciphylaxis and/or central calciphylaxis. In another aspect, the mammal has diabetes, chronic kidney disease or end stage renal disease. In another aspect, the mammal has stage 3, stage 4 or stage 5 chronic kidney disease. In another aspect of the method, the mammal is undergoing hemodialysis. In yet another aspect, the mammal is receiving non-warfarin-based anti-coagulant therapy.

In another aspect of the above method, the anti-coagulant therapy is oral anti-coagulation therapy. In another aspect, the anti-coagulation therapy comprises an inhibitor of Factor Xa activity selected from apixaban, rivaroxaban, betrixaban, edoxaban, otamixaban, letaxaban, eribaxaban or fondaparinux; or Factor IIa activity selected from dabigratran or argatroban. In another aspect, the mammal has chronic obstructive pulmonary disease (COPD). In another aspect, the mammal has a calciphylaxis-related dermal lesion. In another aspect of the method, administration of the composition reduces the total surface area of the dermal lesion by at least 10%, 20%, 30%, 40%, 50%, 60%, 70%, 80%, 90% or 100%. In another aspect of the method, administration of the substantially pure compound as disclosed herein, to the mammal increases the mammal's serum T50 value by at least 10%, 20%, 30%, 40%, 50%, 60%, 70%, 80%, 90% or 100%) relative to the mammal's serum T50 value prior to administration of the disclosed compound. In another aspect, administration of the disclosed compound increases a ratio of a carboxylated to a non-carboxylated of a Vitamin K dependent protein in plasma of the mammal after administration of the composition is greater than prior to administration of the composition. In one aspect of the method, the increase of the ratio of a carboxylated to a non-carboxylated of a Vitamin K dependent protein in plasma of the mammal after administration of the composition is by at least 5%, 10%, 15%, 20%, 25%, 30%, 35%, 40%, 45% 50%, 55%, 60%, 65%, 70%, 75%, 80%, 85%, 90%, 95%, or 100% relative to the ratio prior to administration.

In certain embodiments of the above, the administration of the disclosed compounds decreases the amount of a non-carboxylated Vitamin K-dependent protein in the subject's plasma, for example, by at least 5%, 10%, 15%, 20%, 25%, 30%, 35%, 40%, 45% 50%, 55%, 60%, 65%, 70%, 75%, 80%, 85%, 90%, 95% or 100% relative to the amount prior to administration of the compounds. In certain variations, the Vitamin K-dependent protein is selected from Matrix Gla Protein (MGP), Growth Arrest Specific Gene 6 (Gas-6) protein, PIVKA-II protein, osteocalcin, activated Protein C, activated Protein S, factor II, factor VII, factor IX, and factor X.

In certain variation of the above methods, the administration of the compounds increases the plasma level of osteoprotegerin or Fetuin A, for example, by at least 5%, 10%, 15%, 20%, 25%, 30%, 35%, 40%, 45% 50%, 55%, 60%, 65%, 70%, 75%, 80%, 85%, 90%, 95%, or 100% relative to the plasma concentration of osteoprotegerin or Fetuin A prior to administration of the compounds. In other variations, the administration of the compounds decreases the plasma level of D-Dimer or Highly Sensitive C Reactive Peptide (hs-CRP), for example, by at least 5%, 10%, 15%, 20%, 25%, 30%, 35%, 40%, 45% 50%, 55%, 60%, 65%, 70%, 75%, 80%, 85%, 90%, 95% or 100% relative to the plasma concentration of D-Dimer or Highly Sensitive C Reactive Peptide (hs-CRP) prior to administration of the compounds.

In certain variations, the method may include administering from about 10 mg to about 750 mg of the compound to the subject per day. In other variations, the method may include administering from about 50 mg to about 750 mg of the compound to the subject per day. In other variations, the method may include administering from about 20 mg to about 500 mg of the compound to the subject per day. In other variations, the method may include administering from about 50 mg to about 500 mg of the compound to the subject per day. In certain variations, the method can include administering from about 20 mg to about 250 mg of the compound to the subject per day. In other variations, the method may include administering from about 5 mg to about 250 mg of the compound to the subject per day. In other variations, the method may include administering from about 20 mg to about 100 mg of the compound to the subject per day. In other variations, the method may include administering from about 50 mg to about 100 mg of the compound to the subject per day. In other variations, the method may include administering from about 5 mg to about 75 mg of the compound to the subject per day, for example, administering 5, 10, 25, 50, 75, 100, 200, 300, 400 or 500 mg of the compound to the subject per day.

In certain variations, the compound is administered to the subject for at least 2 weeks, 4 weeks, 6 weeks, 8 weeks, 3 months, 6 months, 1 year, or indefinitely as needed. If the subject is undergoing hemodialysis, the compound may be administered to the subject for a period that includes at least the duration of hemodialysis.

In another variation of the method for treatment of calciphylaxis, in addition to measuring the change/reduction in lesion size following administration of the disclosed compounds, pre- and post-drug dosing administration, a biopsy may be taken of the relevant lesions using von Kassa Staining to determine tissue levels of PTH and evidence of change in calcium and phosphate deposition in dermal arterioles.

The presence of a uremic oxidative blockade is determined by measuring increased plasma lipid peroxidation, e.g., by detection of increased F2 isoprostanes, increased isolevuglandin-plasma protein adducts; increased protein and amino acid oxidation, e.g., by detection of tyrosine residue oxidation, cysteine or methionine residue oxidation, lysine oxidation and threonine oxidation, thiol oxidation and carbonyl formation in plasma proteins; reactive aldehyde formation, e.g., by detecting glyoxal, methylglyoxal, acrolein, glycoaldehyde, and parahydroxy phenacetaldehyde; increased reactive carbonyl compounds, e.g., by measuring hydrazine formation after reaction with 2,4-dinitrophenylhydrazine; diminished plasma glutathione levels and glutathione peroxidase function; and increased ratio of oxidized to reduced thiols.

In another embodiment, there is provided a method of treating, preventing, slowing the progression of, arresting and/or reversing tissue calcification in a pre-diabetic mammal (or subject) with diabetes, chronic kidney disease or a combination thereof, and in need thereof, the method comprising administering to the mammal at least 0.2 mg or at least 2 mg of substantially pure compound as disclosed herein per day, to prevent, slow the progression of, and/or arrest tissue calcification, wherein the compound is administered in a pharmaceutical composition. In another aspect of the method, the mammal has diabetes. In yet another aspect, the mammal has type II diabetes; or the mammal has been diagnosed as pre-diabetic. In another aspect, the mammal has chronic kidney disease. In another aspect of the above method, the mammal has stage 4 or 5 chronic kidney disease/end stage renal disease. In yet another aspect, the mammal is undergoing hemodialysis. In another aspect, the mammal is receiving non-warfarin based anti-coagulant therapy. In another aspect, the anti-coagulant therapy is oral anti-coagulation therapy. In another aspect of the method, the anti-coagulation therapy comprises an inhibitor of Factor Xa activity selected from apixaban, rivaroxaban, betrixaban, edoxaban, otamixaban, letaxaban, eribaxaban or fondaparinux; or Factor IIa activity selected from dabigratran or argatroban.

In another embodiment, there is provided a method of treating, preventing, slowing the progression of, arresting, and/or reversing tissue calcification in a mammal undergoing hemodialysis, and in need thereof, the method comprising administering to the mammal at least 0.2 mg or at least 2 mg of substantially pure compound as disclosed herein per day, thereby to prevent, slow the progression, arrest, and/or reverse tissue calcification, wherein the disclosed compound is administered in a pharmaceutical composition. In another aspect, the mammal has diabetes.

Vitamin K Metabolism: Development of vascular and soft tissue calcification following the failure to regenerate reduced forms of vitamin K: Vitamin K is an essential enzymatic co-factor that is required for posttranslational modifications of vitamin K dependent (VKD) proteins. While there are numerous VKD proteins many are clinically relevant to ESRD patients. They include central coagulation factors such as factors II, VII, IX and X as well as intercellular matrix proteins including Matrix GLA-1 and Osteocalcin. Under normal conditions, vitamin K is reduced to vitamin K hydroquinone ($KH_2$) by the enzyme NADPH oxidase. It is only the reduced form of vitamin K that is able to function as a co-factor for gamma glutamate carboxylase (GGCX) which catalyzes the carboxylation of vitamin K dependent proteins. Warfarin blocks the generation of vitamin K hydroquinone by acting as a reductive sink. The enzymatic carboxylation of glutamate residues results in further oxidation of vitamin KH2 to 2-3 epoxide vitamin K (FIG. 2). The final step of the vitamin k cycle requires the enzymatic oxidation of vitamin K 2-3 epoxide back to its native structure. This step is catalyzed by vitamin K oxidative reductase (VKOR) and is a component of the vitamin K cycle that is also blocked by the oxidative effects of Warfarin. The observation that Warfarin blocks both the generation of vitamin K hydroxyquinone (KH2) as well as the regeneration of Vitamin K2 2-3 epoxide helps to explains why the incidence of calciphylaxis and other forms of dystrophic calcification is higher among patients receiving Warfarin therapy.

In one variation, the administration or supplementation of the disclosed compounds and compositions reduces the risk for vascular and soft tissue calcification by increasing the formation of primary calciprotein particles (CPP) composed of Fetuin A and Carboxylated Matrix GLA-1 Proteins. Under normal physiologic conditions plasma calcium and phosphate concentrations are near supersaturation and thus would be expected to precipitate in blood vessels and soft tissue as crystalline hydroxyapatite. The observation that this process does not occur suggests the presence of potent chemical and biologic means for blocking pathologic calcification. Recent studies have shown that circulating calcium phosphate crystals are complexed with two calcification inhibiting proteins to form primary calciprotein particles (CPPs). These protein-mineral complexes are composed of primarily of Fetuin A; a liver derived protein that has been shown to prevent vascular calcification. A second protein in lower quantities is Matrix Gla-1 protein that also functions to prevent pathologic calcification. Matrix Gla-1 is a vitamin K dependent protein and early work by Price et al. and others have shown that formation of the Fetuin-Matrix Gla-1 mineral nanoparticles (primary calciproteins CPP) is dependent upon the gamma carboxylation of Matrix Gla-1. Preclinical studies suggest that the calciprotein system functions as an alternative means for preventing pathologic calcification when humoral lines of defense such as pyrophosphate, magnesium and albumin are overwhelmed. The "absorption" of calcium-phosphate crystals by primary CCPs occurs in a coordinated and time-dependent process.

The time to 50% saturation ($T_{50}$) of primary CCPs is an accurate and highly sensitive means for determining the capacity of plasma to "sink" or "absorb" excess calcium phosphate crystals. Patients with a short $T_{50}$ times suggests a reduced capacity to absorb calcium phosphate crystals whereas patients with prolonged $T_{50}$ times are consistent with high capacities. Recent clinical studies have validated the $T_{50}$ test and confirmed that low $T_{50}$ times are associated with increased myocardial infarctions, heart failure and all-cause mortality. Thus, any clinical intervention that can increases the synthesis of circulating primary CCPs will improve the capacity to prevent pathologic calcification. It is noted that because patients with CKD and ESRD exhibits reduced levels of carboxylated Matrix Gla-1 protein and that this process is essential for the formation of primary CPP. Accordingly, supplementation or administration of the disclosed compounds and compositions in CKD or ESRD patients will reduce the risk for pathologic calcification and prevent the development of vascular and soft tissue calcification. Supplementation or administration of the disclosed compounds or compositions may prevent or slow the development of soft tissue and vascular calcification in dermal tissues by restoring production of Carboxylated Matrix Gla-1 and GAS-6.

The regeneration of Vitamin K involves two key enzymes: vitamin K 2-3 epoxide oxidative reductase (VKOR) and NAD(P)H: quinone oxidoreductase (NQO1). As shown in the figure (FIG.), VKOR reduces 2-3 Vitamin K epoxide to vitamin K quinone while NADPH reduces Vitamin K quinone to its hydroxyquinone form (KH2). Recent studies have shown that VKOR has two distinct isoforms exist (VKORC-1 and VKORC1-Like-1 [VKORC1-L1]) that differ in both enzymatic properties and tissue distribution. For example, Westhofen et al. has shown that compared to VKORC1, VKOCR-L1 has a 3-fold lower affinity for 2-3 epoxide vitamin K. Subsequent work supported the hypothesis that VKOR-L1 is a specialized isoform that protects against oxidant injury through the regeneration of vitamin K. When cultured HEK 293T cells were incubated with $H_2O_2$, VKOR-L1 expression was increased and evidence of membrane oxidant injury was reduced. The clinical observation that calciphylaxis and vitamin K-dependent vascular calcification are more common in the dermis raises the question of whether there is differential expression of VKOR enzymes in the skin. Casper et al. determined mRNA expression of key enzymes involved in regeneration of vitamin K. Moreover, expression of NADPH in the dermis was below the level of detection. These observations suggest that any condition or procedure (i.e., hemodialysis) that blocks re-constitution of vitamin K predisposes that tissue to pathologic calcification.

The oxidative properties of uremic plasma as well as the oxidative effects of dialysis itself results in a "metabolic block" and an accumulation of 2-3 epoxide vitamin K and a reduction in the intracellular levels of vitamin K2. The "down-stream" effects of this blockade include the inability to gamma carboxylate key proteins involved in preventing soft tissue and vascular calcification. The oxidative effects of hemodialysis exacerbate this effect which may explain in part the predilection of ESRD patients to develop calciphylaxis and vascular calcification.

The relationship between vitamin K and circulating vitamin K dependent proteins in CKD-ESRD Patients: It is widely recognized that despite dietary deficiencies, vitamin K levels among ESRD patients may not be reduced. For example, Holder et al. studied 172 stable dialysis patients and found that only 6% of patients exhibited a clinically significant deficiency in vitamin K. However, when patients were examined for the level of carboxylated osteocalcin, a full 60% of patients has reduced levels. To confirm that was a general effect of reduced vitamin K activity, the authors also measured PIVKA-II; another vitamin K dependent protein. Indeed, a full 90% of both CKD and ESRD patients were found to have reduced levels of carboxylated prothrombin. In a similar study, Pilkey et al. measured the vitamin K1 levels in 142 ESRD patients and found that the majority of patients had adequate vitamin K stores but 93% of patients had uncarboxylated osteocalcin levels that were greater than 20% of total levels. There was no correlation between total vitamin K1 and the levels of circulating of uncarboxylated osteocalcin. This unexpected finding is consistent with the hypothesis that in uremic patients, total vitamin K levels can be normal while generation of reduced forms are blocked by the oxidative properties of uremia.

In one variation, the administration or supplementation or administration of the disclosed compounds and compositions will reverse hemodialysis induced inhibition of vitamin K dependent proteins through normalization of functional reduced forms of vitamin K. The observation that oxidant conditions can disrupt the vitamin K cycle suggests that the oxidant load generated during hemodialysis could contribute to the high rates of vascular and soft tissue calcification observed within the ESRD population. Work by Himmelfarb et al. and others have confirmed that the simple delivery of hemodialysis can lead to the oxidation of numerous tissue proteins. For example, hydroxyl amino acid side chains be oxidized to oxidized to carbonyl groups. In a study of CKD and ESRD patients, Himmelfarb et al. demonstrated using carbonyl side chain oxidation as a measure of global oxidant burden, Himmelfarb et al. demonstrated that both CKD and ESRD patients exhibit a higher percentage (15-fold) (See FIG. 5) of carbonyl proteins compared to normal controls. The percentage of carbonyl proteins was even higher among patients receiving dialysis demonstrating that not only does dialysis reduce oxidant burden, but it also appears to contribute to it. As shown in FIG. 5, patients with uremia were found to have up to 15-fold higher levels of carbonylated proteins. Accordingly, the oxidative load generated by the delivery of hemodialysis leads to oxidation of the function vitamin K hydroquinone (KH2) to the non-functional native vitamin. The oxidation of $KH_2$ by hemodialysis block its ability to function as a co-factor for GGCX which down-stream leads to reduced gamma carboxylation of vitamin K dependent proteins.

To confirm that uremia and hemodialysis disrupts the vitamin K cycle, the ratio of vitamin K quinone to 2-3 epoxide vitamin K and vitamin K hydroxyquinone (KH2) may be determined in patients with normal renal function, CKD (Stage IV & V) and ESRD patients. To determine whether the very process of hemodialysis further disrupts the vitamin K cycle, we can measure the levels of oxidized vitamin K in immediately prior to hemodialysis, then at mid-dialysis (2 hrs) and 30 minutes post dialysis. Previous studies examining the interactions between Warfarin and vitamin K metabolism have shown that 2-3 Epoxide Vitamin K are readily measured. Compared to controls, patients with CKD and ESRD will have higher levels of 2-3 epoxide vitamin K and lower levels of vitamin hydroquinone (KH2). To determine whether a loss of reduced forms of Vitamin K (KH2) leads to a reduction in the carboxylation of vitamin K dependent proteins, we can measure the levels of the following biomarkers in control, CKD (Stage IV and V) and ESRD (Pre-Post hemodialysis). Matrix GLA-1 protein; Growth Arrest Specific Gene 6 (Gas-6) proteins; PIVAK-II protein; Osteocalcin; Protein C; Protein S; Fetuin A; and Osteoprotegerin (Dialysis Plasma Levels: 6.7±2.2 pmole/L). We extend these studies by including patients receiving stable 3×/week hemodialysis. The levels of carboxylated and uncarboxylated vitamin K dependent proteins in pre-dialysis serum may be compared to levels obtained at hour 2 and the end of a dialysis session. The oxidative effects of dialysis itself will lead to a reduction in the level of carboxylated Vitamin K2 dependent proteins.

In one variation, the administration or supplementation with the disclosed compounds and compositions in ESRD patients with Calcific Uremic Arteriolopathy (Calciphylaxis) will reduce the time of wound healing by preventing calcification of new blood vessels and restoring blood flow: Skin Biopsies: To confirm that supplementation of the disclosed compounds and compositions prevents the development of small vessel calcification and dermal ischemia, we may identify patients with calciphylaxis confirmed by dermal skin biopsy and randomize patients to treatment with menaquinone-7 or placebo. In another variation of the above procedure, the treatment employs menaquinone-9 or placebo. Clinical Endpoints may include the following: 1) Time to Wound Vacuum therapy withdrawal and 2) time for wound healing defined as the time needed for a 50% reduction in collective the surface area of all calciphylaxis wounds.

In another variation, the administration or supplementation with the disclosed compounds and compositions provides a significant increase in the bioavailability of the compounds, including menaquinone-7/menaquinol-7, menaquinone-8/menaquinol-8, menaquinone-9/menaquinol-9 and menaquinone-10/menaquinol-10, and their respective mixtures, when compared to administration or supplementation. In one variation, the bioavailability increases by at least 5%, 10%, 15%, 20%, 30%, 40%, 50% or more, when compared to the administration or supplementation using menaquinone-7, menaquinone-8, menaquinone-9 and menaquinone-10, respectively.

In another variation, the administration or supplementation with the disclosed compounds and compositions provides a significant increase in the serum half life of the compounds, including menaquinone-7/menaquinol-7, menaquinone-8/menaquinol-8, menaquinone-9/menaquinol-9 and menaquinone-10/menaquinol-10, and their respective mixtures, when compared to administration or supplementation. In one variation, the serum half-life increases by at least 5%, 10%, 15%, 20%, 30%, 40%, 50% or more, when compared to the administration or supplementation using menaquinone-7, menaquinone-8, menaquinone-9 and menaquinone-10, respectively.

Histopathologic Endpoints: Comparison of Diagnostic dermal biopsy with Protocol repeat dermal biopsy after 12 weeks of Menaquinone-7 therapy. Change in the level of interstitial calcium deposition defined as the change in Von Kossa staining, which may be quantified by digital image color analysis. We may use dermal biopsies to validate the biomarkers at the tissue level. This process allows confirmation of the preventive properties of the disclosed menaquinol derivatives on early vascular calcification. The validation of these biomarkers at the tissue will also enable clinicians to utilize the biomarkers as means to track clinical responsiveness. Calcification of microvasculature precedes development of CUA lesions. The level of calcification may be quantified by Von Kossa calcium staining in the peripheral tissue and normalized as calcium content per unit area. The Von Kossa may be used as a means of confirming the preventive properties of the disclosed menaquinol derivatives on the development of vascular calcification.

In one variation, the supplementation of the disclosed compounds and compositions in ESRD patients with Calcific Uremic Arteriolopathy (Calciphylaxis; CUA) will reduce the time of wound healing by normalizing carboxy Protein C levels in the dermis and preventing primary thrombosis of dermal blood vessels. Accordingly, in one variation, the supplementation or administration of the disclosed compounds or compositions in diabetic patients will prevent the development of vascular dementia by preventing calcification and development of small vessel vasculopathy.

In yet another embodiment, there is provided a fortified food or drink formulation comprising adding to the food or drink a composition comprising a compound of any one of the above compounds, or a mixture thereof.

Also included in the above embodiments, aspects and variations are salts of amino acids such as arginate and the like, gluconate and galacturonate. Certain of the compounds of the present invention may exist in unsolvated forms as well as solvated forms, including hydrated forms, and are intended to be within the scope of the present invention. Also provided are pharmaceutical compositions comprising pharmaceutically acceptable excipients and a therapeutically effective amount of at least one compound of this invention.

Pharmaceutical compositions of the compounds of this invention, or derivatives thereof, may be formulated as solutions or lyophilized powders for parenteral administration. Powders may be reconstituted by addition of a suitable diluent or other pharmaceutically acceptable carrier prior to use. The liquid formulation is generally a buffered, isotonic, aqueous solution. Examples of suitable diluents are normal isotonic saline solution, 5% dextrose in water or buffered sodium or ammonium acetate solution. Such formulations are especially suitable for parenteral administration but may also be used for oral administration. Excipients, such as polyvinylpyrrolidinone, gelatin, hydroxycellulose, acacia, polyethylene glycol, mannitol, sodium chloride or sodium citrate, may also be added. Alternatively, these compounds may be encapsulated, tableted, or prepared in an emulsion or syrup for oral administration.

Pharmaceutically acceptable solid or liquid carriers may be added to enhance or stabilize the composition, or to facilitate preparation of the composition. Liquid carriers include syrup, peanut oil, olive oil, glycerin, saline, alcohols, or water. Solid carriers include starch, lactose, calcium sulfate, dihydrate, terra alba, magnesium stearate or stearic acid, talc, pectin, acacia, agar or gelatin. The carrier may also include a sustained release material such as glyceryl monostearate or glyceryl distearate, alone or with a wax. The amount of solid carrier varies but may be between about 20 mg to about 1 g per dosage unit. The pharmaceutical preparations are made following the conventional techniques of pharmacy involving milling, mixing, granulation, and compressing, when necessary, for tablet forms; or milling, mixing and filling for hard gelatin capsule forms. When a liquid carrier is used, the preparation will be in the form of a syrup, elixir, emulsion, or an aqueous or non-aqueous suspension. Such a liquid formulation may be administered directly p.o. or filled into a soft gelatin capsule. Suitable formulations for each of these methods of administration may be found in, for example, *Remington: The Science and Practice of Pharmacy*, A. Gennaro, ed., 20th edition, Lippincott, Williams & Wilkins, Philadelphia, Pa.

The disclosed compounds and compositions may include a solubility enhancer or solubilizer selected from oleic acid, Kolliphor® EL (polyoxyl castor oil or Cremophor EL), Vitamin E TPGS (D-α-tocopherol polyethylene glycol-1000 succinate), Savie (a polysarcosine-derived emulsifying agent), Maisine® CC (glyceryl monolinoleate), Gelucire® 44/14 (lauroyl polyoxyl-32 glycerides), Miglyol® 812N (esters of saturated coconut and palm kernel oil-derived caprylic fatty acids and glycerin), Plurol® Oleique (Polyglyceryl-6 Dioleate), Lauroglycol™ 90 (propylene glycol monolaurate (type II), Labrasol® (Caprylocaproyl polyoxyl-8 glycerides), Captisol® (SBE-beta-cyclodextrin), Encapsin™ HPB (hydroxypropylbeta-cyclodextrin), Peceol™ (glycerol/glyceryl monooleate (type 40)), sodium deoxycholate, deoxycholic acid, Labrafil® M2125CS (linoleoyl Polyoxyl-6 glycerides) and medium-chain mono- and diglycerides.

In one variation, there is provided the compounds disclosed herein, or a pharmaceutically acceptable salt thereof, optionally in the form of a single stereoisomer or mixture of stereoisomers thereof; and compositions comprising the compounds.

In addition to the exemplary embodiments, aspects and variations described above, further embodiments, aspects and variations will become apparent by reference to the drawings and figures and by examination of the following descriptions.

DETAILED DESCRIPTION OF THE INVENTION

Definitions

Unless specifically noted otherwise herein, the definitions of the terms used are standard definitions used in the art of organic synthesis and pharmaceutical sciences. Exemplary embodiments, aspects and variations are illustrative in the figures and drawings, and it is intended that the embodiments, aspects and variations, and the figures and drawings disclosed herein are to be considered illustrative and not limiting.

"Pharmaceutically acceptable salts" means salt compositions that is generally considered to have the desired pharmacological activity, is considered to be safe, non-toxic and is acceptable for veterinary and human pharmaceutical applications. Such salts include acid addition salts formed with inorganic acids such as hydrochloric acid, hydrobromic acid, sulfuric acid, phosphoric acid, and the like; or with organic acids such as acetic acid, propionic acid, hexanoic acid, malonic acid, succinic acid, malic acid, citric acid, gluconic acid, salicylic acid and the like.

"Therapeutically effective amount" means an amount of a compound or drug that elicits any of the biological effects listed in the specification.

EXPERIMENTAL

Figure 1:
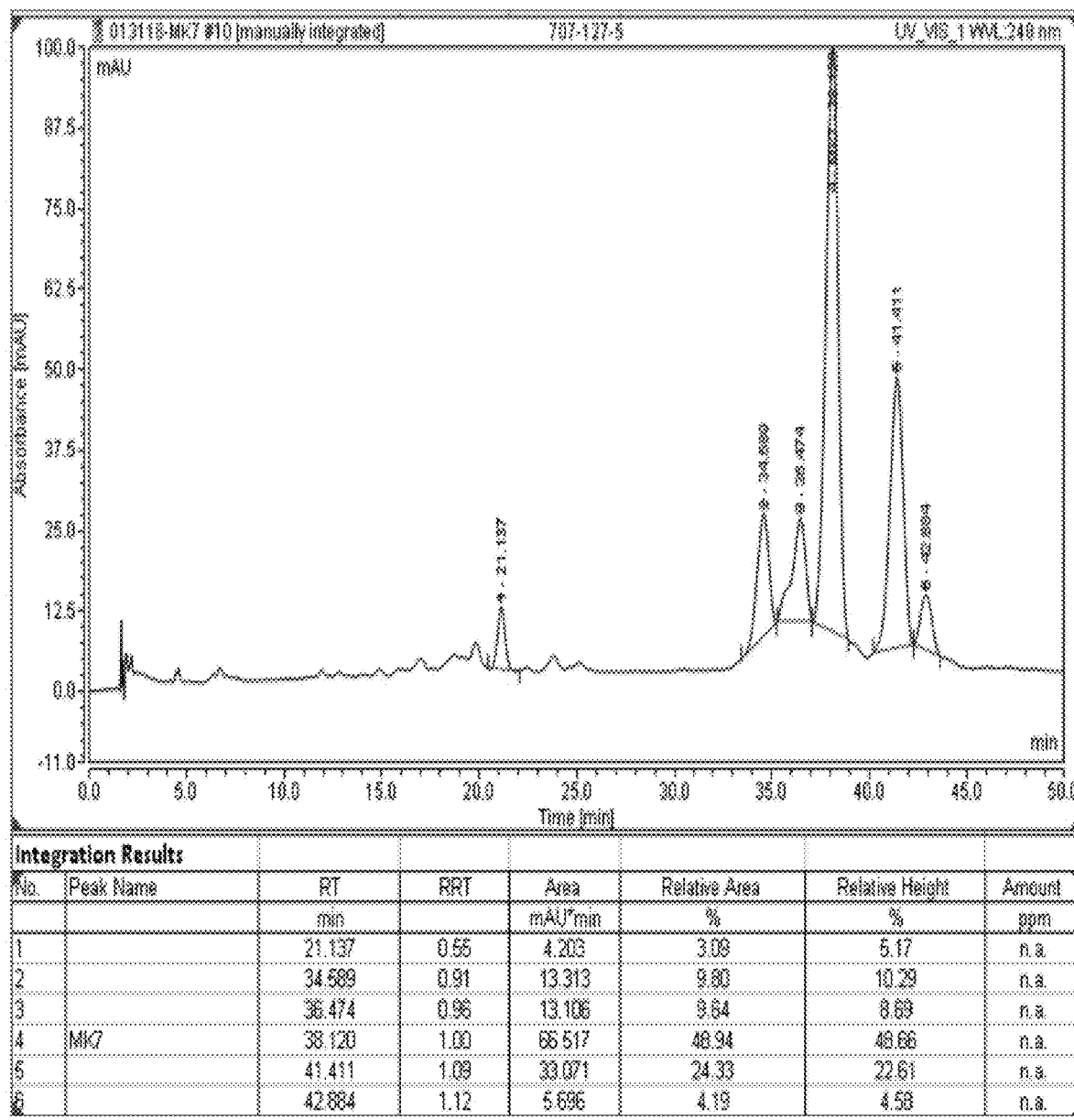
FIG. 1 is a representation of a chromatogram of menaquinone-7 and its regioisomer shown with a ratio of 3:1, as determined by $^1$H NMR.
Figure 2:
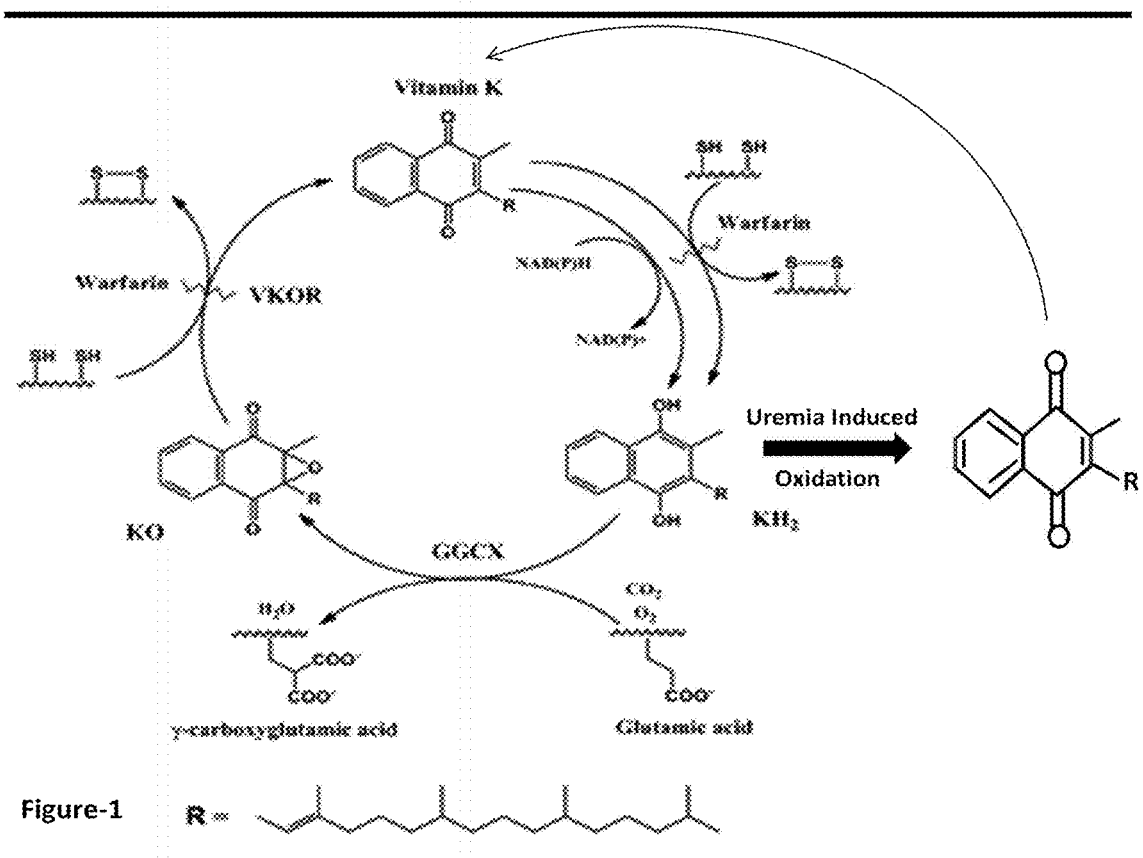
FIG. 2 is a scheme showing the uremia and dialysis induced oxidation of KH2 functional carboxylation of vitamin K dependent proteins.
Figure 3:
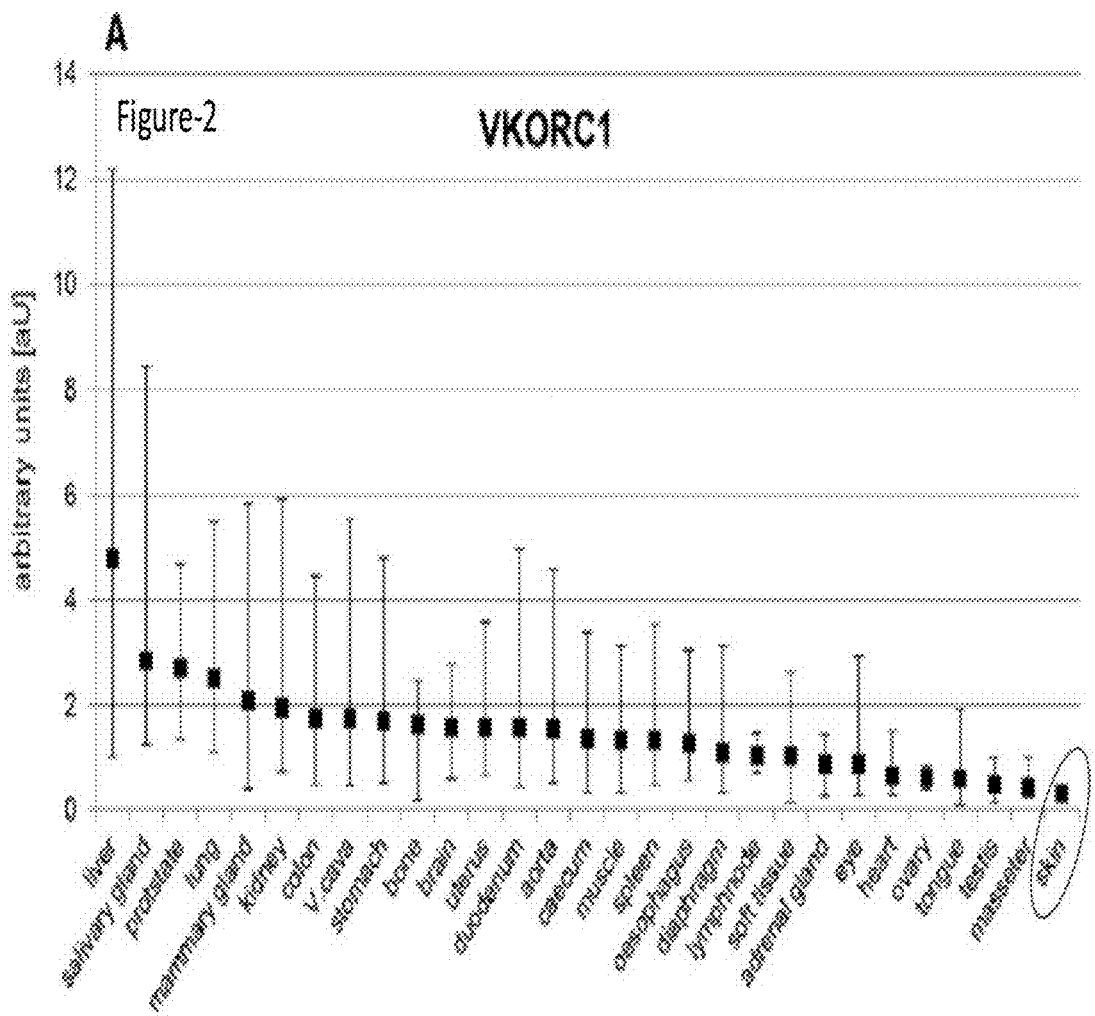
FIG. 3 is graph showing the VKORC1 in arbitrary units and specific tissues.
Figure 4:
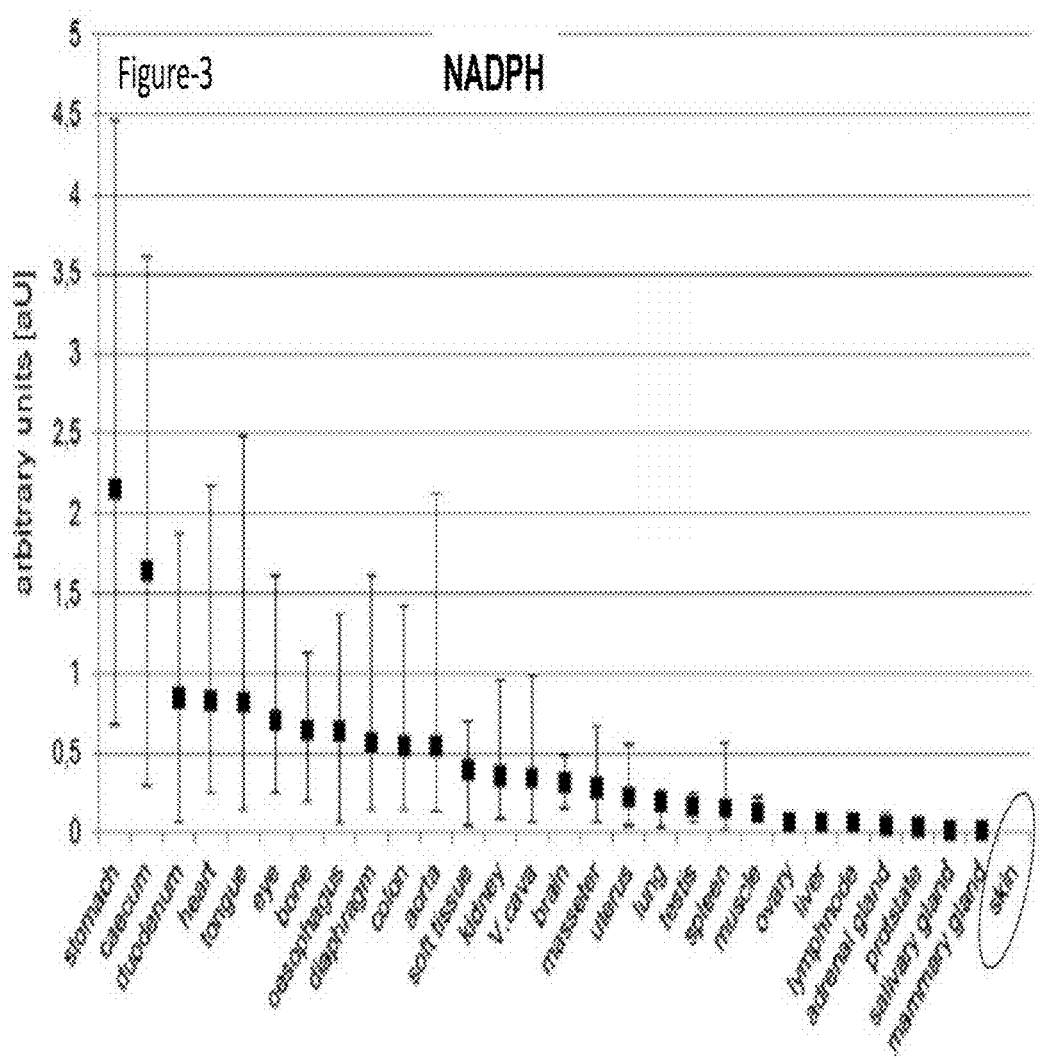
FIG. 4 is a graph showing the NADPH in arbitrary units and specific tissues.
Figure 5:
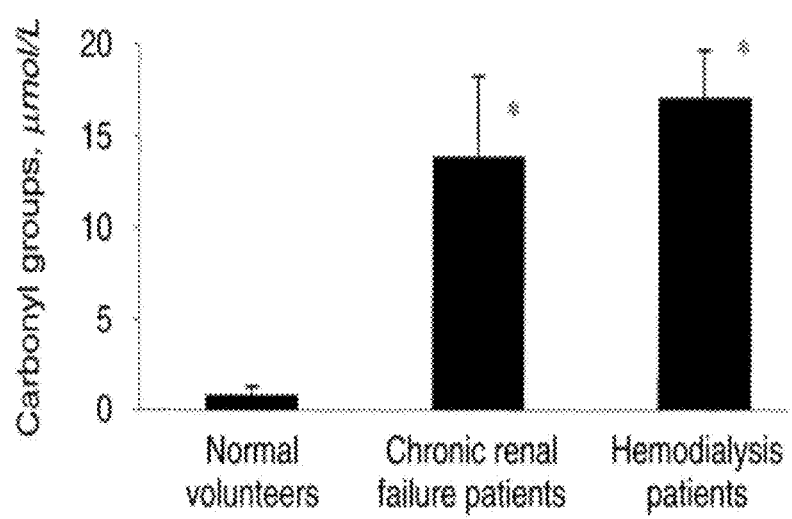
FIG. 5 is a graph showing CKD and ESRD patients exhibit a higher percentage of carbonyl proteins compared to normal controls.
Figure 6:
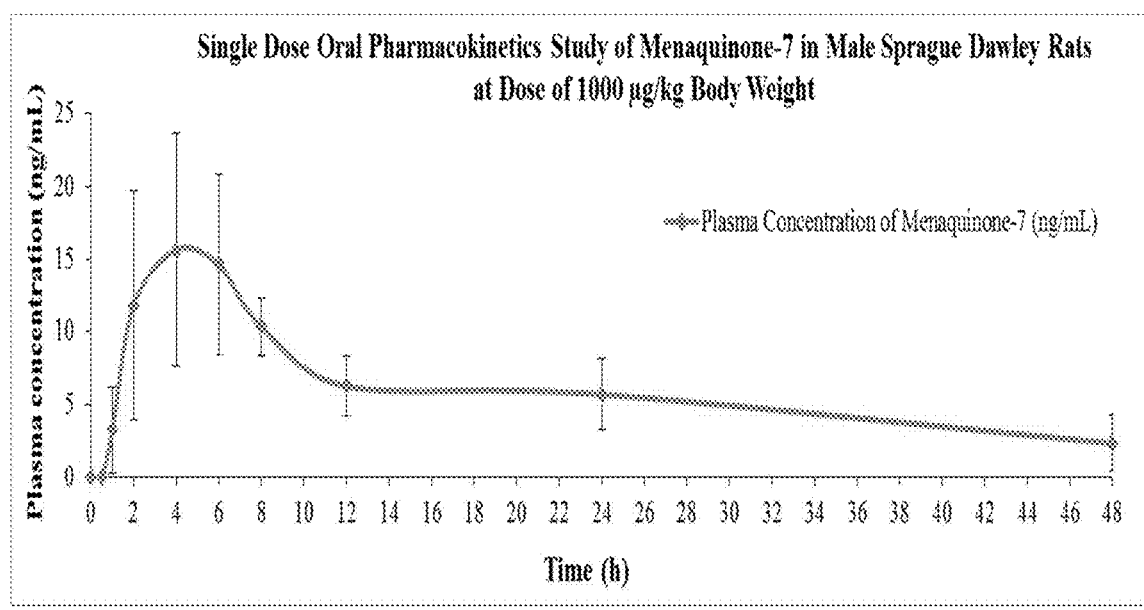
FIG. 6 is a graph showing a single dose oral pharmacokinetics study of menaquinone-7 in male Sprague Dawley rats at dose of 1000 µ/kg body weight.

The following procedures may be employed for the preparation of the compounds of the present invention. The starting materials and reagents used in preparing these compounds are either available from commercial suppliers such as the Aldrich Chemical Company (Milwaukee, Wis.), Bachem (Torrance, Calif.), Sigma (St. Louis, Mo.), or are prepared by methods well known to a person of ordinary skill in the art, following procedures described in such references as *Fieser and Fieser's Reagents for Organic Synthesis*, vols. 1-17, John Wiley and Sons, New York, N.Y., 1991; *Rodd's Chemistry of Carbon Compounds*, vols. 1-5 and supps., Elsevier Science Publishers, 1989; *Organic Reactions*, vols. 1-40, John Wiley and Sons, New York, N.Y., 1991; March J.: *Advanced Organic Chemistry*, 4th ed., John Wiley and Sons, New York, N.Y.; and Larock: *Comprehensive Organic Transformations*, VCH Publishers, New York, 1989.

In some cases, protective groups may be introduced and finally removed. Suitable protective groups for amino, hydroxy, and carboxy groups are described in Greene et al., *Protective Groups in Organic Synthesis*, Second Edition, John Wiley and Sons, New York, 1991. Standard organic chemical reactions can be achieved by using a number of different reagents, for examples, as described in Larock: *Comprehensive Organic Transformations*, VCH Publishers, New York, 1989.

Preparation of Menaquinol Derivatives:

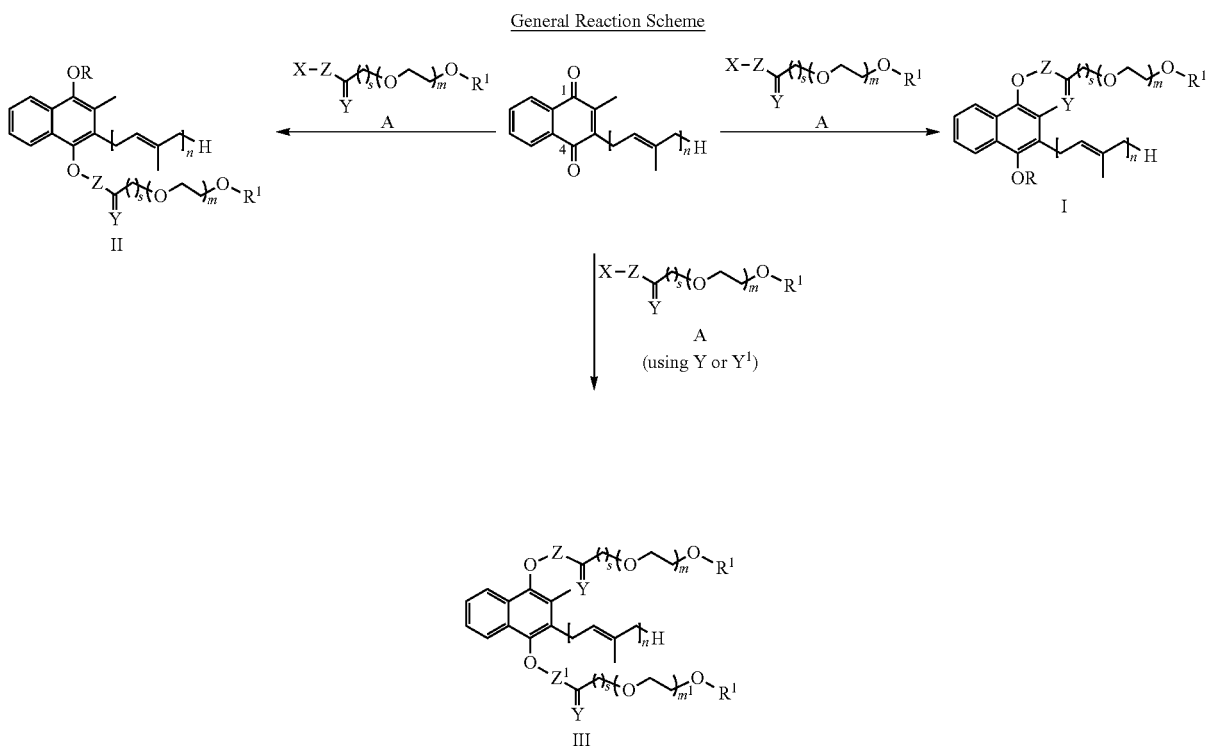

General Reaction Scheme m and m$^1$=is an integer from 3 to 15;
n=7, 8, 9 or 10;
R$^1$=R$^1$ is H or —CH$_3$;
s=1 or 2;
X=halide (Cl, Br, I), —OC(O)C$_1$-C$_6$ alkyl, —OC(O) (CH$_2$)$_q$—O—C(O)C$_1$-C$_6$ alkyl and —O—Z—(C=Y) (CH$_2$)$_s$—(OCH$_2$CH$_2$)—O—R$^1$
Y and Y$^1$=O, NH or S; and
Z and Z$^1$=—C(O)CH$_2$O—, —C(O)CH$_2$NH— or is absent.

The preparation of the menaquinol mono-ester and diester derivatives may be performed using standard process known in the art, and as described herein. For example, as shown in the General Reaction Scheme, the menaquinone, such as MK-7 or MK-9, may be treated with a Pegylated acid halide A (X=chloride, bromide or iodide) in an organic solvent such as DCM, hexanes, toluene and THF, and in the presence of an organic or inorganic base such as Et$_3$N, Pyridine, DMAP, NaOAc, NaHCO$_3$ and zinc. Alternatively, acylation of the quinone may be performed with the symmetrical or asymmetrical Pegylated anhydride and catalytic acid, such as H$_2$SO$_4$, HCl and phosphoric acid.

For example, the menaquinone, such as MK-7 or MK-9, maybe treated with a Pegylated anhydride A (X=—OC(O) R$^2$ where R$^2$ is C$_1$-C$_6$ or the symmetrical anhydride) in an organic solvent such as DCM, hexanes, toluene and THF, and in the presence of an organic or inorganic base, or metals, such as Et$_3$N, pyridine, DMAP, NaOAc, NaHCO$_3$ and zinc. Under certain conditions using a stoichiometric equivalent of the acylating agent, the mode of addition of the acylating agent to the menaquinone and the reaction conditions, selective acylation may be accomplished to provide a mono-acylated ester, at the 1-position, or at the 4-position of the menaquinone.

Alternatively, the preparation of the menaquinol monoester and diester derivatives may be performed using HATU (1-[Bis(dimethylamino)methylene]-1H-1,2,3-triazolo[4,5-b]pyridinium 3-oxide hexafluorophosphate, Hexafluorophosphate Azabenzotriazole Tetramethyl Uronium) as a coupling reagent, where the corresponding Pegylated-carboxylic acid A (X=—OH) is treated with HATU to form the —OAt-active ester, followed by the reaction with the corresponding menaquinol formed from the menaquinone. See, for example, Carpino L A et al. The uronium/guanidinium peptide coupling reagents: Finally the true uranium salts. Angewandte Chemie International Edition, 2002, 41(3): 441-445; Carpino L A et al.; Comparison of the Effects of 5- and 6-HOAt on Model Peptide Coupling Reactions Relative to the Cases for the 4- and 7-Isomers. Organic letters, 2000, 2(15): 2253-2256.

Selective Hydrolysis of Di-Esters:

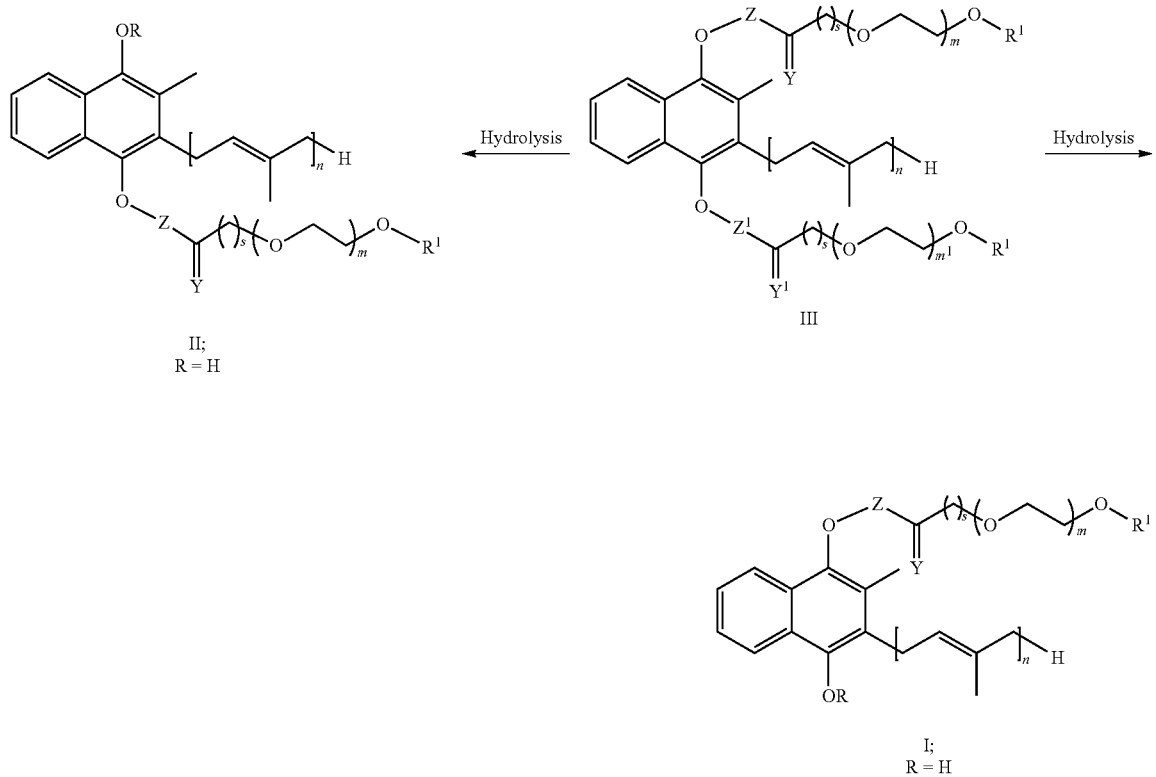

II;
R = H

III

I;
R = H

In addition, the selective formation of the mono-ester menaquinol at the 1- or 4-position may be performed by the initial preparation of the di-ester, followed by a selective hydrolysis of one of the ester groups to form the desired mono-ester derivative. For example, it has been demonstrated that the menaquinol esters that are formed at the 4-position (the ketone that is adjacent to the isoprenoidal side chain) of the quinone, under certain controlled conditions, undergo more facile hydrolysis than the menaquinol ester group at the 1-position. Standard hydrolysis conditions include aqueous NaOH in the presence of an organic solvent, such as THF or diethyl ether, or NaOMe in THF and/or methanol or ethanol. Alternatively, hydrolysis can be performed in dilute aqueous acid, such as HCl or $H_2SO_4$, optionally at elevated temperatures in an organic solvent or mixture of organic solvent, such as THF or ether, such as from about 30° C. to 50° C. Where a mixture of the mono- and di-esters are formed from the hydrolysis reaction, i.e., incomplete selective hydrolysis, the desired mono-ester can be readily separated from the di-ester by column chromatography or preparative chromatography.

The acylation reaction and the selective hydrolysis reaction, performed under various standard conditions known in the art, provide the desired mono-acylated derivative or the di-acylated derivative, having the $^1$H-NMR spectral designation as expected.

General Reaction Scheme

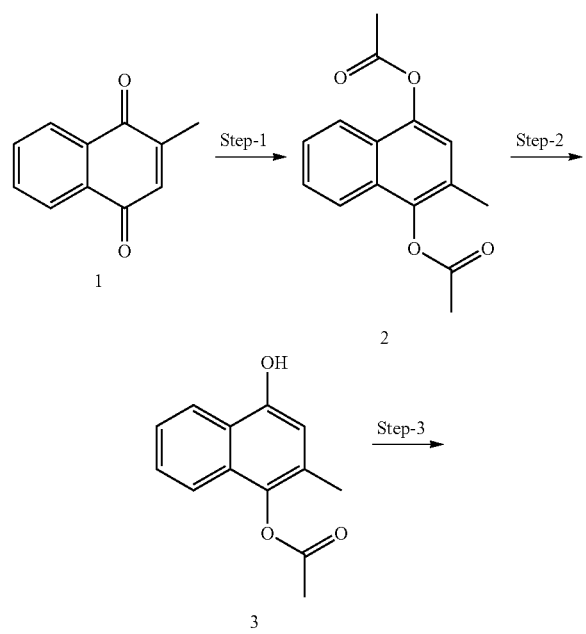

35

-continued

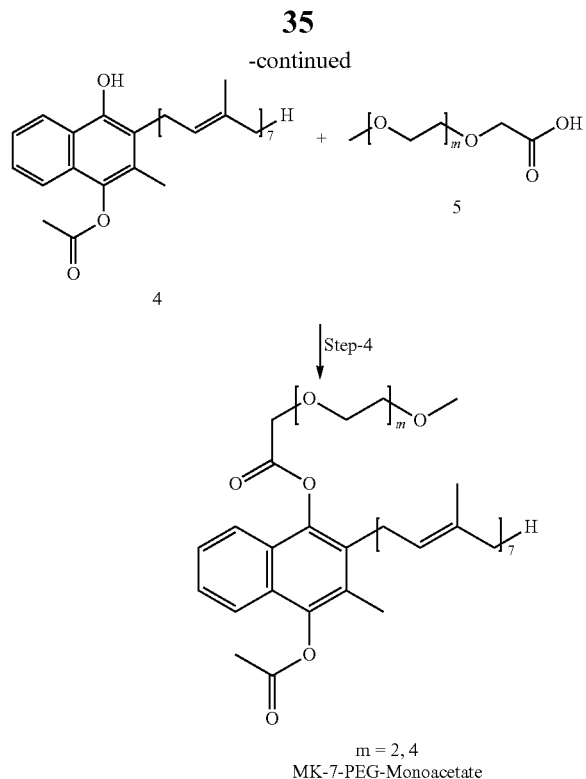

m = 2, 4
MK-7-PEG-Monoacetate

Experimental Procedure

Step-1: Preparation of
4-(acetyloxy)-2-methylnaphthalen-1-yl acetate (2)

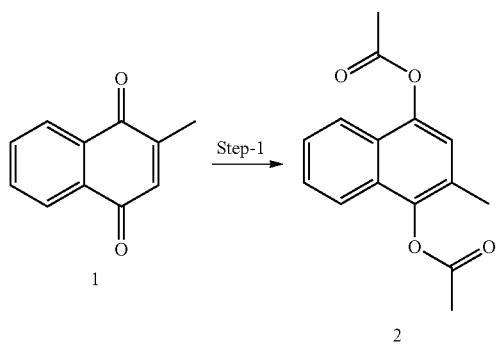 [SMILES: CC1=CC(=O)c2ccccc2C1=O ; CC(=O)Oc1cc(C)c(OC(C)=O)c2ccccc12]

To a stirring solution of $Na_2S_2O_4$ (42.4 g, 0.24 mol) in water (160 mL, 8V) was added 2-methyl-1,4-dihydronaphthalene-1,4-dione 1 (20 g, 0.116 mol) in ethyl acetate (160 mL, 8V) at room temperature (25-30° C.). The reaction mixture was stirred at room temperature for 2 h. The reaction completion was observed by color change, from dark brown to pale brown solution. The reaction mixture was transferred into a separating funnel and the separated organic layer was dried over a sodium sulfate and concentrated. The crude obtained was taken in acetic anhydride (66 mL, 0.69 mol) and cooled to 0° C. and conc. $H_2SO_4$ (4 mL, 0.2V) was added. The reaction mixture was stirred at room temperature for 2 h. The reaction completion was monitored by TLC $R_f$=0.4 (20% Ethyl acetate/Hexane).

The reaction mixture was slowly added to water (500 mL) at ambient temperature (25-30° C.) and stirred for 10 min at same temperature (25-30° C.). The obtained solid was filtered and dried to afford the compound 2 as a brown solid (26.0 g, 87%), $R_f$=0.4 (20% ethyl acetate/hexane). $^1$H NMR (400 MHz, $CDCl_3$) δ (ppm): 7.86-7.80 (m, 1H), 7.80-7.72 (m, 1H), 7.57-7.44 (m, 2H), 7.15 (s, 1H), 2.47 (d, J=11.0 Hz, 6H), 2.33 (s, 3H). LC-MS m/z (M+1): 259.8 (Calculated molecular weight-258.26).

Step-2: Preparation of
4-hydroxy-2-methylnaphthalen-1-yl acetate (3)

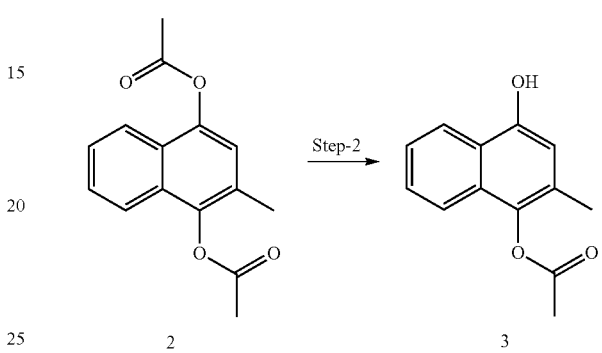

To a stirring solution of compound 2 (25 g, 0.096 mol) in ethanol (500 mL, 20V) were added sodium hydroxide (3.8 g, 0.096 mol) and $Na_2S_2O_4$ (5.0 g, 0.029 mol) in water (50 mL, 2V) at room temperature (25-30° C.). The reaction mixture was stirred at room temperature for 2 h. The reaction completion was monitored by TLC. The reaction mixture was neutralized with 1.5N HCl (pH-3 to 4), the resulting reaction mixture was filtered and filtrate was concentrated (to remove ethanol). The crude was diluted with ethyl acetate (500 mL), washed with water (2×200 mL) and brine solution (200 mL). The separated organic layer was dried over sodium sulfate and concentrated. The crude product was washed with n-hexane (3×100 mL) to afford compound 3 as a brown solid (18.2 g, 87%). $R_f$=0.3 (20% ethyl acetate/hexane). $^1$H NMR (400 MHz, $CDCl_3$) δ (ppm): 8.03 (dt, J=8.3, 1.1 Hz, 1H), 7.70-7.61 (m, 1H), 7.49 (ddd, J=8.4, 6.8, 1.4 Hz, 1H), 7.41 (ddd, J=8.3, 6.8, 1.3 Hz, 1H), 6.48 (s, 1H), 5.54 (d, J=1.5 Hz, 1H), 2.49 (s, 3H), 2.21 (s, 3H). LC-MS m/z (M+1): 217.6 (Calculated molecular weight-216.23).

Synthesis of MK-7-Monoactate

Step-3: Preparation of 3-[(2E,6E,10E,14E,18E,
22E)-3,7,11,15,19,23,27-heptamethyloctacosa-2,6,
10, 14,18,22,26-heptaen-1-yl]-4-hydroxy-2-methyl-
naphthalen-1-yl acetate (4)

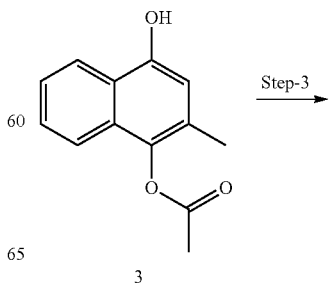

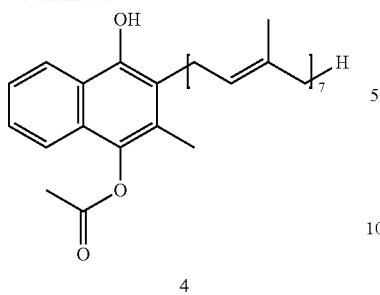

4

To a stirring solution of compound 3 (10.0 g, 0.046 mol) in toluene (100 mL, 10V) were added heptaprenol (16.0 g, 0.032 mol) and benzene sulfonic acid (0.72 g, 0.0046 mol) at room temperature (25-30° C.). The reaction mixture was stirred at room temperature for 16-24 h. The reaction completion was monitored by TLC. The reaction mixture was diluted with ethyl acetate (500 mL), washed with water (2×250 mL) and brine solution (200 mL). The separated organic layer was dried over sodium sulfate and concentrated. The crude product obtained was purified by column chromatography (2-3% ethyl acetate/hexane) and crystallized from acetone and N-heptane combination (1:4V) to afford compound 4 as an off white solid (4.1 g, 13%), $R_f$=0.5 (15% ethyl acetate/hexane). $^1$H NMR (400 MHz, CDCl$_3$) δ (ppm): 8.13-8.10 (m, 1H), 7.64-7.62 (m, 1H), 7.46-7.39 (m, 2H), 5.70 (s, 1H), 5.27-5.24 (m, 1H), 5.11 (tp, J=6.8, 4.4, 2.9 Hz, 6H), 3.53 (d, J=6.8 Hz, 2H), 2.47 (s, 3H), 2.26 (s, 3H), 2.17-1.93 (m, 24H), 1.88 (d, J=1.3 Hz, 3H), 1.68 (d, J=1.6 Hz, 3H), 1.59 (d, J=9.7 Hz, 18H). LC-MS m/z (M+1): 693.39 (Calculated monoisotopic mass −692.51).

Synthesis of MK-7-PEG2-Monoacetate

Step-4: Preparation of 4-(acetyloxy)-2-[(2E,6E,10E,14E,18E,22E)-3,7,11,15,19,23,27-heptamethyloctacosa-2,6,10,14,18,22,26-heptaen-1-yl]-3-methyl-naphthalen-1-yl 2-[2-(2-methoxyethoxy)ethoxy]acetate

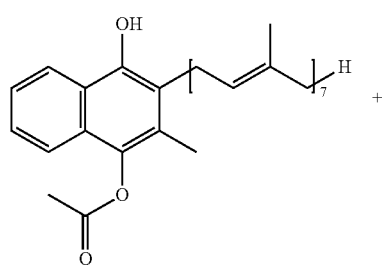

4

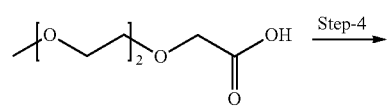

5

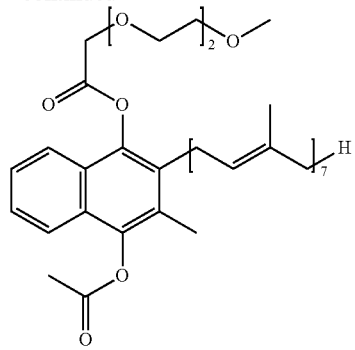

MK-7-PEG2-Monoacetate

To a solution of compound 5 (0.41 g, 0.00230 mol) in DCM (10 mL, 10 V) were added N,N'-Dicyclohexylcarbodiimide (0.534 g, 0.0025 mol) and 4-dimethylaminopyridine (17 mg, 0.00014 mol) at 0-5° C. and the reaction mixture was stirred for 10 min at same temperature (0-5° C.). Compound 4 (1.0 g, 0.0014 mol) in DCM (10 mL) was added to the reaction mixture at 0-5° C. and was slowly allowed to stir at ambient temperature over a period of 2 h at 25-30° C. The reaction completion was monitored by TLC. The reaction mixture was diluted with dichloromethane (100 mL), washed with water (2×50 mL) and brine solution (100 mL). The separated organic layer was dried over sodium sulfate and concentrated. The crude product obtained was purified by column chromatography (20% Ethyl acetate/Hexane) to afford compound MK-7-PEG2-Monoacetate as a pale-yellow thick liquid (738 mg, 60%). $R_f$=0.4 (20% ethyl acetate/hexane). $^1$H NMR (400 MHz, CDCl$_3$) δ (ppm): 7.74-7.60 (m, 2H), 7.51-7.41 (m, 2H), 5.15-5.01 (m, 7H), 4.62 (s, 2H), 3.93-3.86 (m, 2H), 3.80-3.65 (m, 4H), 3.61-3.54 (m, 2H), 3.39 (s, 5H), 2.48 (s, 3H), 2.24 (s, 3H), 2.10-1.90 (m, 24H), 1.72 (dd, J=35.3, 1.3 Hz, 6H), 1.57 (d, J=1.7 Hz, 18H). LC-MS m/z (M+1): 853.39 (Calculated monoisotopic mass −852.59). HPLC purity: 99.58%.

Synthesis of MK-7-PEG4-Monoacetate

Step-4: Preparation of 4-(acetyloxy)-2-[(2E,6E,10E,14E,18E,22E)-3,7,11,15,19,23,27-heptamethyloctacosa-2,6,10,14,18,22,26-heptaen-1-yl]-3-methyl-naphthalen-1-yl 2,5,8,11,14-pentaoxahexadecan-16-oate

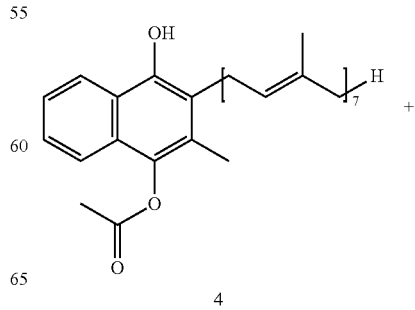

4

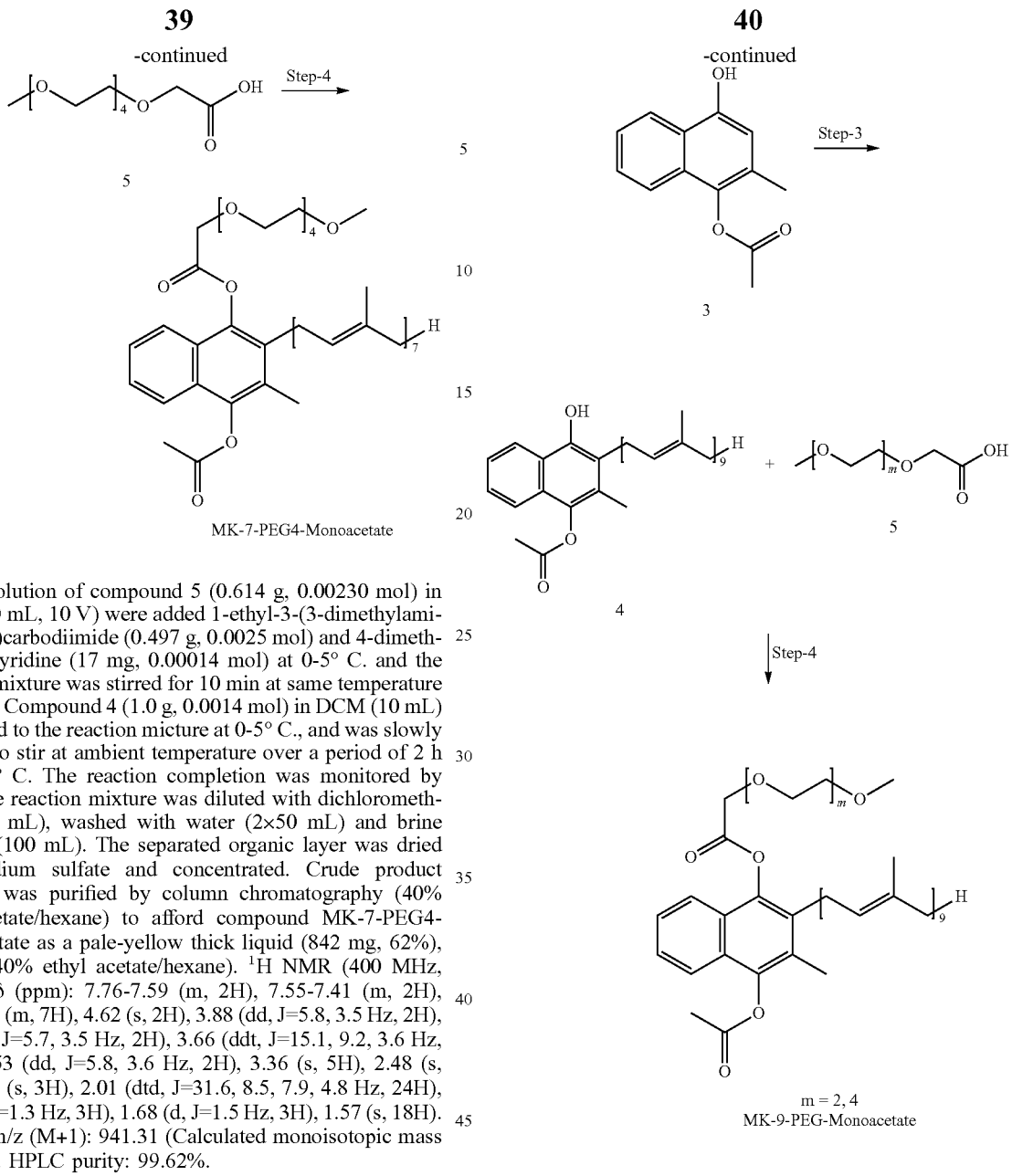

MK-7-PEG4-Monoacetate

To a solution of compound 5 (0.614 g, 0.00230 mol) in DCM (10 mL, 10 V) were added 1-ethyl-3-(3-dimethylaminopropyl)carbodiimide (0.497 g, 0.0025 mol) and 4-dimethylaminopyridine (17 mg, 0.00014 mol) at 0-5° C. and the reaction mixture was stirred for 10 min at same temperature (0-5° C.). Compound 4 (1.0 g, 0.0014 mol) in DCM (10 mL) was added to the reaction micture at 0-5° C., and was slowly allowed to stir at ambient temperature over a period of 2 h at 25-30° C. The reaction completion was monitored by TLC. The reaction mixture was diluted with dichloromethane (100 mL), washed with water (2×50 mL) and brine solution (100 mL). The separated organic layer was dried over sodium sulfate and concentrated. Crude product obtained was purified by column chromatography (40% ethyl acetate/hexane) to afford compound MK-7-PEG4-Monoacetate as a pale-yellow thick liquid (842 mg, 62%), $R_f$=0.4 (40% ethyl acetate/hexane). $^1$H NMR (400 MHz, CDCl$_3$) δ (ppm): 7.76-7.59 (m, 2H), 7.55-7.41 (m, 2H), 5.19-4.99 (m, 7H), 4.62 (s, 2H), 3.88 (dd, J=5.8, 3.5 Hz, 2H), 3.75 (dd, J=5.7, 3.5 Hz, 2H), 3.66 (ddt, J=15.1, 9.2, 3.6 Hz, 10H), 3.53 (dd, J=5.8, 3.6 Hz, 2H), 3.36 (s, 5H), 2.48 (s, 3H), 2.24 (s, 3H), 2.01 (dtd, J=31.6, 8.5, 7.9, 4.8 Hz, 24H), 1.76 (d, J=1.3 Hz, 3H), 1.68 (d, J=1.5 Hz, 3H), 1.57 (s, 18H). LC-MS m/z (M+1): 941.31 (Calculated monoisotopic mass –940.64). HPLC purity: 99.62%.

Synthesis of MK-9-Monoactate

General reaction scheme

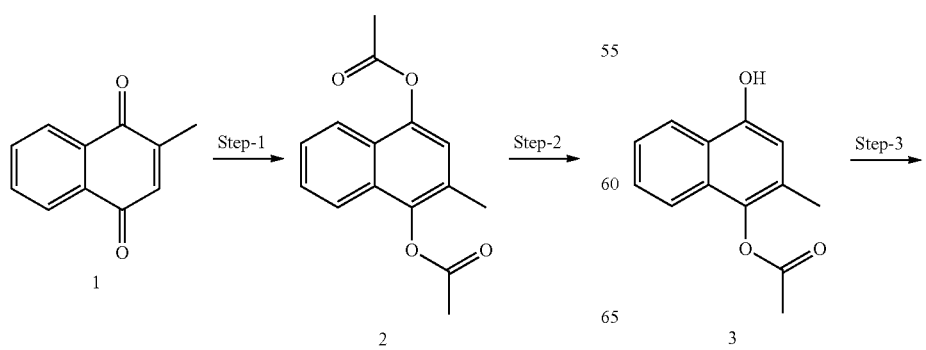

Step-3: Preparation of 4-hydroxy-2-methyl-3-[(2E, 6E,10E,14E,18E,22E,26E,30E)-3,7,11,15,19,23,27, 31,35-nonamethylhexatriaconta-2,6,10,14,18,22,26, 30,34-nonaen-1-yl]naphthalen-1-yl acetate (4)

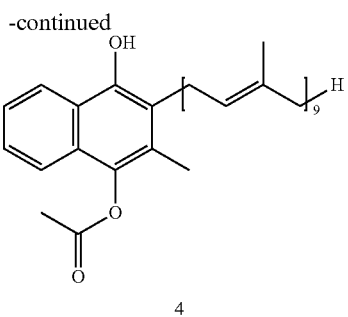

4

To a stirring solution of compound 3 (10.0 g, 0.046 mol) in toluene (100 mL, 10V) were added Solanesol (20.45 g, 0.032 mol) and benzene sulfonic acid (0.72 g, 0.0046 mol) at room temperature (25-30° C.). The reaction mixture was stirred at RT for 16-24 h. The reaction completion was monitored by TLC (15% Ethyl acetate/Hexane). The reaction mixture was diluted with ethyl acetate (500 mL), washed with water (2×250 mL) and brine solution (200 mL). The separated organic layer was dried over sodium sulfate and concentrated. The crude product obtained was purified by column chromatography (2-3% Ethyl acetate/Hexane) and crystallized from acetone and N-heptane combination to afford compound 4 as an off white solid (4.1 g, 13%), $R_f$=0.5 (15% ethyl acetate/hexane). $^1$H NMR (400 MHz, CDCl$_3$) δ (ppm): 8.13-8.10 (m, 1H), 7.64-7.62 (m, 1H), 7.46-7.26 (m, 2H), 5.70 (S, 1H), 5.28-5.24 (m, 1H), 5.11 (tp, J=6.8, 4.4, 2.9 Hz, 9H), 3.53 (d, J=6.8 Hz, 2H), 2.47 (s, 3H), 2.26 (s, 3H), 2.17-1.93 (m, 32H), 1.88 (d, J=1.3 Hz, 3H), 1.68 (d, J=1.6 Hz, 3H), 1.59 (d, J=9.7 Hz, 24H). LC-MS m/z (M+1): 829.36 (Calculated monoisotopic mass −828.64).

Synthesis of MK-9-PEG2-Monoacetate

Step-4: Preparation of 4-(acetyloxy)-3-methyl-2-[(2E,6E,10E,14E,18E,22E,26E,30E)-3,7,11,15,19,23,27,31,35-nonamethylhexatriaconta-2,6,10,14,18,22,26,30,34-nonaen-1-yl]naphthalen-1-yl 2-[2-(2-methoxyethoxy)ethoxy]acetate

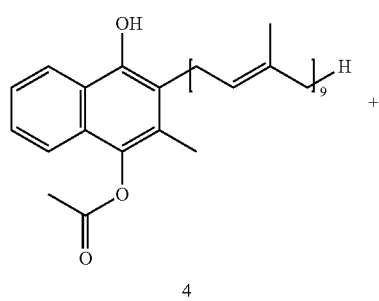

4

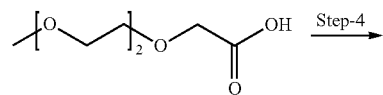

5

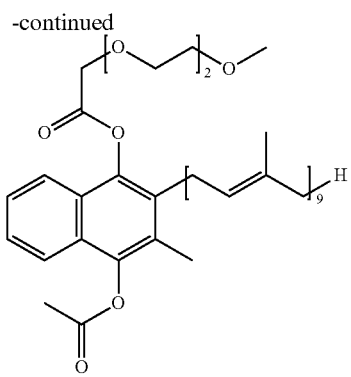

MK-9-PEG2-Monoacetate

To a solution of compound 5 (0.513 g, 0.00192 mol) in DCM (10 mL, 10 V) were added N,N'-dicyclohexylcarbodiimide (0.447 g, 0.0021 mol) and 4-dimethylaminopyridine (14 mg, 0.00012 mol) at 0-5° C. and the reaction mixture was stirred for 10 min at same temperature (0-5° C.). Compound 4 (1.0 g, 0.0012 mol) in DCM (10 mL) was added to the mixture at 0-5° C. The reaction mixture was slowly allowed to stir at ambient temperature over a period of 2 h at 25-30° C. The reaction completion was monitored by TLC. The reaction was diluted with dichloromethane (100 mL), washed with water (2×50 mL) and brine solution (100 mL). The separated organic layer was dried over sodium sulfate and concentrated. The crude product obtained was purified by column chromatography (20% Ethyl acetate/Hexane) to afford compound MK-9-PEG2-Monoacetate as an off white solid (738 mg, 60%), $R_f$=0.4 (20% ethyl acetate/hexane). $^1$H NMR (400 MHz, CDCl$_3$) δ (ppm): 7.71-7.63 (m, 2H), 7.47-7.44 (m, 2H), 5.12-5.00 (m, 9H), 4.62 (s, 2H), 3.90-3.86 (m, 2H), 3.80-3.65 (m, 4H), 3.61-3.54 (m, 2H), 3.39 (s, 5H), 2.48 (s, 3H), 2.24 (s, 3H), 2.10-1.91 (m, 32H), 1.77 (d, J=1.4 Hz, 3H), 1.68 (t, J=1.4 Hz, 3H), 1.60-1.53 (m, 24H). LC-MS m/z (M+1): 989.75 (Calculated monoisotopic mass −988.71). HPLC purity: 99.18%.

Synthesis of MK-9-PEG4-Monoacetate

Step-4: Preparation of 4-(acetyloxy)-3-methyl-2-[(2E,6E,10E,14E,18E,22E,26E,30E)-3,7,11,15,19,23,27,31,35-nonamethylhexatriaconta-2,6,10,14,18,22,26,30,34-nonaen-1-yl]naphthalen-1-yl 2,5,8,11,14-pentaoxahexadecan-16-oate

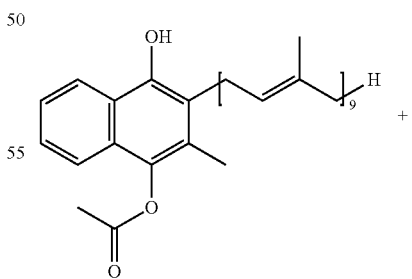

4

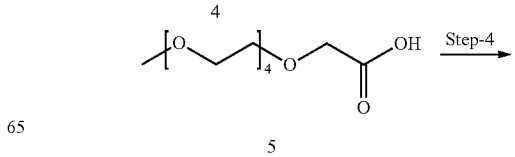

5

43

-continued

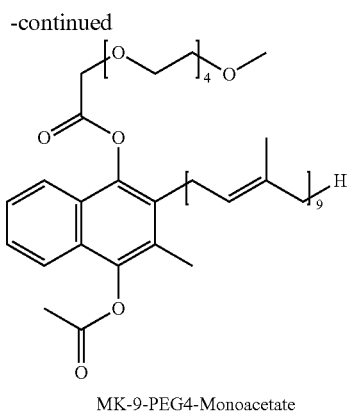

MK-9-PEG4-Monoacetate

To a solution of compound 5 (0.513 g, 0.00192 mol) in DCM (2.0 L, 400V) were added 1-ethyl-3-(3-dimethylaminopropyl)carbodiimide (0.416 g, 0.00217 mol) and 4-dimethylaminopyridine (17 mg, 0.00014 mol) at 0-5° C. and the reaction mixture was stirred for 10 min at same temperature (0-5° C.). To the above reaction mixture compound 4 (1.0 g, 0.0012 mol) in DCM (10 mL) was added at 0-5° C. The reaction mixture was slowly allowed to stir at ambient temperature over a period of 2 h at 25-30° C. The reaction completion was monitored by TLC. The reaction mixture was diluted with dichloromethane (100 mL), washed with water (2×50 mL) and brine solution (100 mL). The separated organic layer was dried over sodium sulfate and concentrated. The crude product obtained was purified by column chromatography (40% Ethyl acetate/Hexane) to afford compound MK-9-PEG4-Monoacetate as a pale yellow thick liquid (779 mg, 60%), $R_f$=0.4 (40% ethyl acetate/hexane). $^1$H NMR (400 MHz, CDCl$_3$) δ (ppm): 7.71-7.63 (m, 2H), δ 7.47-7.45 (m, 2H), 5.09 (dt, J=20.5, 7.7 Hz, 9H), 4.61 (s, 2H), 3.88 (dd, J=5.7, 3.6 Hz, 2H), 3.74 (dd, J=5.7, 3.6 Hz, 2H), 3.70-3.54 (m, 10H), 3.52 (dd, J=5.9, 3.4 Hz, 2H), 3.37 (s, 5H), 2.48 (s, 3H), 2.24 (s, 3H), 2.02 (dt, J=33.0, 7.5 Hz, 32H), 1.77 (s, 3H), 1.68 (d, J=1.5 Hz, 3H), 1.60 (s, 24H). LC-MS m/z (M+1): 1077.75 (Calculated monoisotopic mass −1076.76). HPLC purity: 98.75%

Synthesis of MK-9

Step-1: Preparation of 2-methyl-3-[(2E,6E,10E,14E,18E,22E,26E,30E)-3,7,11,15,19,23,27,31,35-nonamethylhexatriaconta-2,6,10,14,18,22,26,30,34-nonaen-1-yl]-1,4-dihydronaphthalene-1,4-di one)

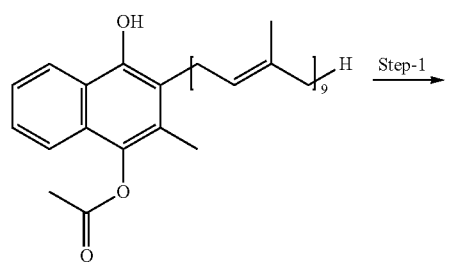

44

-continued

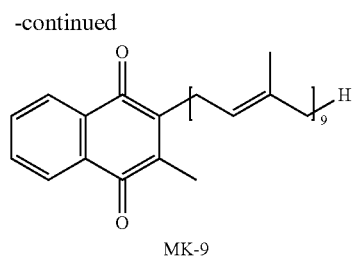

MK-9

To a stirring solution of compound 1 (1.0 g, 0.0012 mol) in a mixture acetonitrile:diethyl ether:water (1:1:1) (12 mL, 12V) was added ceric ammonium nitrate (1.9 g, 0.0036 mol) at room temperature (25-30° C.). The reaction mixture was stirred at room temperature for 1-2 h. The reaction completion was monitored by TLC. The reaction mixture was diluted with ethyl acetate (100 mL), washed with water (2×50 mL) and brine solution (100 mL). The separated organic layer was dried over sodium sulfate and concentrated. The crude product obtained was purified by column chromatography (2-3% Ethyl acetate/Hexane) and crystallized from acetone and N-heptane combination (1:4V) to afford compound MK9 as a yellow solid (580 mg, 51%), $R_f$=0.7 (15% ethyl acetate/hexane). $^1$H NMR (400 MHz, CDCl$_3$) δ (ppm): 8.08 (ddd, J=6.2, 3.1, 1.8 Hz, 2H), 7.71-7.66 (m, 2H), 5.20-4.99 (m, 9H), 3.37 (d, J=7.0 Hz, 2H), 2.19 (s, 3H), 2.12-1.89 (m, 32H), 1.68 (d, J=1.4 Hz, 3H), 1.66-1.51 (m, 24H). LC-MS m/z (M+1): 785.27 (Calculated monoisotopic mass −784.61). HPLC purity: 98.0%.

The following representative compounds may be prepared using the above process:

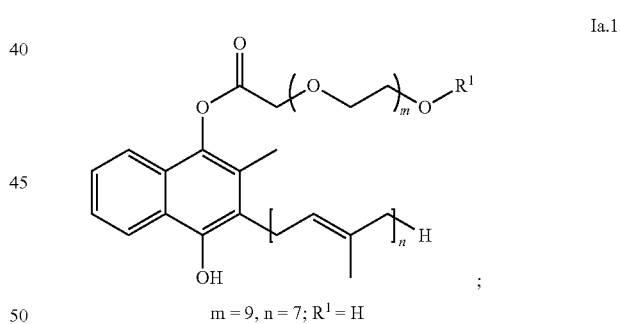

m = 9, n = 7; $R^1$ = H

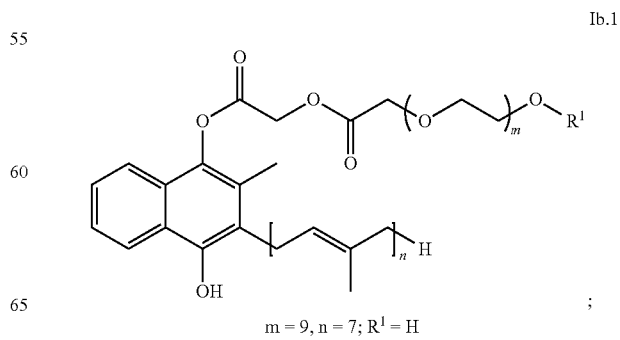

m = 9, n = 7; $R^1$ = H

-continued
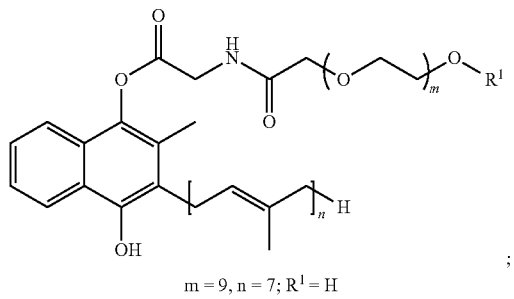
m = 9, n = 7; R¹ = H
Ic.1
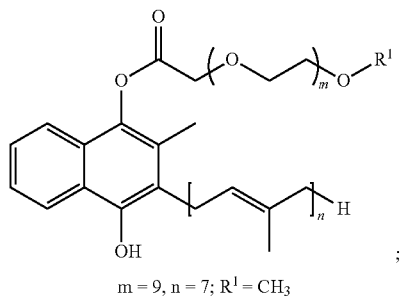
m = 9, n = 7; R¹ = CH₃
Ia.2
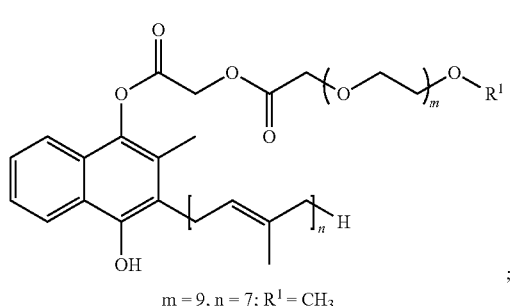
m = 9, n = 7; R¹ = CH₃
Ib.2
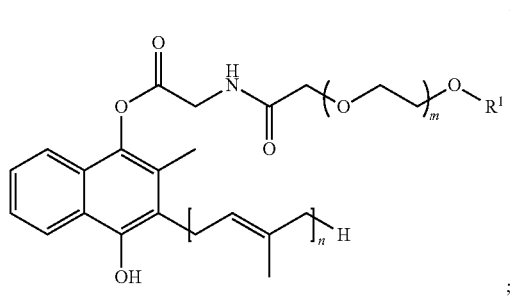
m = 9, n = 7; R¹ = CH₃
Ic.2
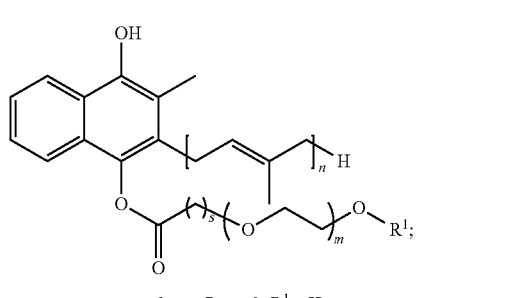
m = 9, n = 7; s = 0; R¹ = H
IIa
-continued
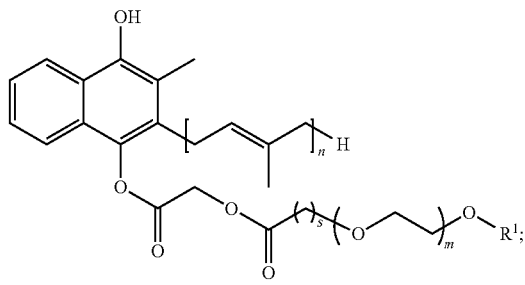
m = 9, n = 7; s = 0; R¹ = H
IIb
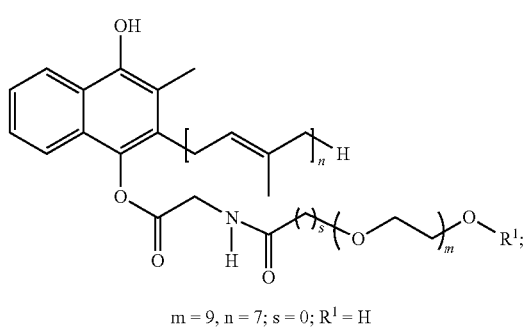
m = 9, n = 7; s = 0; R¹ = H
IIc
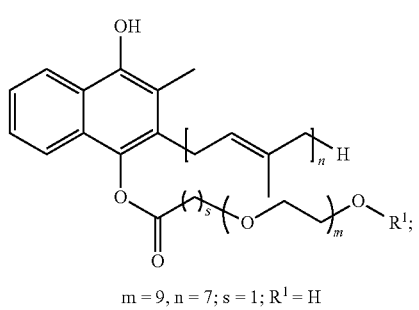
m = 9, n = 7; s = 1; R¹ = H
IIa.1
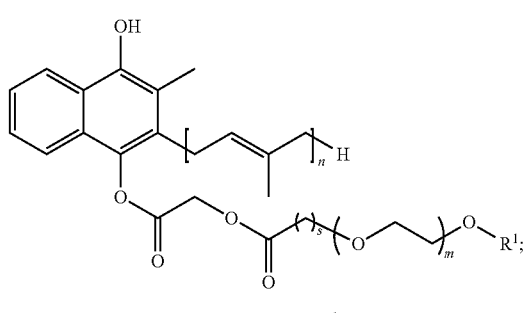
m = 9, n = 7; s = 1; R¹ = H
IIb.1

-continued
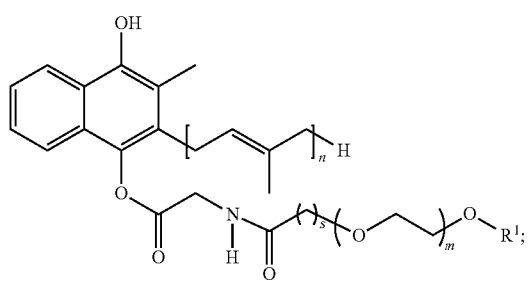
IIc.1
m = 9, n = 7; s = 1; R¹ = H
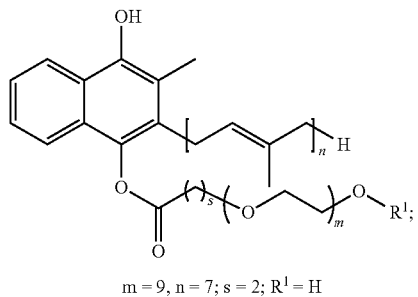
IIa.1.1
m = 9, n = 7; s = 2; R¹ = H
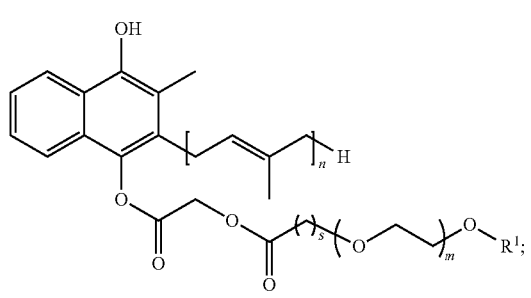
IIb.1.1
m = 9, n = 7; s = 2; R¹ = H
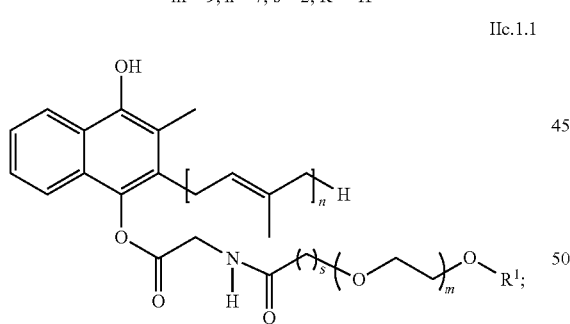
IIc.1.1
m = 9, n = 7; s = 2; R¹ = H
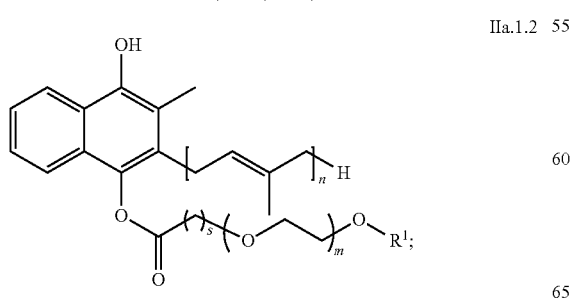
IIa.1.2
m = 9, n = 7; s = 3; R¹ = H
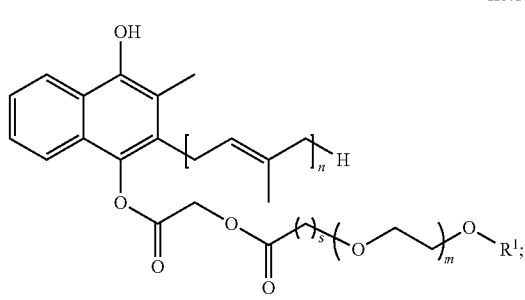
IIb.1.2
m = 9, n = 7; s = 3; R¹ = H
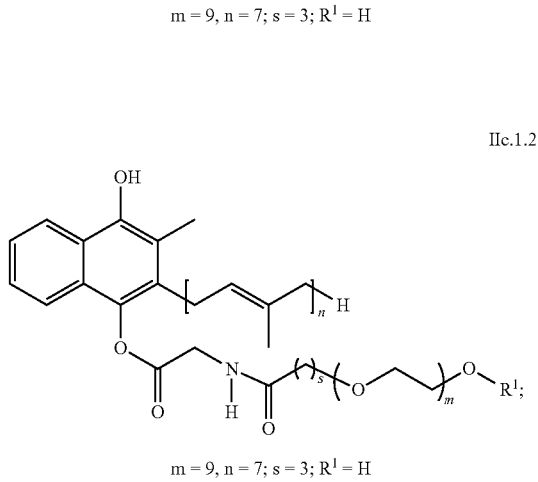
IIc.1.2
m = 9, n = 7; s = 3; R¹ = H
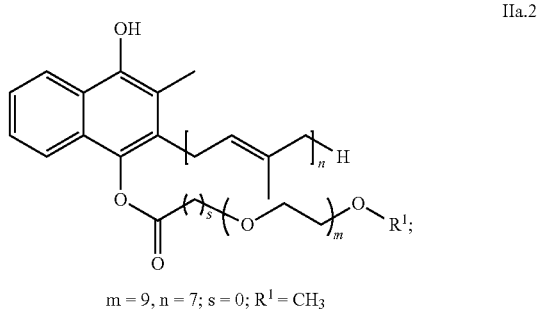
IIa.2
m = 9, n = 7; s = 0; R¹ = CH₃
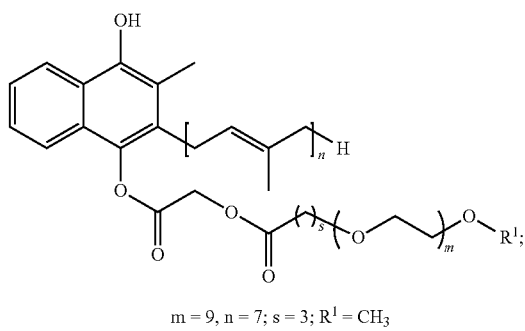
IIb.2
m = 9, n = 7; s = 3; R¹ = CH₃

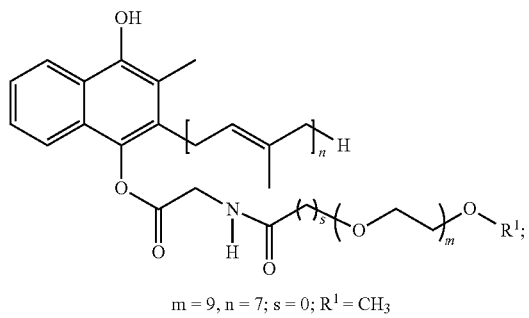
IIc.2
m = 9, n = 7; s = 0; R¹ = CH₃
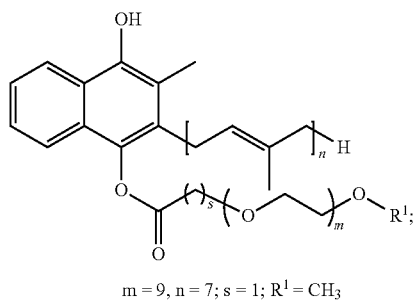
IIa.3
m = 9, n = 7; s = 1; R¹ = CH₃
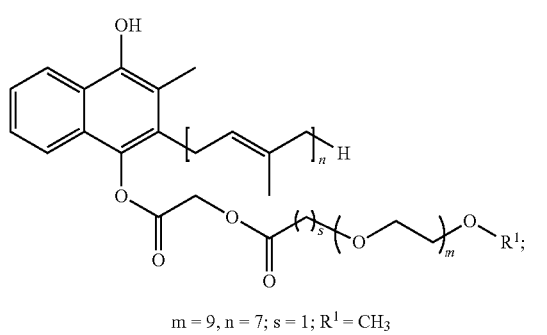
IIb.3
m = 9, n = 7; s = 1; R¹ = CH₃
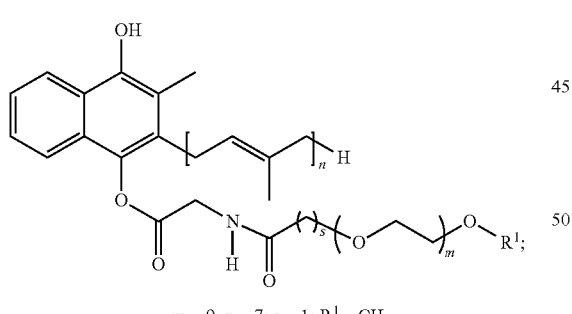
IIc.3
m = 9, n = 7; s = 1; R¹ = CH₃
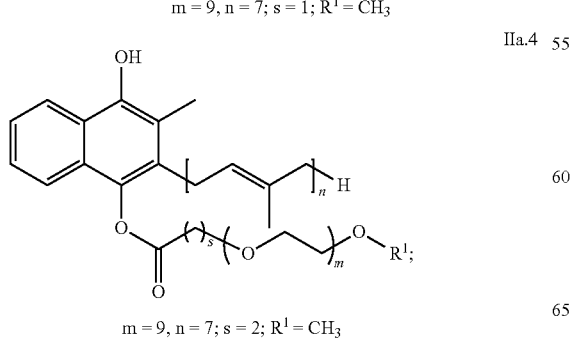
IIa.4
m = 9, n = 7; s = 2; R¹ = CH₃
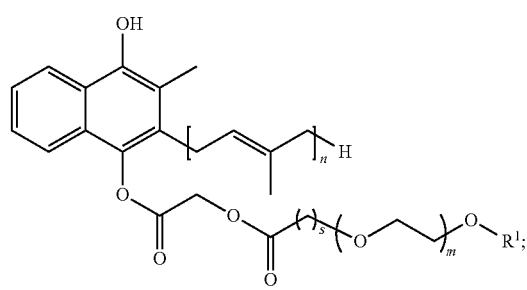
IIb.4
m = 9, n = 7; s = 2; R¹ = CH₃
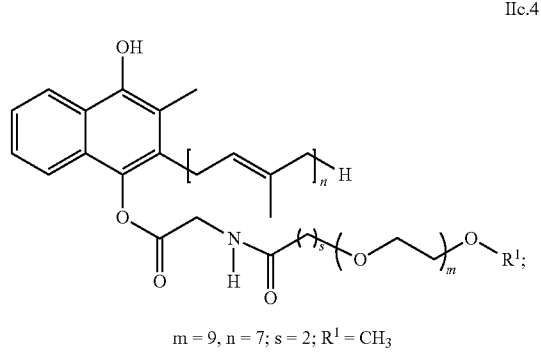
IIc.4
m = 9, n = 7; s = 2; R¹ = CH₃
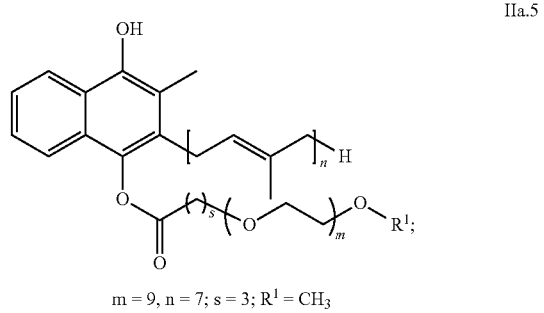
IIa.5
m = 9, n = 7; s = 3; R¹ = CH₃
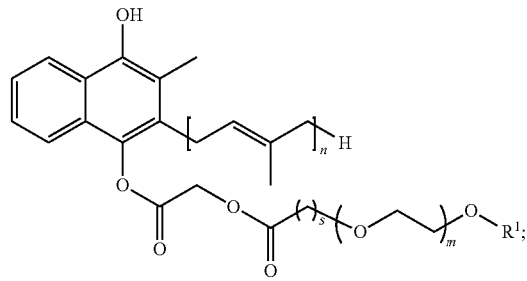
IIb.5
m = 9, n = 7; s = 3; R¹ = CH₃

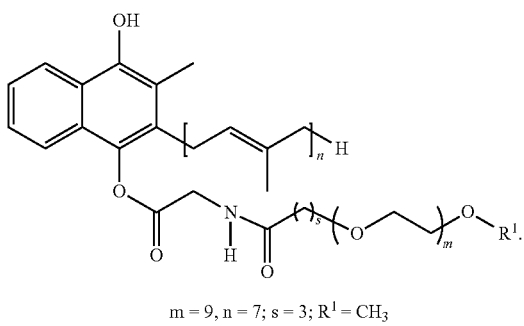

m = 9, n = 7; s = 3; R¹ = CH₃

Menaquinone-7 (MK-7) and Compound Ia.1, m=9, n=7: Comparative Single Dose Oral Pharmacokinetics Studies in Male Sprague Dawley Rats:

| Single Dose Oral Pharmacokinetics Study of Menaquinone-7 in Male Sprague Dawley Rats at Dose of 1000 µg per kg Body Weight | |
|---|---|
| Compound ID: Menaquinone-7 | Molecular weight: 649.0 g/mol |
| Species: Rat | Mode of administration: Oral |
| Strain/Sex: Sprague Dawley/Male | Fasting: yes |
| Animal Groups: 6 animals/group | Formulation vehicle: 500 µg/mL |
| Dose: 1000 µg/kg b.w. | Formulation vehicle: 100 % (v/v) |
| Dose volume: 2 mL/kg b.w. | Sunflower oil |

Single Dose Oral Pharmacokinetics Study of Menaquinone-7 in Male Sprague Dawley Rats at Dose of 1000 µg per kg Body Weight

| Sampling details | | | |
|---|---|---|---|
| Sample | Time point (h) | Storage | Anticoagulant |
| Plasma | 0, 0.5, 1, 2, 4, 6, 8, 12, 24 and 48 h | Crushed ice | $K_2EDTA$ |

Approximately 5 mg of Menaquinone-7 was weighed and transferred to a graduated tube. Then 10 mL of sunflower oil was added and vortex mixed thoroughly until the test item is completely dissolved. The formulation was prepared in dark room under monochromatic light. The final strength of the formulation was 500 µg/mL. The formulation was prepared fresh before administration.

Oral PK Study of Menaquinone-7 in Male SD Rats: Clinical Observations:

Single Dose Oral Pharmacokinetics Study of Menaquinone-7 in Male Sprague Dawley Rats at 1000 µg per kg Body Weight

| Route of Administration | Clinical Observations |
|---|---|
| Oral | Rats showed no adverse clinical signs of toxicity after oral administration of Menaquinone-7 till 48 h post dose |

Results: Oral PK Study of Menaquinone-7 in Male SD Rats—Plasma Concentrations of Menaquinone-7:

Single Dose Oral Pharmacokinetics Study of Menaquinone-7 in Male Sprague Dawley Rats at dose of 1000 µg per kg Body Weight

| | | Plasma Concentration of Menaquinone-7 (ng/mL) | | | | | | | |
|---|---|---|---|---|---|---|---|---|---|
| Group no | Time (h) | R0001 | R0002 | R0003 | R0004 | R0005 | R0006 | Mean | SD |
| G1 | 0.00 | 0.00 | 0.00 | 0.00 | 0.00 | 0.00 | 0.00 | 0.00 | 0.00 |
| | 0.50 | 0.00 | 0.00 | 0.00 | 0.00 | 0.00 | 0.00 | 0.00 | 0.00 |
| | 1.00 | 0.00 | 3.56 | 0.00 | 5.64 | 2.91 | 7.26 | 3.23 | 2.94 |
| | 2.00 | 3.21 | 3.69 | 9.07 | 22.74 | 17.91 | 14.40 | 11.83 | 7.88 |
| | 4.00 | 11.45 | 7.00 | 24.87 | 154.39* | 23.47 | 11.40 | 15.64 | 8.01 |
| | 6.00 | 19.84 | 5.53 | 13.11 | 23.02 | 15.09 | 11.15 | 14.62 | 6.24 |
| | 8.00 | 11.92 | 13.25 | 8.18 | 8.40 | 10.89 | 9.43 | 10.35 | 2.03 |
| | 12.00 | 7.05 | 5.90 | 4.26 | 10.00 | 5.48 | 4.87 | | 2.06 |
| | 24.00 | 8.16 | 9.12 | 3.00 | 3.96 | 4.84 | 5.12 | 5.70 | 2.42 |
| | 48.00 | 3.81 | 3.03 | 0.00 | 2.74 | 0.00 | 4.56 | 2.36 | 1.93 |

LLOQ—Lower Limit of Quantification of Menaquinone-7: 1 ng/mL

Results: Oral PK Study of Menaquinone-7 in Male SD Rats—Plasma PK Parameters of Menaquinone-7:

| Animal_ID | Half life (h) | Tmax (h) | Cmax (ng/ml) | AUClast (h * ng/ml) | MRTlast (h) |
|---|---|---|---|---|---|
| R0001 | 29.15 | 6 | 19.84 | 352.16 | 19.94 |
| R0002 | 30.91 | 8 | 13.25 | 320.74 | 20.91 |
| R0003 | 9.47 | 4 | 24.87 | 166.19 | 8.55 |
| R0004 | 21.96 | 6 | 23.02 | 339.5 | 14.68 |
| R0005 | 12.17 | 4 | 23.47 | 211.72 | 9.02 |
| R0006 | 35.05 | 2 | 14.4 | 286.28 | 20.28 |
| N | 6 | 6 | 6 | 6 | 6 |
| Mean | 23.118 | 5.000 | 19.808 | 279.428 | 15.562 |
| SD | 10.458 | 2.098 | 4.932 | 74.913 | 5.706 |

| Single Dose Oral Pharmacokinetics Study of Menaquinone-7 in Male Sprague Dawley Rats | |
|---|---|
| PK Parameters | Menaquinone-7 |
| Dose (μg/kg b.w.) | 1000 |
| $C_{max}$ (ng/mL) | 19.81 ± 4.93 |
| $T_{max}$ (h) | 5.00 ± 2.10 |
| $AUC_{last}$ (h * ng/ml) | 279.43 ± 74.91 |
| Half life (h) | 23.12 ± 10.46 |
| $MRT_{last}$ (h) | 15.56 ± 5.71 |

Single Dose Oral Pharmacokinetics Study of compound Ia.1, m=9, n=7 in Male Sprague Dawley Rats at an Equivalent Dose of 1000 μg of Menaquinone-7 per kg Body Weight:

Oral PK Study of Compound Ia.1, m=9, n=7 in Male SD Rats:

Single Dose Oral Pharmacokinetics Study of compound Ia.1, m = 9, n = 7 in Male Sprague Dawley Rats at an Equivalent dose of 1000 μg Menaquinone-7 per kg Body Weight

| | |
|---|---|
| Compound ID: compound Ia.1, m = 9, n = 7 | Molecular weight: 793.12 g/mol |
| Species: Rat | Mode of administration: Oral |
| Strain/Sex: Sprague Dawley/Male | Fasting: yes |
| Animal Groups: 6 animals/group | Formulation vehicle: Equivalent to ~610 μg compound Ia.1, m = 9, n = 7/mL (equivalent to 500 μg/mL of MK-7) |
| Dose: Equivalent to 1000 μg Menaquinone-7/kg b.w. | Formulation vehicle: 100 % (v/v) Sunflower oil |
| Dose volume: 2 mL/kg b.w. | |

| Sampling details | | | |
|---|---|---|---|
| Sample | Time point (h) | Storage | Anticoagulant |
| Plasma | 0, 0.5, 1, 2, 4, 6, 8, 12, 24 and 48 h | Crushed ice | $K_2$EDTA |

Formulation Preparation: Oral PK Study of Compound Ia.1, m=9, n=7 in Male SD Rats:

Approximately 6 mg of compound Ia.1, m=9, n=7 is weighed and transferred to a graduated tube. Then 9.836 mL of sunflower oil is added and vortex mixed thoroughly until the test item gets completely dissolved. The formulation was prepared in dark room under monochromatic light. The final strength of the formulation is 610 μg/mL (equivalent to 500 μg/mL of MK-7). The formulation is prepared fresh before administration.

Oral PK Study of Compound Ia.1, m=9, n=7 in Male SD Rats: Clinical Observations:

Single Dose Oral Pharmacokinetics Study of compound Ia.1, m = 9, n = 7 in Male Sprague Dawley Rats at an Equivalent dose of 1000 μg Menaquinone-7 per kg Body Weight

| Route of Administration | Clinical Observations |
|---|---|
| Oral | Rats shows no adverse clinical signs of toxicity after oral administration of compound Ia.1, m = 9, n = 7 till 48 h post dose |

Results: Oral PK Study of Compound Ia.1, m=9, 11=7 in Male SD Rats—Plasma Concentrations of Compound Ia.1, m=9, n=7:

Single Dose Oral Pharmacokinetics Study of compound Ia.1, m = 9, n = 7 in Male Sprague Dawley Rats at an Equivalent dose of 1000 μg Menaquinone-7 per kg Body Weight

| | | Plasma Concentration of compound Ia.1, m = 9, n = 7 (ng/mL) | | | | | | | |
|---|---|---|---|---|---|---|---|---|---|
| Group No | Time (h) | R0007 | R0008 | R0009 | R0010 | R0011 | R0012 | Mean | SD |
| G2 | 0.00 | 0.000 | 0.000 | 0.000 | 0.000 | 0.000 | 0.000 | 0.000 | 0.000 |
| | 0.50 | 0.000 | 0.000 | 0.000 | 0.000 | 0.000 | 0.000 | 0.000 | 0.000 |
| | 1.00 | 0.000 | 0.000 | 0.000 | 0.000 | 0.000 | 0.000 | 0.000 | 0.000 |
| | 2.00 | 0.000 | 0.000 | 0.000 | 0.000 | 0.000 | 0.000 | 0.000 | 0.000 |
| | 4.00 | 0.000 | 0.000 | 0.000 | 0.000 | 0.000 | 0.000 | 0.000 | 0.000 |
| | 6.00 | 0.000 | 0.000 | 0.000 | 0.000 | 0.000 | 0.000 | 0.000 | 0.000 |
| | 8.00 | 0.000 | 0.000 | 0.000 | 0.000 | 0.000 | 0.000 | 0.000 | 0.000 |

-continued

Single Dose Oral Pharmacokinetics Study of compound Ia.1,
m = 9, n = 7 in Male Sprague Dawley Rats at an Equivalent
dose of 1000 μg Menaquinone-7 per kg Body Weight Plasma Concentration of compound Ia.1, m = 9, n = 7 (ng/mL)

| Group No | Time (h) | R0007 | R0008 | R0009 | R0010 | R0011 | R0012 | Mean | SD |
|---|---|---|---|---|---|---|---|---|---|
| | 12.00 | 0.000 | 0.000 | 0.000 | 0.000 | 0.000 | 0.000 | 0.000 | 0.000 |
| | 24.00 | 0.000 | 0.000 | 0.000 | 0.000 | 0.000 | 0.000 | 0.000 | 0.000 |
| | 48.00 | 0.000 | 0.000 | 0.000 | 0.000 | 0.000 | 0.000 | 0.000 | 0.000 |

LLOQ—Lower Limit of Quantification of compound Ia.1, m = 9, n = 7 in Plasma: 2 ng/mL Oral PK Study of Compound Ia.1, m=9, n=7 in Male SD Rats—Plasma Concentrations of Menaquinone-7:

Single Dose Oral Pharmacokinetics Study of compound Ia.1, m = 9,
n = 7 in Male Sprague Dawley Rats at an Equivalent dose of 1000
μg Menaquinone-7 per kg Body Weight to provide plasma concentration of MK-7.

Plasma Concentration of Menaquinone-7 (ng/mL)

| Group No | Time (h) | R0007 | R0008 | R0009 | R0010 | R0011 | R0012 | Mean | SD |
|---|---|---|---|---|---|---|---|---|---|
| G2 | 0.00 | 0.00 | 0.00 | 0.00 | 0.00 | 0.00 | 0.00 | 0.00 | 0.00 |
| | 0.50 | 0.00 | 0.00 | 0.00 | 0.00 | 0.00 | 0.00 | 0.00 | 0.00 |
| | 1.00 | 0.00 | — | — | — | — | — | — | — |
| | 2.00 | — | — | — | — | — | — | — | — |
| | 4.00 | — | — | — | — | — | — | — | — |
| | 6.00 | — | — | — | — | — | — | — | — |
| | 8.00 | — | — | — | — | — | — | — | — |
| | 12.00 | — | — | — | — | — | — | — | — |
| | 24.00 | — | — | — | — | — | — | — | — |
| | 48.00 | — | — | — | — | — | — | — | — |

LLOQ—Lower Limit of Quantification of Menaquinone-7 in Plasma: 1 ng/mL

Results: Oral PK Study of Compound Ia.1, m=9, n=7 in Male SD Rats:

Plasma PK Parameters of MK-7:

| Animal_ID | Half Life (h) | Tmax (h) | Cmax (ng/mL) | AUClast (h * ng/ml) | MRTlast (h) |
|---|---|---|---|---|---|
| R0007 | 37 | 4 | — | — | — |
| R0008 | 26 | 4 | — | — | — |
| R0009 | 42 | 4 | — | — | — |
| R0010 | 56 | 4 | — | — | — |
| R0011 | 53 | 4 | — | — | — |
| R0012 | 52 | 4 | — | — | — |
| N | 6 | 6 | — | — | — |
| Mean | 44 | 4 | — | — | — |
| SD | 11 | 0 | — | — | — |

Single Dose Oral Pharmacokinetics Study of compound Ia.1, m = 9,
n = 7 in Male Sprague Dawley Rats

| PK Parameters | Menaquinone-7 |
|---|---|
| Dose (μg/kg b.w.) | 1000 |
| $C_{max}$ (ng/ml) | 28 |
| $T_{max}$ (h) | 4 |
| $AUC_{last}$ (h * ng/ml) | 400 |

Single Dose Oral Pharmacokinetics Study of compound Ia.1, m = 9,
n = 7 in Male Sprague Dawley Rats

| PK Parameters | Menaquinone-7 |
|---|---|
| Half life (h) | 45 |
| $MRT_{last}$ (h) | 20 |

Results: Comparative Data—Plasma Concentrations of Menaquinone-7:

Comparative Single Dose Oral Pharmacokinetics Studies of compound
Ia.1, m = 9, n = 7 and Menaquinone-7 (MK-7) in Male Sprague Dawley Rats Plasma Concentration of Menaquinone-7 (ng/ml)

| | G1: Menaquinone-7 | | G2: compound Ia.1, m = 9, n = 7 | |
|---|---|---|---|---|
| Time (h) | Mean | SD | Mean | SD |
| 0.00 | 0.00 | 0.00 | 0.00 | 0.00 |
| 0.25 | 0.00 | 0.00 | 0.00 | 0.00 |
| 0.50 | 3 | 2 | — | — |
| 1.00 | 11 | 7 | — | — |
| 2.00 | 15 | 8 | — | — |
| 4.00 | 14 | 6 | — | — |
| 6.00 | 10 | 2 | — | — |
| 8.00 | 6 | 2 | — | — |
| 24.00 | 5 | 2 | — | — |
| 48.00 | 2 | 1 | — | — |

Comparative Data—Plasma PK Parameters of Menaquinone-7:

| Single Dose Comparative Oral Pharmacokinetics Studies of Menaquinone-7 and compound Ia.1, m = 9, n = 7 in Male Sprague Dawley Rats - Plasma PK parameters of Menaquinone-7 | | |
|---|---|---|
| PK Parameters | Menaquinone-7 | compound Ia.1, m = 9, n = 7 |
| Dose (μg/kg b.w.) | 1000 | 1000 (Equivalent dose) |
| $C_{max}$ (ng/mL) | 19.81 ± 4.93 | — |
| $T_{max}$ (h) | 5.00 ± 2.10 | — |
| $AUC_{last}$ (h * ng/ml) | 279.43 ± 74.91 | — |
| Half life (h) | 23.12 ± 10.46 | — |
| $MRT_{last}$ (h) | 15.56 ± 5.71 | — |

Based on the above results, the plasma maximum concentration after oral administration of Menaquinone-7 at 1 mg/kg b.w in rats using sunflower oil as a formulation vehicle is 19 ng/mL. When compound Ia.1, m=9, n=7 is dosed at comparable dose, the observed plasma maximum concentration is about 40% higher. Depending on the compounds tested, the plasma maximum concentration ranges from about 40% to 60% higher.

The observed plasma exposure of Menaquinone-7, after Menaquinone-7 administration was 279.43±74.91, whereas plasma exposure of Menaquinone-7 after compound Ia.1, m=9, n=7 is about 45% higher. Plasma exposure of Menaquinone-7 is found to be higher post oral administration of compound Ia.1, m=9, n=7 compared to oral administration of Menaquinone-7 alone at similar dose of 1000 μg/kg body weight. No concentrations of compound Ia.1, m=9, n=7 is observed.

Administration of the Compounds in Subjects at Risk for Development of Calciphylaxis:

This example describes the administration of the compounds of the present application to subjects at risk for development of calciphylaxis, but who have not yet developed the characteristic skin lesions of calciphylaxis. Risk factors to be considered include, but are not limited to, diabetes mellitus, obesity, hemodialysis, and prior treatment with warfarin (Nigwekar et al. (2016) "A Nationally Representative Study of Calcific Uremic Arteriolopathy Risk Factors," J. Am. Soc. Nephrol. 27(11):3421-9). The administration of these compounds can result in protection of the subjects from skin lesions and a change in certain biomarker levels indicative of the prevention of the development of calciphylaxis.

Subjects at risk of development of calciphylaxis orally receive a selected compound of the present application at 5 mg, 10 mg, 20 mg, 30 mg, 50 mg or 100 mg once daily for at least 2 weeks, 4 weeks, 6 weeks, 8 weeks, 3 months, 6 months, 1 year, or indefinitely. The dosage form is a 5 mg, 10 mg, 20 mg, 50 mg or 100 mg soft-gel capsule. Two 50 mg capsules are be administered once daily to the 100 mg dosage cohort. All subjects with elevated risk factors for calciphylaxis will develop the characteristic skin lesions of calciphylaxis. The intent of treating with the compound of the present application proactively (prior to a clinical diagnosis of calciphylaxis) is the prevention of lesion appearance. A drop in frequency of, or elimination of lesion appearances is contemplated to be a successful treatment.

Several biomarkers can be assessed to determine the efficacy of the compound to be administered at the three dose levels. Exemplary biomarkers include PIVKA-II; uncarboxylated and total Matrix Gla Protein (MGP); uncarboxylated, carboxylated and total osteocalcin protein; uncarboxylated, carboxylated and total Protein C, osteoprotegerin, Fetuin A and hs-CRP. Blood samples are obtained to measure the biomarkers according to the following schedule. Blood sampling can occur during treatment on a weekly or monthly basis. It is contemplated that administration of the disclosed compounds will result in (i) a decrease in PIVKA-II, which is indicative of slowing the progression of, arresting, or reversing, calciphylaxis, (ii) a decrease in uncarboxylated MGP, uncarboxylated osteocalcin, and/or uncarboxylated Protein C, which is indicative of slowing the progression of, arresting, or reversing calciphylaxis. Further, pulse wave velocity (PWV) can be measured to assess arterial compliance. Improved vascular compliance will be indicative of slowing the progression of, arresting, or reversing calciphylaxis.

Administration of the Disclosed Compounds of the Application in Subjects Diagnosed with Calciphylaxis:

This example describes the administration of the disclosed compounds to subjects diagnosed with calciphylaxis. Typical symptoms include presentation of characteristic painful skin lesions (Nigwekar et al. (2015) Calciphylaxis: Risk Factors, Diagnosis, and Treatment. Am. J. Kidney Dis. 66:133-46). Definitive diagnosis of calciphylaxis is achieved via skin biopsy. Further conditions need to be considered for correct diagnosis.

Subjects diagnosed with calciphylaxis orally receive the disclosed compound at 5 mg, 10 mg, 25 mg, 50 mg or 100 mg once daily for at least 2 weeks, 4 weeks, 6 weeks, 8 weeks, 3 months, 6 months, 1 year, or indefinitely. The dosage form is a 5 mg, 10 mg, 25 mg, 50 mg or 100 mg soft-gel capsule. Two 50 mg capsules are administered once daily to the 100 mg dosage cohort.

The arrest of, or decreases in lesion size and frequency is contemplated to be an indication of successful treatment. The administration of the disclosed compounds according to the foregoing will result in the arrest of, or decrease in lesion size and frequency. Additionally, because calciphylaxis has a considerable mortality risk, increased overall survival time of diagnosed subjects will be an indication of treatment success. Furthermore, the administration of the disclosed compounds according to the foregoing will result in an increased overall survival time of diagnosed subjects.

Administration of the Disclosed Compounds in Subjects with End Stage Renal Disease (ESRD) to Reverse or Slow the Progression of Tissue Calcification:

This example describes the administration of the disclosed compounds to a subject with ESRD and on stable hemodialysis. The administration of the disclosed compounds will result in a change in aortic compliance (via plethysmography), vascular calcification and certain biomarker levels indicative of slowing the progression of, arresting, or reversing tissue calcification.

ESRD subjects on stable hemodialysis orally receive the disclosed compounds at 5 mg, 10 mg, 25 mg, 50 mg, 100 mg, 200 mg, 300, mg, 400 mg or 500 mg once daily for least 2 weeks, 4 weeks, 6 weeks, 8 weeks, 3 months, 6 months, 1 year, or indefinitely. The dosage form is a 5 mg, 10 mg, 25 mg, 50 mg, 75 mg or 100 mg soft-gel capsule. Two 50 mg capsules are administered once daily to the 100 mg dosage cohort.

A 50 y.o., 65 kg male patient diagnosed with the typical symptoms associated with moderate calciphylaxis is treated with 100 mg of the compound Ia.1, m=9, n=7, for a period of 8 weeks. After the treatment period, the patient is admitted and evaluated. The patient is found to have a significant change in the examined biomarker levels suggesting about a 10% reduction in vascular calcification, and is also shown to have a 10% reduction in tissue calcification.

A 65 y.o., 45 kg female patient diagnosed with the typical symptoms associated with moderate calciphylaxis is treated with 20 mg of the compound Ia.1, m=9, n=7, for a period of 10 weeks. After the treatment period, the patient is admitted and evaluated. The patient is found to have a significant change in the examined biomarker levels suggesting about a 20% reduction in vascular calcification, and is also shown to have a 15% reduction in tissue calcification.

A 55 y.o., 70 kg male patient diagnosed with the typical symptoms associated with moderate calciphylaxis is treated with 50 mg of compound Ia.1, m=9, n=7, for a period of 3 months. After the treatment period, the patient is admitted and evaluated. The patient is found to have a significant change in the examined biomarker levels suggesting about a 25% reduction in vascular calcification, and is also shown to have a 20% reduction in tissue calcification.

Coronary arterial calcium scores (CAC) are used to estimate the extent of calcification of thoracic arteries. A high CAC score is indicative of calcification, and treatment has the aim of arresting the long-term increase in CAC score, or reversing it, or slowing the rate of increase.

Aortic plethysmography also is used to measure arterial compliance, which decreases as calcification increases. Pulse wave velocity (PWV) also is measured to assess arterial compliance. The foregoing measures are useful in estimating the utility of treatments intended to prevent, slow the progression of, arrest or reverse vascular calcification. These measurements are used pre- and post-treatment with the disclosed compounds to assess treatment value.

Several biomarkers are assessed to determine the efficacy of the disclosed compounds at the three dose levels. Exemplary biomarkers include PIVKA-II; uncarboxylated and total Matrix Gla Protein (MGP); uncarboxylated, carboxylated and total osteocalcin protein; uncarboxylated, carboxylated and total Protein C, and hs-CRP. Blood samples are obtained to measure the biomarkers, most conveniently during patient visits for hemodialysis.

The administration of the disclosed compounds can result in (i) an decrease in PIVKA-II, which is indicative of slowing the progression of, arresting or reversing tissue calcification, (ii) a decrease in uncarboxylated MGP, uncarboxylated osteocalcin, and/or uncarboxylated Protein C, which is indicative of slowing the progression of, arresting or reversing tissue calcification, and/or (iii) a decrease in hs-CRP, which is indicative of slowing the progression of, arresting or reversing tissue calcification and/or reduced inflammation. Following the daily administration of 0.2 mg, 2 mg, 5 mg, 10 mg, 25 mg, 50 mg, 75 mg, 100 mg, 150 mg, 200 mg, 300 mg, 400 mg or 500 mg or more, of the disclosed compounds and compositions, at least one of PIVKA-II, under-carboxylated Matrix Gla Protein (MGP), under-carboxylated osteocalcin protein, will show a change indicative of slowing the progression of, arresting or reversing tissue calcification.

The above compounds comprising a menaquinol derivative of the formula I, II or III, and compounds disclosed herein, are tested for biological activity using thirteen (13) different representative cell lines, using both cell stock and mouse cell models, and also HL-60 human leukemia cell line, as disclosed in the experimental section below. Other cell lines for testing different cancers may be obtained from the American Type Culture Collection (ATCC).

Study Design:

Cells are seeded in 96-well microplates, and after exposure to the above disclosed compounds for 3 days, CellTiter-Glo Luminescent Cell Viability kits are used to determine the number of viable cells in culture based on quantitation of the ATP present, which presents the presence of metabolically active cells. OD signal is proportional to the amount of ATP present. The amount of ATP is directly proportional to the number of cells present in culture. This method is used to monitor drug-induced effects on cell proliferation.

Materials: Reagent and Antibodies

| Reagent | Company | Catalog |
| --- | --- | --- |
| FBS | Gibco | 10099141 |
| 0.25% Trypsin/EDTA | Gibco | 25200-056 |
| PBS | Thermo Fisher | 10010-023 |
| Penicillin/Streptomycin (100x) | Gibco | 15140122 |
| DMSO | Sigma | D2650 |
| 1640 | Gibco | 11875093 |
| CellTiter-Glo Luminescent Cell Viability Assay | Promega | G7573 |
| IMDM | Gibco | 12440053 |
| DMEM | Gibco | 11995073 |
| Horse serum | Hongquan Bio | HQ30073 |
| EMEM | ATCC | 30-2003 |

Description of Cell Lines and Media Components:

| Cell Lines | Media Components | Description |
| --- | --- | --- |
| LS174T | EMEM + 10% FBS + 1% PS | Adenocarcinoma; Colorectal; Dukes' type B Human |
| HL-60 Human Leukemia-60 | IMDM + 20% FBS + 1% PS | Promyeloblast Acute promyelocytic leukemia Human |
| HT60 | | Mouse cell line |
| LK-2 | 1640 + 10% FBS + 1% PS | Lung squamous cell carcinoma Human |
| NCI-H1993 H-1993 | 1640 + 10% FBS + 1% PS | Adenocarcinoma; Non-small cell lung cancer; Stage 3A Human |
| DMS-114 | 1640 + 10% FBS + 1% PS | Lung small cell carcinoma |
| NCI-N87 N-87; NCI-H87 | 1640 + 10% FBS + 1% PS | Gastric Carcinoma Human |
| SNU-601 NCI-SNU-601 | 1640 + 10% FBS + 1% PS | Gastric signet ring cell adenocarcinoma Human |
| DU-145 | EMEM + 10% FBS + 1% PS | DU 145: Cell line with epithelial morphology, isolated from the brain of a white, male with prostate cancer. Human |

-continued

| Cell Lines | Media Components | Description |
| --- | --- | --- |
| MDA-MB-231 | 1640 + 10% FBS + 1% PS | Breast; Mammary gland Adenocarcinoma Human |
| MDA-MB-453 | DMEM + 10% FBS + 1% PS | Breast; Mammary gland Human |
| U87MG | EMEM + 10% FBS + 1% PS | Brain Likely Glioblastoma Human |
| JHH-7 Jhh-7; JHH7; FLC-7; FLC7 Functional Liver Cell-7 | EMEM + 10% FBS + 1% PS | Liver Cancer Human |
| MIA PaCa-2 | DMEM + 10% FBS + 2.5% Horse serum + 1% PS | Pancreas Human |

FBS-Fetal bovine serum; Dulbecco's modified Eagle's medium (DMEM); Roswell Park Memorial Institute (RPMI) medium 1640.
SCLC Review; See B. J. Drapkin et al., Cold Spring Harb. Perspect. Med. 2021; 11:a038240.

The compounds are tested at 10 mg in DMSO at a concentration of 100 μM in a stock solution of 20 mM, using 1 mL of stock solution.

Preparation of Cell Assay Plates: Day 1
1) Pre-warm medium, 0.25% trypsin, cell media with 37° C. water bath.
2) Observed cells under microscope to assess the degree of confluency and confirm the absence of bacterial and fungal contaminants.
3) Remove medium, wash cells with 10 mL PBS twice. Add 5 mL 0.25% Trypsin/EDTA reagent for a T-75 flask. Put flask in the incubator for a few minutes, or until cells have detached. Add 10 mL of fresh cell medium contain FBS, rinse the cells and transfer to a centrifuge tube. For suspension cells, collect the cells and centrifuge the cells directly.
4) Centrifuge collected cells at 1200 rpm for 5 minutes.
5) After centrifugation, discard the supernatant. Resuspend the cell pellet with 10 mL cell medium contain FBS.
6) Remove 20 μL of the resuspended cells to count cells. Count cells by adding 20 μL cell suspension to 20 μL dye with Cell Counter Star, record live cell number and viability in cell tracking sheet.
7) Using cell medium contain FBS, adjust the volume of the suspension to achieve a cell concentration. The seeding density of each adherent cell lines are 3000/well. For HL-60, the seeding density is 5000/well.
8) Transfer 90 μL of the cell suspension to each well of a 96-well white plate according to the plate map. For blank control, add 100 μL complete medium.
9) Incubate cells overnight at 37° C./5% $CO_2$.

Compounds Dosage Gradient Solution Preparation: Day 2
1) Solid compounds are solubilized in DMSO to a stock solution.
2) Dilute the compounds accordingly.
3) Add 10 μL diluted compounds at each concentration to 90 μL cells. For the vehicle group, add 10 μL corresponding vehicle to 90 μL cells.
4) Incubate the cells at 37° C./5% $CO_2$ for 3 days for each of the tested compounds and cisplatin.

CTG Detect: Day 5
1) Incubate the plates at room temperature and away from light for 30 minutes.
2) Thaw three vials of CellTiter-Glo® Reagent at room temperature and equilibrate them to room temperature prior to use. Avoid light.
3) Add 100 μL/well of CellTiter-Glo® Reagent in each well. Avoid light.
4) Mix contents for 2 minutes on an orbital shaker.
5) Incubate plate at room temperature for 10 minutes to stabilize the luminescent signal.
6) Read plates in Envision.

The plates are maped at 4 plates for each cell line for a total of 52 plates.

The results of the cell assays demonstrate that the disclosed compounds are shown to be positive for change in the viable cells in culture and cell proliferation; and that at different concentrations, certain of the compounds are significantly more active than others.

Topical Formulations for Treatment of Wounds:
The compounds of the formula I, II or III and compositions comprising these compounds, may be used effectively as a topical composition or wound dressing composition, for the treatment of wounds or damaged skin, such as wounds associated with tissue calcification and calciphylaxis. The composition may heal, rejuvenate and revitalize a patient's wounds and skin. In one variation, the composition comprises of about 1.25 mg to 500 mg of a compound of the formula I, II or III, or a mixture thereof. In another variation, the composition may comprise of about 0.01% wt/wt to 20% wt/wt, or about 1%, 5%, 10%, 15% or about 20% of the compound of the formula I, II or III, or a mixture thereof, in the formulation. The wounds may be acute wounds or chronic wounds. Such wounds may include ulcers such as diabetic ulcers, decubitus ulcers, and venous ulcers.

In one variation, the topical application of the composition to the damaged skin reduces inflammation and facilitates wound healing. Without being bound by any theory asserted herein, it is noted that the composition may stimulate proteasome function and promote normal fibroblast (i.e., reverses senescence) activity with the formation of new collagen. This function assists proteasomes to mop up fragmented protein particles, including collagen, thus minimizing the formation of undesired clumped collagen build up.

In one variation, the composition may be prepared in the form of a gel, cream or ointment. In another variation, the topical composition further comprises at least one ingredient selected from the group consisting of water, a solvent, a preservative, a surfactant, a gelling agent, and a pH balancer. The compound or mixture of compounds may be formulated for administration in a pharmaceutical carrier using known methods in the art. See, e.g., Remington. The Science and Practice of Pharmacy (9$^{th}$ Ed. 1995), herein incorporated by reference. The compound may be mixed with, an acceptable carrier. Carriers which may be used include petroleum jelly, lanoline, polyethylene glycols, alcohols, transdermal enhancers, and combinations of two or more thereof. In another variation, the topical composition may be partially or fully incorporated in delivery vehicles such as microspheres or nanoparticles, or are encapsulated, such as in liposomes. In another variation, a topical composition may be pre-impregnated in/on a support structure, such as a tape, patch or bandage.

In another embodiment, the composition is formulated and delivered using a transdermal patch. As provided herein, the transdermal patches provide measured sustained release or delivery of the compound of the formula I, II or III, or a mixture thereof, over a desired period of time. The transdermal patch can also be easily removed in the event that a patient experiences unwanted side-effects associated with the patch. As presently formulated, the transdermal patch may deliver more precise dosages of the compound over time. In one variation, the transdermal patch provides a delivery rate of the compound of the formula I, II or III, or a mixture thereof, to the drug delivery area or zone (i.e., the area where the active agent-containing composition contacts an intact human skin surface or the wound) in amounts of from about 1 µg/cm$^2$/day to about 600 µg/cm$^2$/day, about 1 µg/cm$^2$/day to about 280 µg/cm$^2$/day, about 10 µg/cm$^2$/day to about 280 µg/cm$^2$/day, or about 50 µg/cm$^2$/day to about 250 µg/cm$^2$/day. In one variation, the composition is formulated to provide sustain delivery of the compound of the formula I, II or III, or a mixture thereof, over a continuous period of time from about 5 hours to 7 days. In another variation, the transdermal patch is formulated to deliver the cited compounds for a continuous period of from about 12 hours to 24 hours, or from about 1 day to 3 days. The transdermal patches may be continuously administered over an administration period of from about 1 week to about 1 month.

In addition to the compound of the formula I, II or III, or a mixture thereof, the topical composition may comprise other additives, such as pH-adjusting additives, including acids, such as citric acid or lactic acid, bases or buffers, such as sodium lactate, sodium acetate, sodium phosphate, sodium citrate, sodium borate, or sodium gluconate. In addition, the compositions may contain antimicrobial preservatives in some embodiments. The antimicrobial preservatives include, for example, methylparaben, propylparaben, benzyl alcohol, ethylhexylglycerin, potassium sorbate, phenoxyethanol, EDTA, grapefruit seed extract, tea tree oil, sodium benzoate, dehydroacetic acid, and combinations thereof. In another variation, the composition may include anti-fungal preservatives optionally in combination with anti-bacterial preservatives. In one variation, the composition may include anti-biofilm anti-microbial agents such as lactoferrin, xylitol, farnesol gallium, dispersin B and EDTA, or combinations thereof.

In one embodiment, the dermal patch may be prepared as follows: 1) The measure amount of the compound of the compound of the formula I, II or III, or a mixture thereof, are dissolved in a solvent, such as THF, EtOAc or methanol or mixtures thereof, and added to the DuroTak 87-2194 adhesive to form the solution containing the compound. 2) The solution of the compound and adhesive blend is formed onto a release liner using a mechanical coater. 3) The coated release liner is then passed through an oven which causes the solvent (e.g., ethyl acetate and any solvent present in the liquid DuroTak) to evaporate, forming a solid, tacky layer of adhesive matrix that contains the compound of the formula I, II or III, or a mixture thereof, dispersed in an adhesive matrix. 4) A polyethylene film is then laminated to the adhesive matrix. 5) The compound-containing patch laminate is then cut to specified dimensions using a die cutter and the patches are then individually pouched in sealed foil-lined material.

In another variation, the compositions may be used without microporous tape or other support structure. In one variation, the composition is sufficiently viscous or sticky to produce an occlusive dressing without a support structure, such as a tape. In another variation, the composition may be applied beneath a support structure, or on top of a support structure. In yet another variation, the composition if formulated in a microporous support structure, such as a tape for accepting the composition on the outer surface of the tape and deliver the composition in contact with the damaged skin through the pores, skin or damaged skin tissues.

In one embodiment, a tape (or other support structure) is applied to the length of the wound or scar and the topical composition is applied to the tape. The application of the tape and gel may be initiated as soon as convenient after a wound is observed, or before the subcutaneous wounds breaks the skin. In one variation, the tape is a microporous tape that permits contact of the topical composition with the skin when the topical composition is applied over the tape. In one variation, the topical composition may be applied to the skin before the tape is placed on the composition.

Accordingly, the present application discloses a method of accelerating the healing of a wound, comprising administering to a site in need of accelerated healing a therapeutically effective amount of a compound of the formulae I, II or III to promote wound healing. The method of topical application may be performed in conjunction with the oral administration of the composition of the formulae I, II or III, to accelerate wound healing, meaning the topical application may be applied before, during and/or after the oral administration of the compounds of the formulae I, II or III, as disclosed herein.

As provided herein, the acceleration of wound healing includes any increase in the rate of healing of a treated wound when compared to the rate of healing occurring in an untreated wound, with or without the oral administration of the compounds of the formulae I, II or III, as disclosed herein. Accelerated healing of a wound achieved using the disclosed methods may lead to a treated wound healing rate of least 5% faster than an untreated wound, at a rate at least 10% faster, 15%, 20%, 25% faster; or at least 50%, 75%, or 100% faster. Such increase or acceleration in the rate of wound healing of at least 5% to 100% may be compared to a patient or subject being subject to concurrent treatment by oral administration of the compounds of the formulae I, II or III.

While a number of exemplary embodiments, aspects and variations have been provided herein, those of skill in the art will recognize certain modifications, permutations, additions and combinations and certain sub-combinations of the embodiments, aspects and variations. It is intended that the following claims are interpreted to include all such modifications, permutations, additions and combinations and certain sub-combinations of the embodiments, aspects and variations are within their scope. The entire disclosures of all documents cited throughout this application are incorporated herein by reference. References: 1) Rachel M. Holden et al. Vitamins K and D Status in Stages 3-5 Chronic Kidney Disease; *Clin J Am Soc Nephrol* 5: 590-597, 2010. 2) Pilkey, R. M. M D et al. Subclinical Vitamin K Deficiency in Hemodialysis Patients Am J Kidney Dis 49:432-439, 2007. 3) Westhofen P et al. Human vitamin K 2,3-epoxide reductase complex subunit 1-like 1 (VKORC1L1) mediates vitamin K-dependent intracellular antioxidant function. J Biol Chem 2011; 286: 15085-94. 4) Caspers, M. et al., Two enzymes catalyze vitamin K 2,3-epoxide reductase activity in mouse: VKORC1 is highly expressed in exocrine tissues while VKORC1L1 is highly expressed in brain. Thrombosis Research 135:977-983, 2015. 5) Himmelfarb, J. et al., Plasma protein thiol oxidation and carbonyl formation in chronic renal failure. *Kidney International, Vol.* 58: 2571-2578 2000. 6) Price, P. A. et al., Discovery of a High Molecular Weight Complex of Calcium, Phosphate, Fetuin, and Matrix-Carboxyglutamic Acid Protein in the Serum of Etidronate-treated Rats. J Biol Chem. 277 (6): 3926-3934, 2002. 7) Pasch, A. et al. Nanoparticle-Based Test Measures Overall Propensity for Calcification in Serum J Am Soc Nephrol 23: 1744-1752, 2012. 8) Nigwekar, S. U. et al. Vitamin K-Dependent Carboxylation of Matrix Gla Protein Influences the Risk of Calciphylaxis. J Am Soc Nephrol 28: 1717-1722, 2017.

What is claimed is:

1. A biologically active menaquinol derivative of the formulae I, II or III:

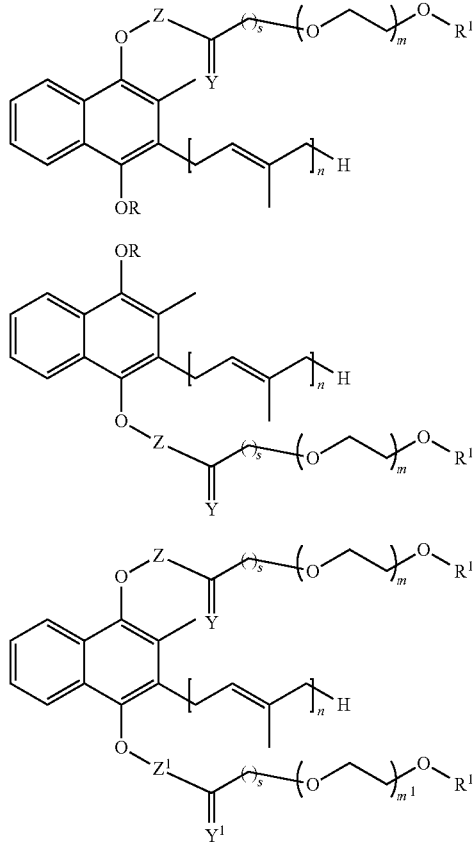

wherein:

m is an integer from 2 to 15;

$m^1$, where present, is an integer from 3 to 15;

n is 7, 8, 9 or 10;

R is H, or is selected from the group consisting of —C(O)C$_1$-C$_6$ alkyl, —C(O)(CH$_2$)$_q$—O—C(O)C$_1$-C$_6$ alkyl and —Z—(C=Y)(CH$_2$)$_s$—(OCH$_2$CH$_2$)—O—R$^1$;

R$^1$ is H or —CH$_3$;

R$^2$ is H or C$_1$-C$_3$ alkyl;

q is 1, 2 or 3;

s is 1, 2 or 3;

Y is O, NR$^2$ or S;

Z is —C(O)CH$_2$O—, —C(O)CH$_2$NH— or is absent; and

Z$^1$ is —C(O)CH$_2$O—, —C(O)CH$_2$NH— or is absent.

2. The menaquinol derivative of claim 1 that is of the formula Ia, Ib or Ic:

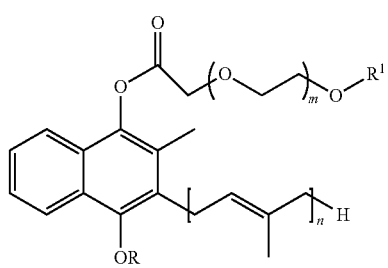

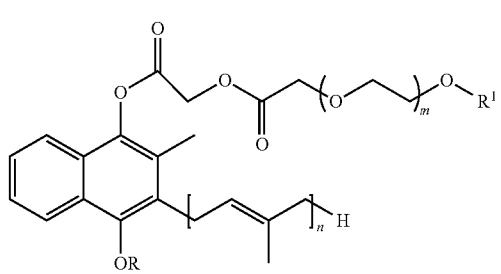

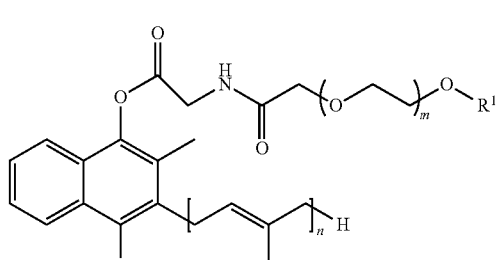

wherein:

m is an integer from 2 to 15;

n is 7, 8, 9 or 10;

R is H, or is selected from the group consisting of —C(O)C$_1$-C$_6$ alkyl, —C(O)(CH$_2$)$_q$—O—C(O)C$_1$-C$_6$ alkyl and —Z—(C=Y)(CH$_2$)$_s$—(OCH$_2$CH$_2$)—O—R$^1$;

R$^1$ is H or —CH$_3$;

R$^2$ is H or C$_1$-C$_3$ alkyl;

q is 1, 2 or 3;

s is 1, 2 or 3;

Y is O, NR$^2$ or S; and

Z is —C(O)CH$_2$O—, —C(O)CH$_2$NH— or is absent.

3. The menaquinol derivative of claim 1 that is of the formula Ia.1, Ib.1 or Ic.1:

Ia.1
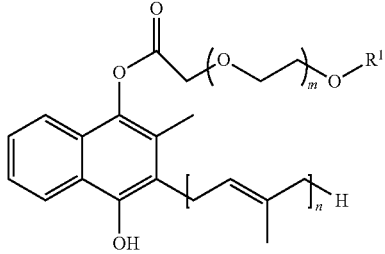

Ib.1
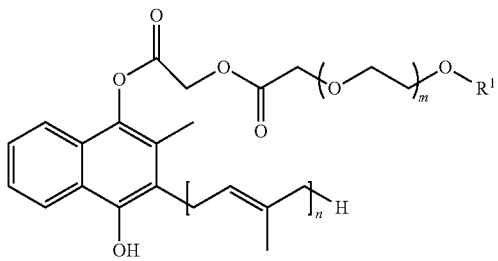

Ic.1
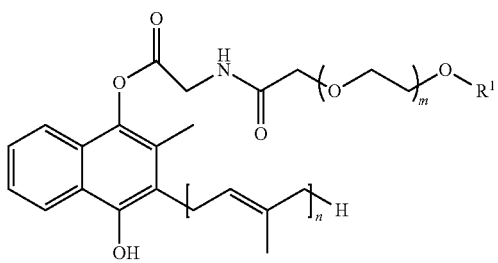

wherein:
m is an integer from 8 to 12;
n is 7, 8, 9 or 10; and
$R^1$ is H or —$CH_3$.

4. The menaquinol derivative of claim 3 that is of the formula IIa, IIb or IIc:

IIa
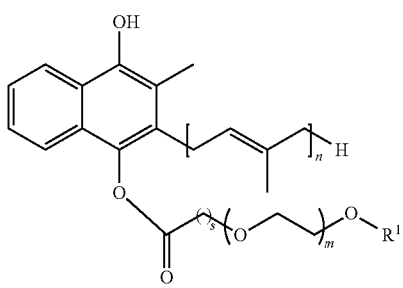

IIb
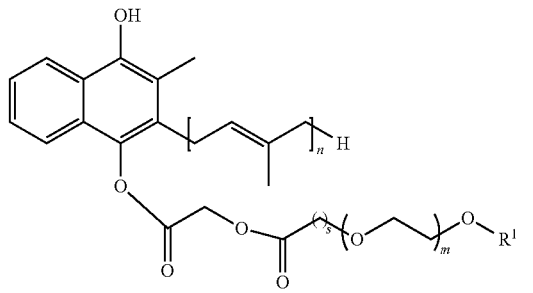

IIc
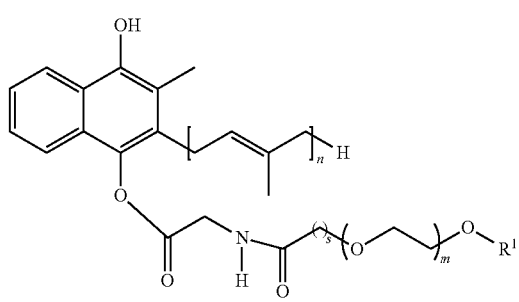

wherein:
m is an integer from 8 to 12;
n is 7, 8, 9 or 10;
s is 1, 2 or 3; and
$R^1$ is H or —$CH_3$.

5. The menaquinol derivative of claim 1 of the formulae Ia.1, Ib.1, Ic.1, Ia.2, Ib.2, Ic.2, IIa, IIb, IIc, IIa.1, IIb.1, IIc.1, IIa.1.1, IIb.1.1, IIc.1.1, IIa.1.2, IIb.1.2, IIc.1.2, IIa.2, IIb.2, IIc.2, IIa.3, IIb.3, IIc.3, IIa.4, IIb.4, IIc.4, IIa.5, IIb.5 and IIc.5:

Ia.1
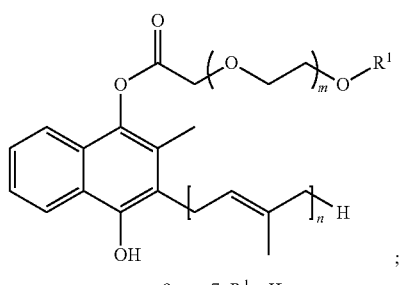
m = 9, n = 7; $R^1$ = H

Ib.1
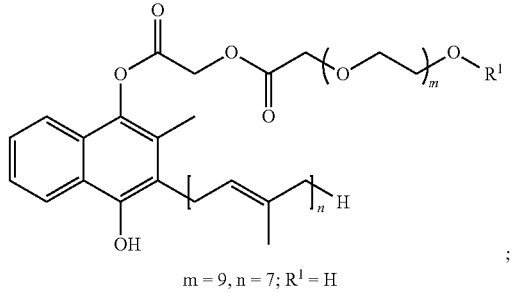
m = 9, n = 7; $R^1$ = H

Ic.1
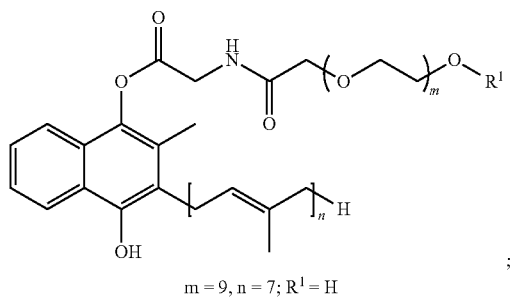
m = 9, n = 7; R¹ = H
Ia.2
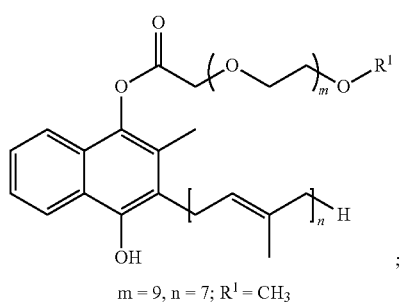
m = 9, n = 7; R¹ = CH₃
Ib.2
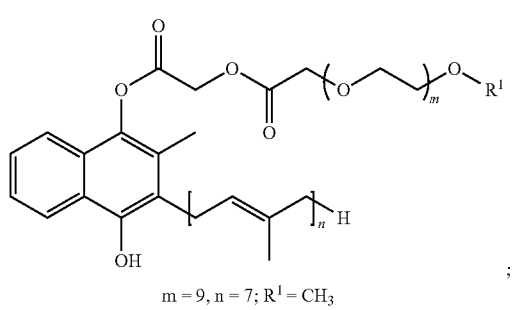
m = 9, n = 7; R¹ = CH₃
Ic.2
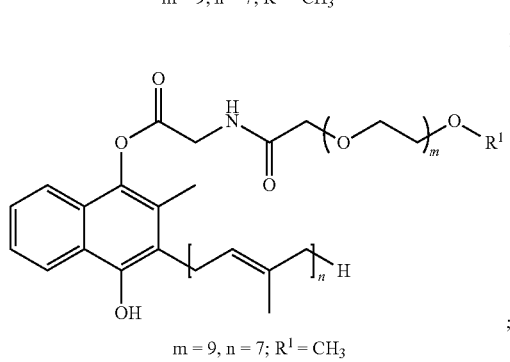
m = 9, n = 7; R¹ = CH₃
IIa
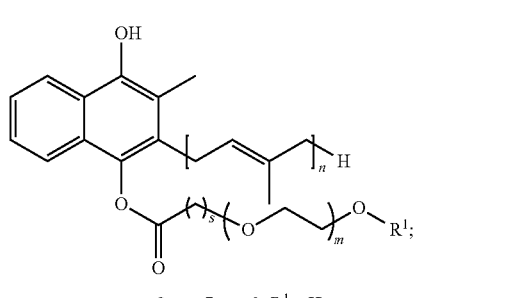
m = 9, n = 7; s = 0; R¹ = H
IIb
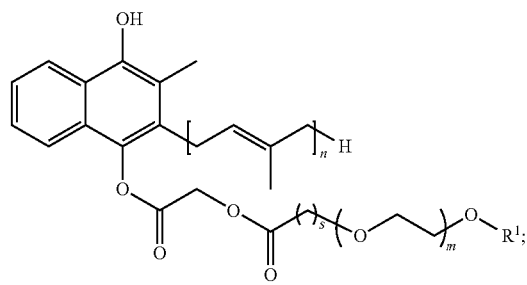
m = 9, n = 7; s = 0; R¹ = H
IIc
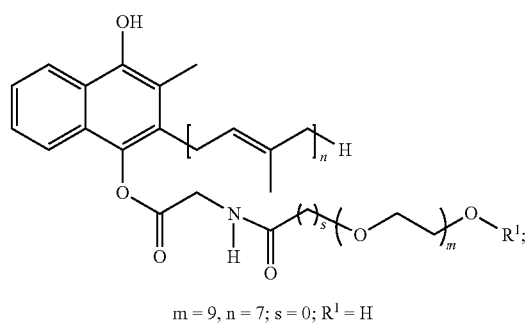
m = 9, n = 7; s = 0; R¹ = H
IIa.1
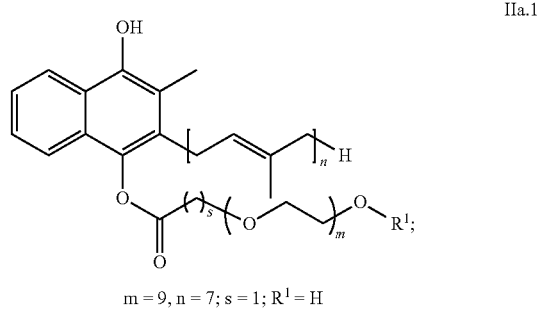
m = 9, n = 7; s = 1; R¹ = H
IIb.1
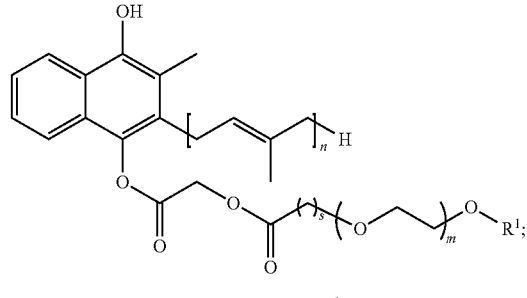
m = 9, n = 7; s = 1; R¹ = H

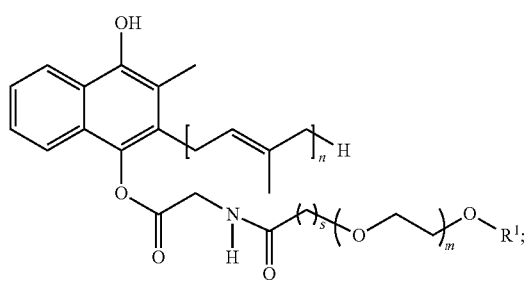
IIc.1
m = 9, n = 7; s = 1; R¹ = H
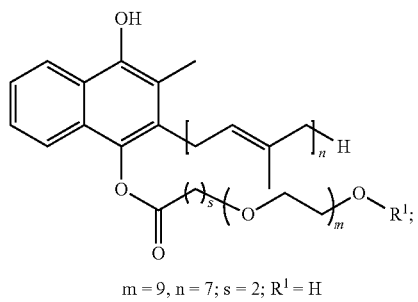
IIa.1.1
m = 9, n = 7; s = 2; R¹ = H
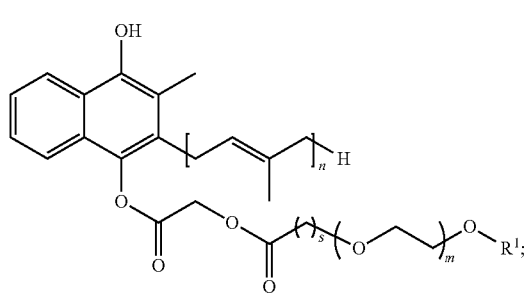
IIb.1.1
m = 9, n = 7; s = 2; R¹ = H
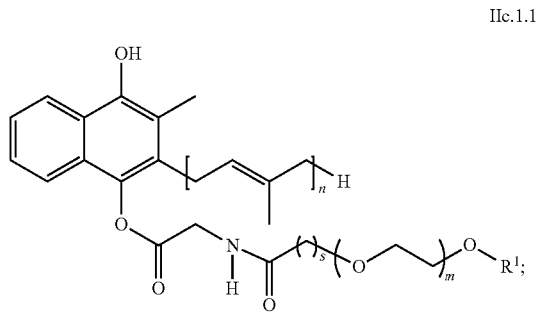
IIc.1.1
m = 9, n = 7; s = 2; R¹ = H
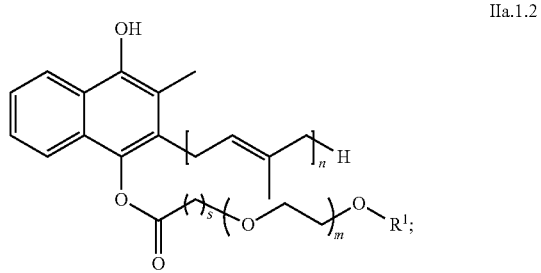
IIa.1.2
m = 9, n = 7; s = 3; R¹ = H
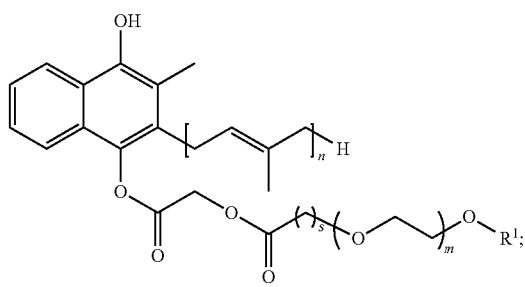
IIb.1.2
m = 9, n = 7; s = 3; R¹ = H
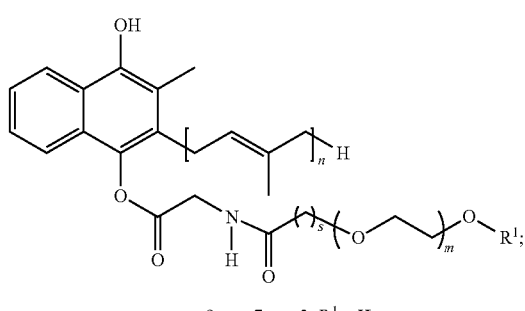
IIc.1.2
m = 9, n = 7; s = 3; R¹ = H
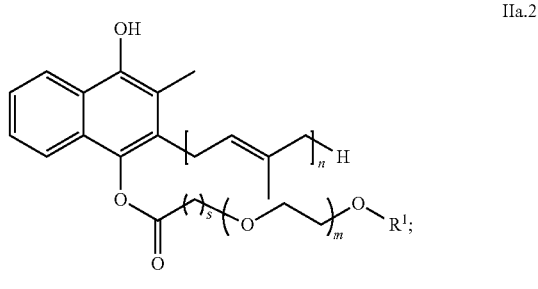
IIa.2
m = 9, n = 7; s = 0; R¹ = CH₃
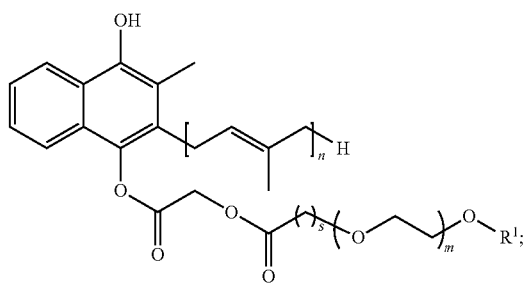
IIb.2
m = 9, n = 7; s = 3; R¹ = CH₃

-continued
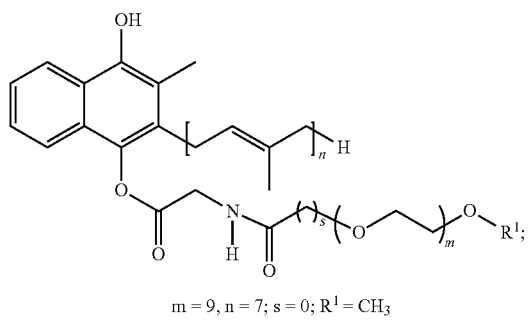
IIc.2
m = 9, n = 7; s = 0; R¹ = CH₃
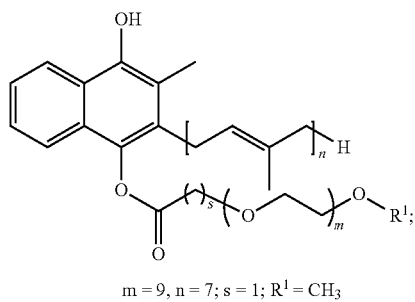
IIa.3
m = 9, n = 7; s = 1; R¹ = CH₃
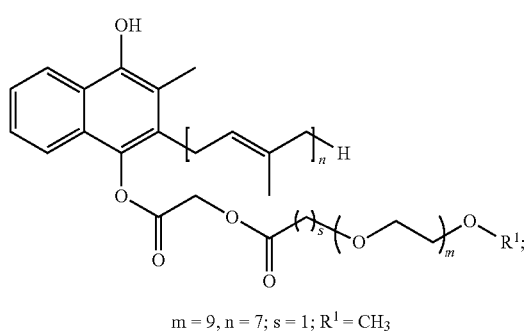
IIb.3
m = 9, n = 7; s = 1; R¹ = CH₃
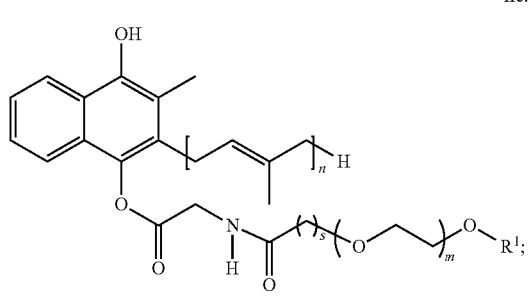
IIc.3
m = 9, n = 7; s = 1; R¹ = CH₃
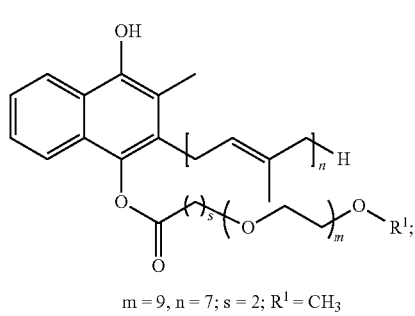
IIa.4
m = 9, n = 7; s = 2; R¹ = CH₃
-continued
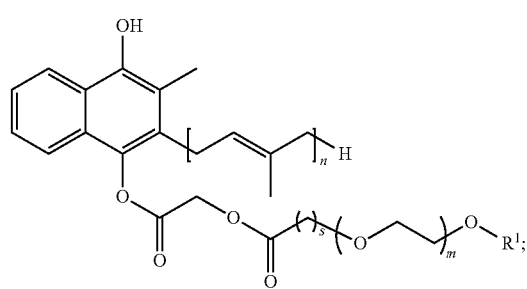
IIb.4
m = 9, n = 7; s = 2; R¹ = CH₃
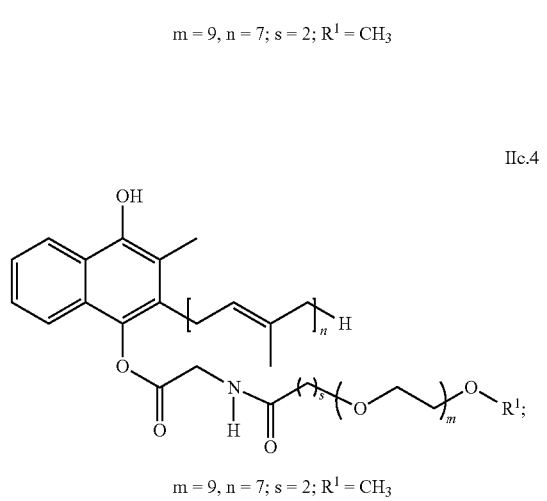
IIc.4
m = 9, n = 7; s = 2; R¹ = CH₃
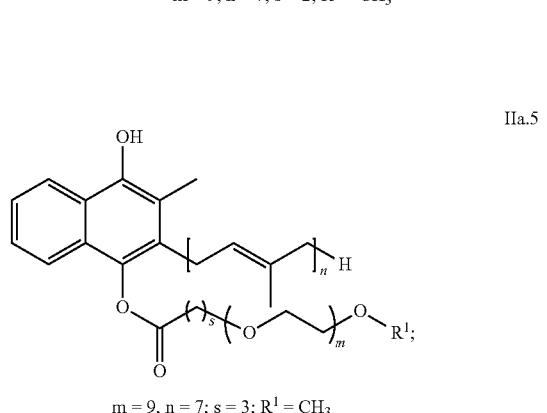
IIa.5
m = 9, n = 7; s = 3; R¹ = CH₃
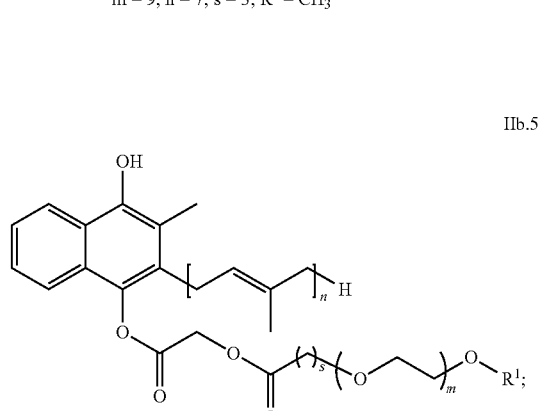
IIb.5
m = 9, n = 7; s = 3; R¹ = CH₃

IIc.5

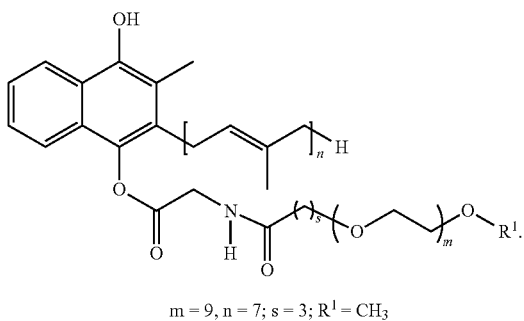

m = 9, n = 7; s = 3; R¹ = CH₃

6. The menaquinol derivative of claim 1, wherein n is 7 or 9.

7. A pharmaceutical composition comprising a therapeutically effective amount of a menaquinol derivative of claim 1, or a mixture thereof;
and a pharmaceutically acceptable excipient, wherein the composition is effective for the treatment of a condition associated with vitamin K selected for the treatment of osteoporosis, arteriosclerosis, calciphylaxis or tissue calcification.

8. A method for increasing the tissue concentration of menaquinol as a co-factor for gamma glutamate carboxylase (GGCX) for catalyzing the carboxylation of vitamin K dependent proteins that is associated with the treatment or prevention of osteoporosis, arteriosclerosis, calciphylaxis or tissue calcification in a patient in need thereof, the method comprising an administration of a therapeutically effective amount of a menaquinol derivative or a pharmaceutical composition comprising an effective amount of a menaquinol derivative of claim 1, or a mixture thereof.

9. A method of treating, preventing, slowing the progression of, arresting, and/or reversing calciphylaxis in a mammal in need thereof, the method comprising administering to the mammal a therapeutically effective amount of a composition comprising substantially pure menaquinol derivative of claim 1, or a mixture thereof, and a pharmaceutically acceptable excipient, to prevent, slow the progression of, arrest, or reverse calciphylaxis.

10. The method of claim 9, wherein the mammal has distal calciphylaxis and/or central calciphylaxis.

11. The method of claim 9, wherein the mammal has diabetes, chronic kidney disease or end stage renal disease.

12. The method of claim 11, wherein the mammal has stage 3, stage 4 or stage 5 chronic kidney disease.

13. The method of claim 9, wherein the mammal is undergoing hemodialysis.

14. The method of claim 9, wherein the mammal is receiving non-warfarin-based anti-coagulant therapy.

15. The method of claim 14, wherein the anti-coagulant therapy is oral anti-coagulation therapy.

16. The method of claim 14, wherein the anti-coagulation therapy comprises an inhibitor of Factor Xa activity selected from apixaban, rivaroxaban, betrixaban, edoxaban, otamixaban, letaxaban, eribaxaban or fondaparinux; or Factor IIa activity selected from dabigratran or argatroban.

17. The method of claim 8, wherein the mammal has chronic obstructive pulmonary disease (COPD).

18. The method of claim 8, wherein the mammal has a calciphylaxis-related dermal lesion.

19. The method of claim 18, wherein administration of the composition reduces the total surface area of the dermal lesion by at least 10%, 20%, 30%, 40%, 50%, 60%, 70%, 80%, 90% or 100%.

20. The method of claim 8, whereupon administration of the compound of any one of claims 1 to 6 or a mixture thereof, to the mammal increases the mammal's serum T50 value by at least 10%, 20%, 30%, 40%, 50%, 60%, 70%, 80%, 90% or 100% relative to the mammal's serum T50 value prior to administration of the compound of claim 1, or a mixture thereof.

* * * * *